US012791054B2

(12) United States Patent
Payyoor et al.

(10) Patent No.: US 12,791,054 B2
(45) **Date of Patent: *Nov. 10, 2026**

(54) MIDSHAFT RATING FOR TURBOMACHINE ENGINES

(71) Applicant: General Electric Company, Evendale, OH (US)

(72) Inventors: Narayanan Payyoor, Thrissur (IN); Bhaskar Nanda Mondal, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/201,419

(22) Filed: May 7, 2025

(65) Prior Publication Data

US 2025/0271021 A1 Aug. 28, 2025

Related U.S. Application Data

(63) Continuation of application No. 18/797,061, filed on Aug. 7, 2024, now Pat. No. 12,546,360, which is a (Continued)

(51) Int. Cl.
*F16C 3/02* (2006.01)
*F02C 7/06* (2006.01)

(52) U.S. Cl.
CPC .................. *F16C 3/02* (2013.01); *F02C 7/06* (2013.01); *F05D 2240/60* (2013.01); *F16C 2360/23* (2013.01)

(58) Field of Classification Search
CPC .......... F02C 7/36; F02C 7/06; F05D 2240/54; F05D 2240/61; F05D 2250/711; F05D 2300/603
See application file for complete search history.

(56) References Cited

U.S. PATENT DOCUMENTS 6,174,130 B1 1/2001 King et al.
6,749,518 B2 6/2004 Carrier et al.
(Continued)

FOREIGN PATENT DOCUMENTS

CN 105822366 A 8/2016
EP 0742634 A2 11/1996
EP 2842911 A1 3/2015

OTHER PUBLICATIONS

U.S. Appl. No. 17/328,800, filed May 24, 2021.
(Continued)

*Primary Examiner* — Topaz L. Elliott
(74) *Attorney, Agent, or Firm* — Venable LLP; Peter T. Hrubiec; Michele V. Frank

(57) ABSTRACT

A turbomachine engine including an engine core including a high-pressure compressor, which has an exit stage having an exit stage diameter ($D_{CORE}$), a high-pressure turbine, and a combustion chamber in flow communication with the high-pressure compressor and the high-pressure turbine, a power turbine in flow communication with the high-pressure turbine, and a low-pressure shaft coupled to the power turbine and characterized by a midshaft rating (MSR) between two hundred $(ft/sec)^{1/2}$ and three hundred $(ft/sec)^{1/2}$. The low-pressure shaft has a redline speed between fifty and two hundred fifty feet per second (ft/sec). The turbomachine engine is configured to operate up to the redline speed without passing through a critical speed associated with a first-order bending mode of the low-pressure shaft. The low-pressure shaft has a length ($L_{MSR}$) defined by an engine core length ($L_{CORE}$) given by:

$$L_{CORE} = \left[m^{(20+m)} * n^{(10+n)}\right]^{\left(\frac{1}{100}\right)} * D_{CORE} + CIS.$$

20 Claims, 32 Drawing Sheets

Related U.S. Application Data continuation of application No. 18/058,036, filed on Nov. 22, 2022, now Pat. No. 12,071,978, which is a continuation-in-part of application No. 17/328,795, filed on May 24, 2021, now Pat. No. 11,603,801.

(56) References Cited

U.S. PATENT DOCUMENTS

| | | | |
|---|---|---|---|
| 7,217,099 | B2 | 5/2007 | Casanova et al. |
| 7,331,757 | B2 | 2/2008 | Janssen et al. |
| 7,617,582 | B2 | 11/2009 | Down et al. |
| 8,303,268 | B2 | 11/2012 | Werson et al. |
| 8,511,987 | B2 | 8/2013 | Reinhardt et al. |
| 8,656,584 | B2 | 2/2014 | Gabriel et al. |
| 9,464,669 | B2 | 10/2016 | Kerr et al. |
| 10,287,897 | B2 | 5/2019 | Paige, II et al. |
| 10,738,648 | B2 | 8/2020 | Valencia |
| 11,047,338 | B2 | 6/2021 | Dievart et al. |
| 11,181,046 | B1 | 11/2021 | Brooks et al. |
| 11,203,971 | B2 | 12/2021 | Kannangara et al. |
| 2005/0239562 | A1 | 10/2005 | Lin et al. |
| 2006/0034693 | A1 | 2/2006 | Lardellier |
| 2008/0148708 | A1 | 6/2008 | Chou et al. |
| 2008/0181808 | A1 | 7/2008 | Thamboo et al. |
| 2010/0113170 | A1 | 5/2010 | Schreiber et al. |
| 2012/0257960 | A1 | 10/2012 | Reinhardt et al. |
| 2013/0052053 | A1 | 2/2013 | Colson et al. |
| 2015/0345504 | A1 | 12/2015 | Kadau et al. |
| 2016/0223011 | A1 | 8/2016 | Lee et al. |
| 2018/0003112 | A1 | 1/2018 | Kupratis et al. |
| 2019/0010868 | A1 | 1/2019 | Davidson et al. |
| 2019/0017445 | A1 | 1/2019 | Adams et al. |
| 2019/0078609 | A1 | 3/2019 | Mori et al. |
| 2019/0153978 | A1 | 5/2019 | Dievart et al. |
| 2020/0165981 | A1 | 5/2020 | Schreiber et al. |
| 2021/0108570 | A1 | 4/2021 | Bemment |
| 2021/0115811 | A1 | 4/2021 | Arakawa et al. |
| 2021/0189956 | A1 | 6/2021 | Kannangara et al. |
| 2021/0189971 | A1 | 6/2021 | Gaskell et al. |
| 2022/0136434 | A1 | 5/2022 | Kannangara et al. |
| 2022/0154597 | A1 | 5/2022 | Unton |

OTHER PUBLICATIONS

Office Action issued in U.S. Appl. No. 17/328,800 dated Jun. 15, 2022.

Rauch, D. Design Study of an Air Pump and Integral Lift Engine ALF-504 Using the Lycoming 502 Core. NASA CR-120,992 (Year: 1972).

Rotating Equipment Solutions. Shaft Length to Diameter Ratio (L/D)- Api 617 Centrifugal Compressor Selection. https:// www.linkedin.com/pulse/shaft-length-diameter-ratio-ld-api-617-centrifugal-solutions/ Dec. 21, 2020 (Year: 2020).

TCCDS No. E17NE U.S. Dept. of Transportation Federal Aviation Administration Certificate Data Sheet retrieved by from drs.faa.gov/search (Year: 2014).

| Property | 7075 Al | Ti-6242 | IN718 | MI SiC/SiC | CVI C/SiC |
|---|---|---|---|---|---|
| Density [lb/in$^3$] | 0.1 | 0.16 | 0.30 | ~0.1 | ~0.07 |
| Ultimate Tensile Strength [ksi] | 80 | 90-120 | 150-200 | 39-50 | 50-57 |
| Specific Tensile Strength [dimensionless] | 800 | 625 | 583 | 450 | 771 |
| Strain-to-Failure [%] | 10-15 | ~20 | 15-20 | 0.2-0.7 | 0.8-1.0 |
| Young's Modulus [Msi] | 10.4 | 16.5 | 29 | 29-39 | 9-19 |
| Interlaminar Shear Strength [ksi] | - | - | - | 13-17 | 2-4 |
| Interlaminar Tensile Strength [ksi} | - | - | - | 10-14 | 0.7-1.4 |
| Thru-thickness Thermal Conductivity [Btu/in/hr/ft$^2$/F] | 840 | 0 | 80-150 | 80-130 | 25-50 |
| Coefficient of Thermal Expansion [1/F] | 12.9 | 5.0 | 7-8 | 1.6-2.2 | 0.3-1.1 |
| Service Temperature (long duration) [F] | 500 | 800 | 1300 | 2450 | 3300 |
| Service Temperature (short time)[F} | 600 | 1000 | 1600 | 3000+ | 4000+ |

FIG. 15

| Embodiment | Description | E/rho in-1 | $L_{MSR}$ in | $D_{MSR}$ in | $T_{eff}$ in | Mode RPM | $L_{MSR}/D_{MSR}$ in/in | Redline OD Speed ft/sec | MSR $(ft/sec)^{1/2}$ |
|---|---|---|---|---|---|---|---|---|---|
| Embodiment 33 | 2-bearing Outbound with CMC in the LPT | 1.0E+08 | 82.2 | 2.7 | 0.35 | 4824 | 30 | 57 | 230 |
| Embodiment 34 | 4-bearing Straddle with CMC in the LPT | 1.0E+08 | 60.6 | 2.7 | 0.35 | 8343 | 22 | 98 | 223 |
| Embodiment 35 | 4-bearing Straddle with CMC in the LPT | 1.0E+08 | 60.6 | 2.7 | 0.35 | 8948 | 22 | 105 | 230 |
| Embodiment 36 | 2-bearing Inbound with CMC in the LPT | 1.0E+08 | 60.6 | 2.7 | 0.35 | 9803 | 22 | 115 | 241 |
| Embodiment 37 | 2-bearing Outbound with CMC in the LPT and CMC in the Core | 1.0E+08 | 82.2 | 3.0 | 0.3 | 6091 | 27 | 80 | 245 |
| Embodiment 38 | 4-bearing Straddle with CMC in the LPT and CMC in the Core | 1.0E+08 | 60.6 | 3.0 | 0.3 | 9873 | 20 | 129 | 230 |
| Embodiment 39 | 4-bearing Straddle with CMC in the LPT and CMC in the Core, Including Bottle Boring | 1.0E+08 | 60.6 | 3.0 | 0.3 | 9929 | 20 | 130 | 230 |
| Embodiment 40 | 2-bearing Inbound with CMC in the LPT and CMC in the Core | 1.0E+08 | 60.6 | 3.0 | 0.3 | 9920 | 20 | 130 | 230 |

FIG. 20A

| Embodiment | Description | E/rho in-1 | $L_{MSR}$ in | $D_{MSR}$ in | $T_{eff}$ in | Mode RPM | $L_{MSR}/D_{MSR}$ in/in | Redline OD Speed ft/sec | MSR $(ft/sec)^{1/2}$ |
|---|---|---|---|---|---|---|---|---|---|
| Embodiment 41 | 2-bearing Outbound with CMC in the LPT and CMC in the Core | 1.0E+08 | 82.2 | 4.0 | 0.18 | 10327 | 21 | 180 | 276 |
| Embodiment 42 | 4-bearing Straddle with CMC in the LPT and CMC in the Core | 1.0E+08 | 60.6 | 4.0 | 0.18 | 11456 | 15 | 200 | 214 |
| Embodiment 43 | 4-bearing Straddle with CMC in the LPT and CMC in the Core, Including Bottle Boring | 1.0E+08 | 60.6 | 4.0 | 0.18 | 11740 | 15 | 205 | 217 |
| Embodiment 44 | 2+1 Bearing System with CMC in the LPT and CMC in the Core, Including Bottle Boring | 1.0E+08 | 82.8 | 4.0 | 0.18 | 11560 | 21 | 184 | 281 |
| Embodiment 45 | 2-bearing Inbound with CMC in the LPT and CMC in the Core | 1.0E+08 | 60.6 | 4.0 | 0.18 | 12702 | 15 | 222 | 226 |
| Embodiment 46 | 2-bearing Outbound with CMC in the LPT and CMC in the Core | 1.3E+08 | 82.2 | 4.0 | 0.18 | 11392 | 21 | 199 | 290 |
| Embodiment 47 | 4-bearing Straddle with CMC in the LPT and CMC in the Core | 1.3E+08 | 60.6 | 4.0 | 0.18 | 12940 | 15 | 226 | 228 |
| Embodiment 48 | 4-bearing Straddle with CMC in the LPT and CMC in the Core | 1.3E+08 | 59.1 | 4.0 | 0.18 | 14208 | 15 | 248 | 233 |

FIG. 20B

| Embodiment | Description | E/rho in-1 | $L_{MSR}$ in | $D_{MSR}$ in | $T_{eff}$ in | Mode RPM | $L_{MSR}/D_{MSR}$ in/in | Redline OD Speed ft/sec | MSR $(ft/sec)^{1/2}$ |
|---|---|---|---|---|---|---|---|---|---|
| Embodiment 49 | 4-bearing Straddle with CMC in the LPT and CMC in the Core, Including Bottle Boring | 1.3E+08 | 60.6 | 4.0 | 0.18 | 13207 | 15 | 231 | 230 |
| Embodiment 50 | 2+1 Bearing System with CMC in the LPT and CMC in the Core, Including Bottle Boring | 1.3E+08 | 82.8 | 4.0 | 0.18 | 12003 | 21 | 209 | 299 |
| Embodiment 51 | 2-bearing Inbound with CMC in the LPT and CMC in the Core | 1.3E+08 | 60.6 | 4.0 | 0.18 | 14363 | 15 | 251 | 240 |
| Embodiment 52 | 3-bearing System, Including Bottle Boring | 1.0E+08 | 69.9 | 3.6 | 0.19 | 9940 | 19 | 156 | 243 |
| Embodiment 53 | 3-bearing System, Including Bottle Boring, with CMC in the LPT | 1.0E+08 | 69.9 | 3.6 | 0.19 | 11160 | 19 | 175 | 257 |
| Embodiment 54 | 3-bearing System, Including Bottle Boring, with CMC in the LPT and CMC in Extra Stage LPT | 1.0E+08 | 69.9 | 3.6 | 0.19 | 10835 | 19 | 170 | 253 |
| Embodiment 55 | 3-bearing System, Including Bottle Boring, with CMC in the LPT and CMC in Extra Stage LPT | 1.3E+08 | 69.9 | 3.6 | 0.19 | 12454 | 19 | 196 | 272 |
| Embodiment 56 | 3-bearing System, Including Bottle Boring, with CMC in the LPT and CMC in Extra Stage LPT and CMC in the Core | 1.3E+08 | 69.9 | 4.0 | 0.17 | 13769 | 17 | 240 | 271 |

FIG. 20C

| Embodiment | Description | E/rho in-1 | $L_{MSR}$ in | $D_{MSR}$ in | $T_{eff}$ in | Mode RPM | $L_{MSR}/D_{MSR}$ in/in | Redline OD Speed ft/sec | MSR $(ft/sec)^{1/2}$ |
|---|---|---|---|---|---|---|---|---|---|
| Embodiment 57 | 3-bearing System, Including Bottle Boring, with CMC in the LPT and CMC in Extra Stage LPT and CMC in the Core, with a 9 Stage Core | 1.3E+08 | 72.0 | 4.0 | 0.17 | 13168 | 18 | 230 | 273 |
| Embodiment 58 | 2+1 Bearing System on the LP Shaft, Including Bottle Boring, with CMC in the LPT and CMC in Extra Stage LPT and CMC in the Core, with a 9 Stage Core | 1.3E+08 | 82.7 | 4.0 | 0.17 | 13127 | 21 | 229 | 313 |
| Embodiment 59 | 2+1 Bearing System on the LP Shaft, Including Bottle Boring, with CMC in the LPT and CMC in Extra Stage LPT and CMC in the Core, with a 10 Stage Core | 1.3E+08 | 82.7 | 4.0 | 0.17 | 14045 | 21 | 245 | 324 |
| Embodiment 60 | 3-bearing System, Including Bottle Boring | 1.0E+08 | 69.9 | 3.5 | 0.19 | 10437 | 20 | 160 | 251 |
| Embodiment 61 | 3-bearing System, Including Bottle Boring, with CMC in Extra Stage LPT | 1.0E+08 | 70.0 | 3.6 | 0.19 | 11718 | 19 | 184 | 264 |
| Embodiment 62 | 3-bearing System, Including Bottle Boring, with CMC in Extra Stage LPT | 1.0E+08 | 70.0 | 3.6 | 0.19 | 11718 | 19 | 184 | 264 |

FIG. 20D

| Embodiment | Description | E/rho in-1 | $L_{MSR}$ in | $D_{MSR}$ in | $T_{eff}$ in | Mode RPM | $L_{MSR}/D_{MSR}$ in/in | Redline OD Speed ft/sec | MSR $(ft/sec)^{1/2}$ |
|---|---|---|---|---|---|---|---|---|---|
| Embodiment 63 | 3-bearing System, Including Bottle Boring, with CMC in Extra Stage LPT and CMC in the Core | 1.3E+08 | 70.0 | 4.0 | 0.17 | 14457 | 18 | 252 | 278 |
| Embodiment 64 | 3-bearing System, Including Bottle Boring, with CMC in Extra Stage LPT and CMC in the Core, with a 9 Stage Core | 1.3E+08 | 72.0 | 4.0 | 0.17 | 13286 | 18 | 232 | 274 |
| Embodiment 65 | 2+1 Bearing System on the LP Shaft, Including Bottle Boring, with CMC in Extra Stage LPT and CMC in the Core, with a 9 Stage Core | 1.3E+08 | 82.7 | 4.0 | 0.17 | 14547 | 21 | 254 | 329 |
| Embodiment 66 | 4-bearing System, Including Bottle Boring, with CMC in the LPT and CMC in the Core, with a Gearbox Having 200 klb/in Effective Shear Stiffness | 1.0E+08 | 60.6 | 4.0 | 0.17 | 9338 | 15 | 163 | 193 |
| Embodiment 67 | 4-bearing System, Including Bottle Boring, with CMC in the LPT and CMC in the Core, with a Gearbox Having 500 klb/in Effective Shear Stiffness | 1.0E+08 | 60.6 | 4.0 | 0.17 | 11531 | 15 | 201 | 215 |
| Embodiment 68 | 2-bearing (Forward Inbound, aft Outbound), Including Bottle Boring, with CMC in the LPT and CMC in the Core, with a Gearbox Having 200klb/in Effective Shear Stiffness | 1.0E+08 | 82.8 | 4.0 | 0.17 | 9064 | 21 | 158 | 260 |

FIG. 20E

| Embodiment | Description | E/rho in-1 | $L_{MSR}$ in | $D_{MSR}$ in | $T_{eff}$ in | Mode RPM | $L_{MSR}/D_{MSR}$ in/in | Redline OD Speed ft/sec | MSR $(ft/sec)^{1/2}$ |
|---|---|---|---|---|---|---|---|---|---|
| Embodiment 69 | 2-bearing (Forward Inbound, aft Outbound), Including Bottle Boring, with CMC in the LPT and CMC in the Core, with a Gearbox Having 500 klb/in Effective Shear Stiffness | 1.0E+08 | 82.8 | 4.0 | 0.17 | 10931 | 21 | 191 | 286 |
| Embodiment 70 | 4-bearing System, Including Bottle Boring, with CMC in the LPT and CMC in the Core, with a Gearbox Having 200 klb/in Effective Shear Stiffness | 1.0E+08 | 60.6 | 3.6 | 0.19 | 8497 | 17 | 133 | 195 |
| Embodiment 71 | 4-bearing System, Including Bottle Boring, with CMC in the LPT and CMC in the Core, with a Gearbox Having 500 klb/in Effective Shear Stiffness | 1.0E+08 | 60.6 | 3.6 | 0.19 | 10493 | 17 | 165 | 216 |
| Embodiment 72 | 2-bearing (Forward Inbound, aft Outbound), Including Bottle Boring, with CMC in the LPT and CMC in the Core, with a Gearbox Having 200 klb/in Effective Shear Stiffness | 1.0E+08 | 82.8 | 3.6 | 0.19 | 8248 | 23 | 130 | 262 |

FIG. 20F

| Embodiment | Description | E/rho in-1 | $L_{MSR}$ in | $D_{MSR}$ in | $T_{eff}$ in | Mode RPM | $L_{MSR}/D_{MSR}$ in/in | Redline OD Speed ft/sec | MSR $(ft/sec)^{1/2}$ |
|---|---|---|---|---|---|---|---|---|---|
| Embodiment 73 | 2-bearing (Forward Inbound, aft Outbound), Including Bottle Boring, with CMC in the LPT and CMC in the Core, with a Gearbox Having 500 klb/in Effective Shear Stiffness | 1.0E+08 | 82.8 | 3.6 | 0.19 | 9947 | 23 | 156 | 287 |
| Embodiment 74 | 8 Stage HPC and 1 Stage HPT, with 15 in Exit Diameter of the HPC | 1.0E+08 | 54.9 | 3.2 | 0.25 | 9521 | 17 | 133 | 198 |
| Embodiment 75 | 9 Stage HPC and 2 Stage HPT, with 15 in Exit Diameter of the HPC | 1.0E+08 | 60.8 | 3.2 | 0.25 | 9217 | 19 | 129 | 216 |
| Embodiment 76 | 10 Stage HPC and 2 Stage HPT, with 15 in Exit Diameter of the HPC | 1.0E+08 | 66.5 | 3.2 | 0.25 | 9078 | 21 | 127 | 234 |
| Embodiment 77 | 11 Stage HPC and 2 Stage HPT, with 15 in Exit Diameter of the HPC | 1.0E+08 | 71.3 | 3.2 | 0.25 | 9420 | 22 | 132 | 255 |
| Embodiment 78 | 8 Stage HPC and 1 Stage HPT, with 15 in Exit Diameter of the HPC, with CMC in the LPT and CMC in the Core | 1.0E+08 | 58.9 | 3.6 | 0.22 | 9604 | 16 | 151 | 201 |
| Embodiment 79 | 9 Stage HPC and 2 Stage HPT, with 15 in Exit Diameter of the HPC, with CMC in the LPT and CMC in the Core | 1.0E+08 | 61.8 | 3.6 | 0.22 | 9589 | 17 | 151 | 211 |

FIG. 20G

| Embodiment | Description | E/rho in-1 | $L_{MSR}$ in | $D_{MSR}$ in | $T_{eff}$ in | Mode RPM | $L_{MSR}/D_{MSR}$ in/in | Redline OD Speed ft/sec | MSR $(ft/sec)^{1/2}$ |
|---|---|---|---|---|---|---|---|---|---|
| Embodiment 80 | 11 Stage HPC and 2 Stage HPT, with 15 in Exit Diameter of the HPC, with CMC in the LPT and CMC in the Core | 1.0E+08 | 71.3 | 3.6 | 0.22 | 9326 | 20 | 146 | 240 |
| Embodiment 81 | 8 Stage HPC and 1 Stage HPT, with 17 in Exit Diameter of the HPC, with CMC in the LPT and CMC in the Core | 1.0E+08 | 59.4 | 4.0 | 0.25 | 10393 | 15 | 181 | 200 |
| Embodiment 82 | 9 Stage HPC and 2 Stage HPT, with 17 in Exit Diameter of the HPC, with CMC in the LPT and CMC in the Core | 1.0E+08 | 64.9 | 4.0 | 0.25 | 9215 | 16 | 161 | 206 |
| Embodiment 83 | 10 Stage HPC and 2 Stage HPT, with 16 in Exit Diameter of the HPC, with CMC in the LPT and CMC in the Core | 1.0E+08 | 68.0 | 3.8 | 0.25 | 7711 | 18 | 128 | 202 |
| Embodiment 84 | 11 Stage HPC and 2 Stage HPT, with 17 in Exit Diameter of the HPC, with CMC in the LPT and CMC in the Core | 1.0E+08 | 75.9 | 4.0 | 0.25 | 8686 | 19 | 152 | 233 |
| Embodiment 85 | 2-bearing (Forward Inbound, aft Outbound), Including Bottle Boring, with CMC in the LPT and CMC in the Core, with a Gearbox Having 200 klb/in Effective Shear Stiffness and 50 klb*in/rad Effective Moment Stiffness | 1.0E+08 | 82.8 | 3.6 | 0.19 | 8463 | 23 | 133 | 265 |

FIG. 20H

| Embodiment | Description | E/rho in-1 | $L_{MSR}$ in | $D_{MSR}$ in | $T_{eff}$ in | Mode RPM | $L_{MSR}/D_{MSR}$ in/in | Redline OD Speed ft/sec | MSR $(ft/sec)^{1/2}$ |
|---|---|---|---|---|---|---|---|---|---|
| Embodiment 86 | 2-bearing (Forward Inbound, aft Outbound), Including Bottle Boring, with CMC in the LPT and CMC in the core, with a Gearbox Having 500 klb/in Effective Shear Stiffness and 200 klb*in/rad Effective Moment Stiffness | 1.0E+08 | 82.8 | 3.6 | 0.19 | 10047 | 23 | 158 | 289 |

FIG. 20I

MIDSHAFT RATING FOR TURBOMACHINE ENGINES

CROSS REFERENCE TO RELATED APPLICATIONS

This application is a continuation of U.S. patent application Ser. No. 18/797,061 filed on Aug. 7, 2024, which is a continuation of U.S. patent application Ser. No. 18/058,036, filed on Nov. 22, 2022, which issued as U.S. Pat. No. 12,071,978 on Aug. 27, 2024, which is a continuation-in-part application of U.S. patent application Ser. No. 17/328,795, filed May 24, 2021, which issued as U.S. Pat. No. 11,603,801 on Mar. 14, 2023, the entire contents of each of which are hereby incorporated by reference in their entireties.

This application is related to U.S. patent application Ser. No. 17/328,800, filed May 24, 2021, U.S. patent application Ser. No. 18/058,034, filed Nov. 22, 2022, and U.S. patent application Ser. No. 18/058,040, filed Nov. 22, 2022. The entire contents of the aforementioned applications are incorporated by reference in their entireties.

TECHNICAL FIELD

This application is generally directed to turbomachine engines, including turbomachine shafts, and a method of driving such turbomachine shafts in such turbomachine engines.

BACKGROUND

A turbofan engine, or turbomachinery engine, includes one or more compressors, and a power turbine that drives a bypass fan. The bypass fan is coupled to the power turbine via a turbomachine shaft.

BRIEF DESCRIPTION OF THE DRAWINGS

The foregoing and other features and advantages will be apparent from the following, more particular, description of various embodiments, as illustrated in the accompanying drawings, wherein like reference numbers generally indicate identical, functionally similar, and/or structurally similar elements.

FIG. 15 shows a table of material properties.

FIG. 20A to 20I show a table of embodiments, according to the present disclosure.

DETAILED DESCRIPTION

Figure 1:
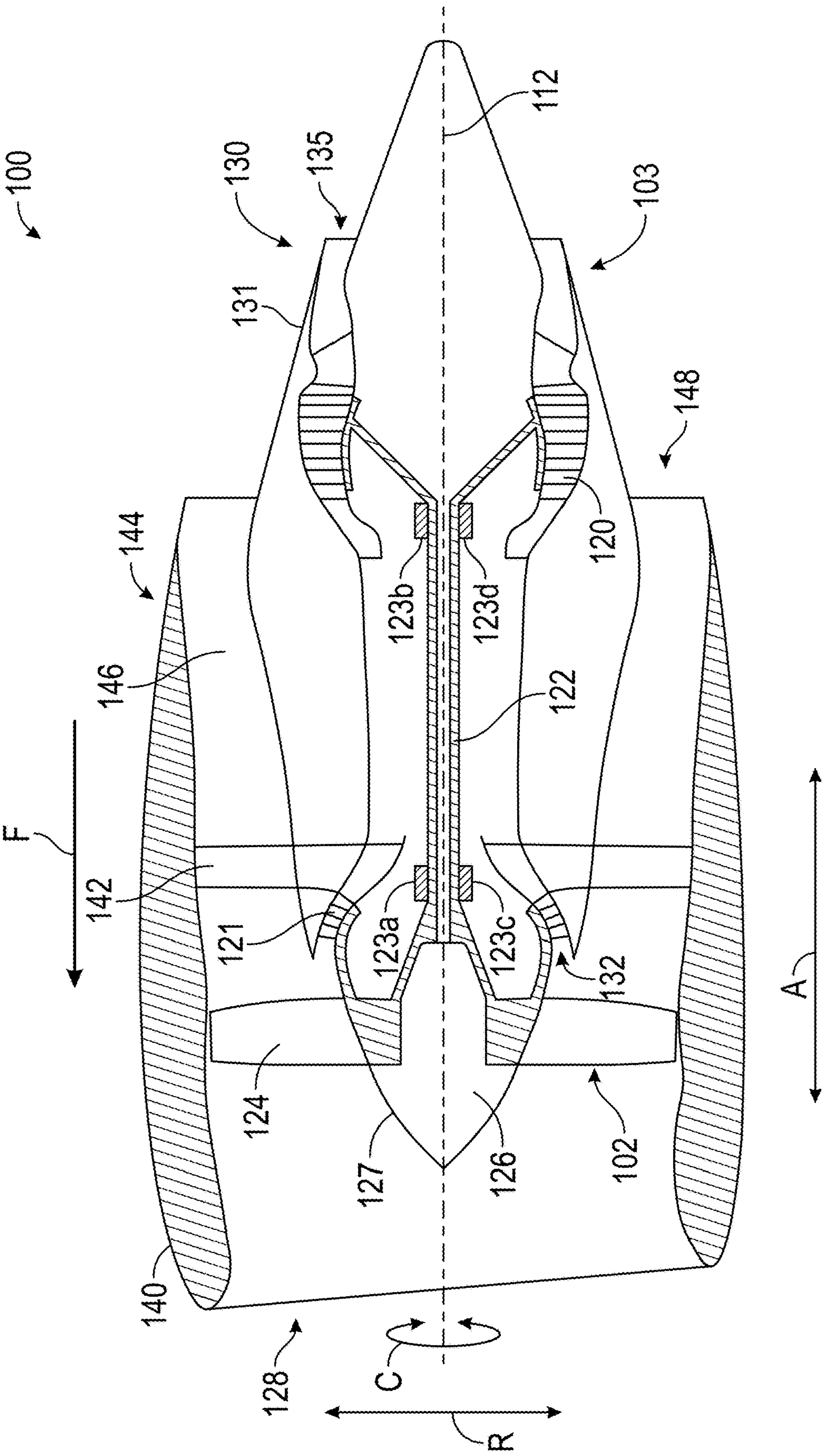
FIG. 1 shows a schematic, cross-sectional view of a ducted, direct-drive gas turbine engine, taken along a centerline axis of the engine.

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," "third," and "fourth" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like, refer to both direct coupling, fixing, or attaching, as well as indirect coupling, fixing, or attaching through one or more intermediate components or features, unless otherwise specified herein.

The term "propulsive system" refers generally to a thrust-producing system, which thrust is produced by a propulsor, and the propulsor provides the thrust using an electrically-powered motor(s), a heat engine such as a turbomachine, or a combination of electrical motor(s) and a turbomachine.

The singular forms "a", "an", and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, "redline speed" means the maximum expected rotational speed of a shaft during normal operation of an engine. The redline speed may be expressed in terms of rotations per second in Hertz (Hz), rotations per minute (RPM), or as a linear velocity of the outer diameter of the shaft in terms of feet per second. For a gas turbine engine that has a high speed shaft and a low speed shaft, both the high speed shaft and the low speed shaft have redline speeds.

As used herein, "critical speed" means a rotational speed of the shaft that is about the same as the fundamental, or natural frequency of a first-order bending mode of the shaft (e.g., the shaft rotates at eighty Hz and the first-order modal frequency is eighty Hertz). When the shaft rotates at the critical speed, the shaft is expected to have a maximum amount of deflection, hence instability, due to excitation of the first-order bending mode of the shaft. The critical speed may be expressed in terms of rotations per second in Hertz (Hz), rotations per minute (RPM), or as a linear velocity of the outer diameter of the shaft in terms of feet per second.

As used herein, "critical frequency" and "fundamental frequency" are referred to interchangeably and refer to the fundamental, or natural frequency, of the first-order bending mode of the shaft.

The term "subcritical speed" refers to a shaft redline speed that is less than the fundamental, or natural frequency of the first-order bending mode of the shaft (e.g., the shaft rotates at a redline speed of 70 Hz while the first-order modal frequency is about 80 Hertz). When the rotational speed is subcritical the shaft is more stable than when rotating at a critical speed. A "subcritical shaft" is a shaft that has a redline speed below the critical speed of the shaft.

The term "supercritical speed" refers to a shaft rotational speed that is above the fundamental, or natural frequency of the first-order bending mode of the shaft (e.g., the shaft rotates at eighty Hz while the first-order modal frequency is about seventy Hertz). A supercritical shaft is less stable than a subcritical shaft because the shaft speed can pass through the critical speed since its fundamental mode is below the redline speed. A "supercritical shaft" is a shaft that has a redline speed above the critical speed of the shaft.

The terms "low" and "high," or their respective comparative degrees (e.g., "lower" and "higher", where applicable), when used with the compressor, turbine, shaft, or spool components, each refers to relative pressures and/or relative speeds within an engine unless otherwise specified. For example, a "low-speed shaft" defines a component configured to operate at a rotational speed, such as a maximum allowable rotational speed, which is lower than that of a "high-speed shaft" of the engine. Alternatively, unless otherwise specified, the aforementioned terms may be understood in their superlative degree. For example, a "low-pressure turbine" may refer to the lowest maximum pressure within a turbine section, and a "high-pressure turbine" may refer to the highest maximum pressure within the turbine section. It should further be appreciated that the terms "low" or "high" in such aforementioned regards may additionally, or alternatively, be understood as relative to minimum allowable speeds and/or pressures, or minimum or maximum allowable speeds and/or pressures relative to normal, desired, steady state, etc., operation of the engine.

The term "casing" herein refers to the structure that defines an airflow path (e.g., wall of duct, or casing). A mounting to the casing may be a direct bolted connection or through a load bearing frame.

As used herein, the term "ceramic matrix composite" ("CMC") refers to a subgroup of composite materials and a subgroup of ceramics. The terms "CMC" and "CMC material" are used interchangeably herein. When the engine component (e.g., the higher pressure turbine module, nozzle, or blade thereof) comprises or includes "CMC" or "CMC material," it is understood that the engine component may include one of, or combinations of one or more of the ceramic matrix composite materials described herein. Such engine component may also include non-ceramic matrix composite materials, such as a metal alloy (e.g., a CMC material for an airfoil and separate disk with dovetail slot made from a metal alloy). Reference to a "first" or "second" or "third" CMC material does not preclude the materials from including multiple CMC materials, different CMC materials, or the same CMC materials.

More specifically, CMC refers to a class of materials that includes a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may include a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing and subsequent chemical processing to arrive at a component formed of a CMC material having a desired chemical composition. For example, the preform may undergo a cure or burn-out to yield a high char residue in the preform, and subsequent melt-infiltration ("MI") with silicon, or a cure or pyrolysis to yield a silicon carbide matrix in the preform, and subsequent chemical vapor infiltration ("CVI") with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known methods or hereinafter developed including but not limited to melt infiltration, chemical vapor infiltration, polymer impregnation pyrolysis (PIP) and any combination thereof.

Such materials, along with certain monolithic ceramics (i.e., ceramic materials without a reinforcing material), are particularly suitable for higher temperature applications. Additionally, these ceramic materials are lightweight compared to metal alloys (e.g., superalloys), yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer. FIG. 15 compares properties of CVI type and MI type CMC materials to metal alloys.

Here and throughout the specification and claims, range limitations are combined, and interchanged, such ranges are identified and include all the sub-ranges contained therein unless context or language indicates otherwise. For example, all ranges disclosed herein are inclusive of the endpoints, and the endpoints are independently combinable with each other.

One or more components of the turbomachine engine described herein below may be manufactured or formed using any suitable process, such as an additive manufacturing process, such as a three-dimensional (3D) printing process. The use of such a process may allow such a component to be formed integrally, as a single monolithic component, or as any suitable number of sub-components. In particular, the additive manufacturing process may allow such a component to be integrally formed and include a variety of features not possible when using prior manufacturing methods. For example, the additive manufacturing methods described herein enable the manufacture of shafts having unique features, configurations, thicknesses, materials, densities, passageways, headers, and mounting structures that may not have been possible or practical using prior manufacturing methods. Some of these features are described herein.

This disclosure and various embodiments relate to a turbomachinery engine, also referred to as a turbine engine, a gas turbine engine, a turboprop engine, or a turbomachine. These turbomachinery engines can be applied across various technologies and industries. Various embodiments may be described herein in the context of aeronautical engines and aircraft machinery.

In some instances, a turbomachinery engine is configured as a direct drive engine. In other instances, a turbomachinery engine can be configured as an indirect drive engine with a gearbox. In some instances, a propulsor of a turbomachinery engine can be a fan encased within a fan case and/or nacelle. This type of turbomachinery engine can be referred to as "a ducted engine." In other instances, a propulsor of a turbomachinery engine can be exposed (e.g., not within a fan case or a nacelle). This type of turbomachinery engine can be referred to as "an open rotor engine" or an "unducted engine."

A turbofan engine, or turbomachinery engine, includes a core engine and a power turbine that drives a bypass fan. The bypass fan generates the majority of the thrust of the turbofan engine. The generated thrust can be used to move a payload (e.g., an aircraft). A turbomachine shaft coupled to the power turbine and fan (either directly or through a gearbox) can experience vibrations during operation of the engine (e.g., during rotation of the shaft). For example, when the shaft rotates at its critical speed the shaft will vibrate excessively. The excessive vibration is due primarily to excitation of a first-order beam bending mode of the shaft. Thus, the shaft may be characterized by its first-order beam bending mode, the fundamental resonance frequency (fundamental frequency) of this mode, and the shaft's critical speed of rotation. If the first-order bending mode may be excited by a low speed shaft rate occurring during a standard operating range of the engine, undetected vibration, as well as an increased risk of whirl instability, may result.

Newer engine architectures may be characterized by faster shaft speeds for the low-pressure turbine (LPT), and longer shafts to accommodate a longer engine core (e.g., the high-pressure compressor, the combustor, and the high-pressure turbine). Additionally, it is desirable to house the engine core within a smaller space. These trends can result in reductions in stiffness-to-weight ratio for the shaft and structure that influences dynamics of the LP shaft, which may have the effect of lowering the critical speed and/or limiting the available options for increasing the critical speed for the LPT's shaft (referred to as the low-speed shaft or the low-pressure (LP) shaft) so that the engine avoids operating at, or near the shaft's critical speed.

The length of the shaft, diameter of the shaft, mass of the shaft, and locations at which the shaft is constrained (e.g., locations at which the shaft is supported by bearings) each affect the fundamental frequency of the shaft, thereby affecting the critical speeds of the LPT shaft. Changing just one of these features of the shaft can increase or lower the speed at which the shaft may rotate before experiencing vibrations at the fundamental frequency. That is, the critical speed of the shaft can be increased or decreased based on the aforementioned features. For example, shortening the length of the shaft will increase the stiffness of the shaft and, thus, increase the critical speed at which the shaft may rotate before encountering the first mode vibrations. In another example, increasing the mass and/or the diameter of the shaft will similarly increase the critical speed.

The aforementioned shaft structure and features also, however, directly affect other components in the engine and the operation of the engine itself. For example, shortening the length of the low-pressure turbine's shaft reduces the available space for the high-pressure compressor stages, the combustor, the low-pressure turbine stages, the low-pressure compressor stages, ducts, mounts, and other engine components etc. This, in turn, has a negative impact on engine operation by reducing the power output of the engine and reducing combustor efficiency. Indeed, there is a desire to have a lengthened high-pressure compressor or more high-pressure compressor stages to improve combustor efficiency. Likewise, increasing the diameter and/or mass of the low-speed shaft can have a similar effect, reducing available space for the remaining engine components and increasing weight of the engine, thus, again, negatively impacting engine performance. Thus, a balance is ultimately struck (penalties vs. benefits) to maintain or enhance engine performance, while also enabling an increase in the critical speed of the low-pressure turbine shaft, or not lowering the critical speed, e.g., add 1 or 2 additional stages to a compressor to increase efficiency, to allow for faster speeds for the power turbine while avoiding sustained operations at or near the critical speed. To achieve this balance, tradeoffs are made to 1) allow for a lengthened high-pressure compressor, shortened overall length of the engine for aero-performance, or reduced nacelle length or size, or any combination thereof, while 2) shortening the low-pressure turbine shaft length, in particular, the midshaft length and increasing the shaft diameter of the low-pressure turbine shaft to increase the critical speed of the low-pressure/low speed turbine shaft (LP shaft).

As part of this effort, the inventors evaluated the influence of using different materials for the engine core (rotor disks, airfoils) and changes in size of the core, and resulting impact that these modifications have on the dynamics of the high speed shaft, the low speed shaft, and the interaction between these two shafts as can occur through dynamic excitation transmitted through shaft bearings. It is expected next generation engines will operate with a higher power density (power/weight), which can mean lengthening the core by adding additional compression stages to the high speed compressor. Additionally, or alternatively, a core operating at a higher power density is expected to operate at higher temperatures at the compressor exit stage and the downstream turbine stages. In this regard, higher-temperature-tolerant material can be used to enable operating at higher temperatures, such as, a ceramic matrix composite (CMC) material. The use of such higher temperature-tolerant material is expected to bring about changes in weight and component size and volume, which is expected to influence the behavior of both the high-speed shaft and mid-shaft. Thus, the inventors, as part of their investigation and evaluation of different engine architectures, also considered how the dynamics of the midshaft and high speed shaft might change when the engine core changes in size and weight, in response to a need to operate at higher power densities enabled by use of higher temperature-tolerant material.

Different approaches for engine types, midshaft geometry, bearing support, and material compositions are needed for next-generation turbomachine engines, to permit high-speed operation without resulting in an unstable bending mode, and, therefore, vibrations during regular operation. The inventors, tasked with finding a suitable design to meet these requirements while lowering vibrations, or at least maintaining a tolerable vibration environment during flight conditions (e.g., takeoff or max thrust), conceived and tested a wide variety of shafts having different combinations of stiffness, material, bearing type and location, shaft length, and diameter in order to determine which embodiment(s) were most promising for a variety of contemplated engine designs, including different engine core sizes for different sized high-pressure compressors and high-pressure turbines. The various embodiments, as described herein including illustrated examples for both a ducted and open fan configuration of a gas turbine engine, include turbomachine shafts that employ one or more of the above-mentioned techniques to increase the critical speed of the LP shaft and/or maintain a design speed for improved efficiency while mitigating or avoiding a subcritical or critical speed situation during flight operations.

FIG. 1 shows a schematic, cross-sectional view of a ducted, direct-drive, gas turbine engine 100 for an aircraft, that may incorporate one or more embodiments of the present disclosure. The gas turbine engine 100 includes a fan assembly 102 (e.g., a fixed-pitch fan assembly) and a turbomachine 103 (also referred to as the core of the gas turbine engine). In this example, the turbomachine 103 is a two-spool turbomachine, which has a high-speed system and a low-speed system.

The high-speed system of the turbomachine 103, which is not shown in FIG. 1, includes a high-pressure compressor, a high-pressure turbine, a combustor, and a high-speed shaft (also referred to as a "high-pressure shaft") supported by bearings and connecting the high-pressure compressor and the high-pressure turbine. The high-speed shaft, components of the high-pressure compressor, and components of the high-pressure turbine all rotate around a centerline axis 112 of the gas turbine engine 100. The high-pressure compressor (or at least the rotating components thereof), the high-pressure turbine (or at least the rotating components thereof), and the high-speed shaft may be collectively referred to as a high-pressure spool of the gas turbine engine 100. The combustor is located between the high-pressure compressor and the high-pressure turbine. The combustor receives a mixture of fuel and air and provides a flow of combustion gases through the high-pressure turbine for driving the high-pressure spool. The high-pressure compressor, the high-pressure turbine, and the combustor together define an engine core of the turbomachine 103.

The low-speed system of the turbomachine 103 includes a low-pressure turbine 120, a low-pressure compressor or booster 121, and a low-speed shaft 122 (also referred to as a "low-pressure shaft") extending between and connecting the booster 121 and the low-pressure turbine 120. In some embodiments, the low-speed shaft 122 may extend further along the centerline axis 112 than is shown in FIG. 1. The low-pressure turbine 120 is sometimes referred to as the engine's power turbine. The low-pressure turbine 120 converts kinetic energy contained in the hot gas exiting from the high-pressure turbine into mechanical shaft energy (e.g., of the low-speed shaft 122), which drives the booster 121 and fan blades 124 either directly or through a gearbox.

As shown in FIG. 1, the gas turbine engine 100 defines an axial direction A (extending parallel to the centerline axis 112), a radial direction R that extends outward from, and inward to, the centerline axis 112 in a direction orthogonal to the axial direction A, and a circumferential direction C that extends three hundred sixty degrees (360°) around the centerline axis 112.

The low-speed shaft 122 is supported on bearings 123_a_, 123_b_, 123_c_, 123_d_, which are mounted to support structures (not shown) of the gas turbine engine 100. At each position, only two bearings are shown in FIG. 1 for clarity, though more than two bearings, e.g., 3 or 4 bearings forward and/or aft of the respective illustrated locations, may be arranged to support the low-speed shaft 122 at the respective positions, and may be evenly spaced or irregularly spaced depending on the geometry of the bearing supporting structure, and available space and clearances.

The low-speed shaft 122, components of the booster 121, and components of the low-pressure turbine 120 all rotate around the centerline axis 112 of the gas turbine engine 100, in either the same direction or a counter-rotating direction as that of the high-pressure spool. The booster 121 (or at least the rotating components thereof), the low-pressure turbine 120 (or at least the rotating components thereof), and the low-speed shaft 122 may collectively be referred to as a low-pressure spool 400 of the gas turbine engine 100, and is further described in FIG. 4.

The fan assembly 102 includes an array of fan blades 124 extending radially outward from a rotor disc 126. The rotor disc 126 is covered by a rotatable fan hub 127 aerodynamically contoured to promote an airflow through array of fan blades 124. The gas turbine engine 100 has an intake side 128 and an exhaust side 130.

The turbomachine 103 is generally encased in a cowl 131. Moreover, it will be appreciated that the cowl 131 defines at least in part an inlet 132 of the turbomachine 103 and an exhaust 135 of the turbomachine 103, and includes a turbomachinery flow path extending between the inlet 132 and the exhaust 135. For the embodiment shown in FIG. 1, the inlet 132 has an annular or an axisymmetric three hundred sixty-degree configuration, and provides a flow path for incoming atmospheric air to enter the turbomachine 103. Such a location may be advantageous for a variety of reasons, including management of icing performance as well as protecting the inlet 132 from various objects and materials as may be encountered in operation.

For a ducted turbofan engine (FIG. 1) a nacelle or fan duct 140 surrounds the array of fan blades 124. The nacelle 140 is supported relative to the turbomachine 103 by circumferentially spaced outlet guide vanes 142. The portion of air entering the fan duct 140 and bypassing the inlet 132 to the core engine is called the bypass airflow. In the embodiment of FIG. 1, the bypass airflow flows through a bypass airflow passage 146 defined at a downstream end 144 of the nacelle 140.

For reference purposes, FIG. 1 depicts a forward or thrust direction with arrow F, which in turn defines the forward and aft portions of the system. The fan assembly 102 is forward of the turbomachine 103 and the exhaust nozzle 135 is aft. The fan assembly 102 is driven by the turbomachine 103, and, more specifically, is driven by the low-pressure turbine 120.

In operation, a volume of air flows through fan assembly 102, and as the volume of air passes across the array of fan blades 124, a first portion of air is directed or routed into the bypass airflow passage 146, and a second portion of air is directed or routed into the inlet 132 and along the turbomachinery flow path. The ratio between the volume of the first portion of air and the volume of the second portion of air is commonly known as a bypass ratio.

After entering the inlet 132, the second portion of air enters the booster 121 and the high-pressure compressor (not shown in FIG. 1). The highly compressed air proceeds along the turbomachinery flow path and is delivered to the combustor (not shown in FIG. 1), where the compressed air is mixed with fuel and burned to provide combustion exhaust gases. The exhaust from the combustor drives the high-pressure turbine (not shown in FIG. 1) and the low-pressure turbine 120, and the low-pressure turbine 120 drives the fan assembly 102 via the low-speed shaft 122.

The combustion exhaust gases are subsequently routed through the exhaust 135 to provide propulsive thrust. Simultaneously, the pressure of the first portion of air is substantially increased as the first portion of air is routed through the bypass airflow passage 146 before being exhausted from a fan exhaust 148 at a downstream end 144, also providing propulsive thrust. In such a manner, the fan blades 124 of the fan assembly 102 are driven to rotate around the centerline axis 112 and generate thrust to propel the gas turbine engine 100, and, hence, an aircraft to which it is mounted, in the forward direction F. Other configurations are possible and contemplated within the scope of the present disclosure, such as what may be termed a "pusher" configuration embodiment in which the turbomachine 103 is located forward of the fan assembly 102.

As shown, the gas turbine engine 100 in the embodiment shown in FIG. 1 has a direct drive configuration in which the low-speed shaft 122 is directly coupled to the rotor disc 126 and thereby rotates the fan assembly 102 at the same rotational speed as the low-pressure spool. Alternatively, in some embodiments, the turbomachine 103 includes a power gearbox (not shown in FIG. 1), and the fan assembly 102 is indirectly driven by the low-pressure spool of the turbomachine 103 across the power gearbox. The power gearbox may include a gearset for decreasing a rotational speed of the low-pressure spool relative to the low-pressure turbine 120, such that the fan assembly 102 may rotate at a slower rotational speed than does the low-pressure spool.

Figure 2:
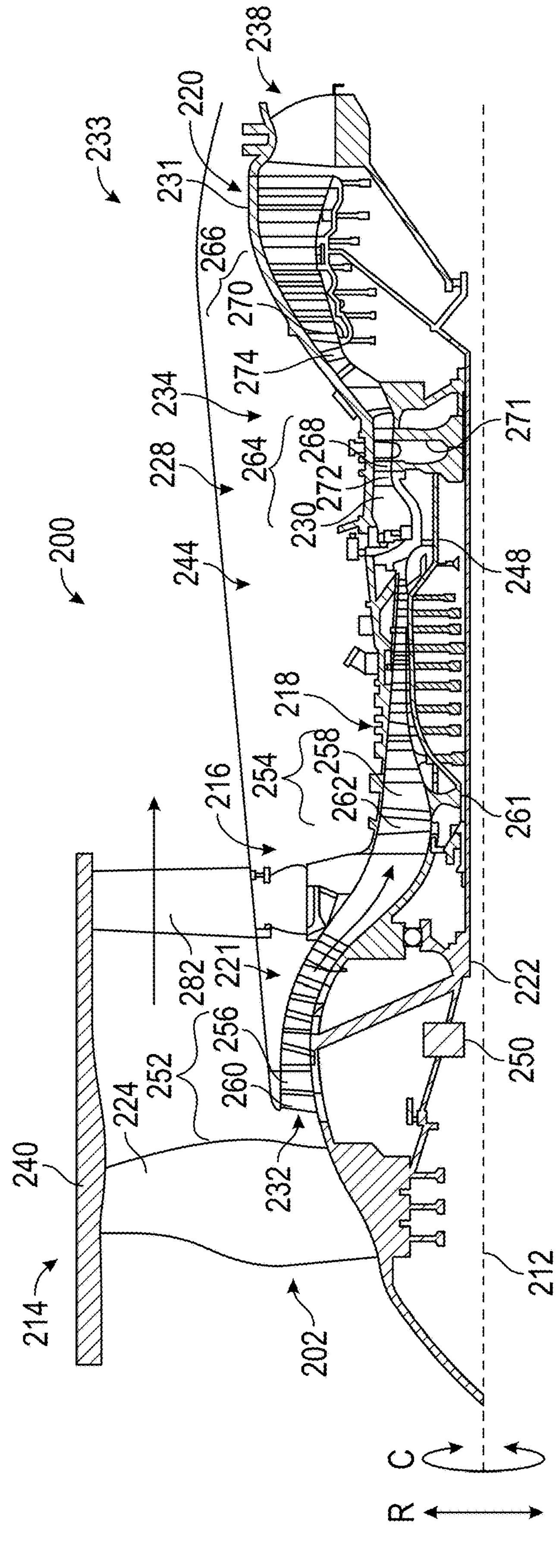
FIG. 2 shows a schematic, cross-sectional view of a ducted, indirect-drive gas turbine engine, taken along a centerline axis of the engine.

FIG. 2 shows a schematic, cross-sectional view of a ducted, indirect-drive, gas turbine engine 200, also referred to as turbine engine 200, taken along a centerline axis 212 of the gas turbine engine 200, according to an embodiment of the present disclosure. The gas turbine engine 200, also referred to herein as a turbine engine 200, is similar in some respects to the gas turbine engine 100 discussed above with respect to FIG. 1, and like reference numerals have been used to refer to the same or similar components. Parts omitted from FIG. 1 for clarity are shown and described with respect to FIG. 2 and, thus, the parts referenced, but not shown, in FIG. 1 may be the same or similar those shown and described with respect to FIG. 2. Likewise, parts omitted from the description of FIG. 2 for clarity are shown and described with respect to FIG. 1, and thus, the parts depicted but not described may be the same as, or similar to, the parts described with respect to FIG. 1.

As shown in FIG. 2, the turbine engine 200 includes, in downstream serial flow relationship, a fan section 214 including a fan 202, a compressor section 216 including a booster or low-pressure (LP) compressor 221 and a high-pressure (HP) compressor 218, a combustion section 228 including a combustor 230, a turbine section 233 including an HP turbine 234, and an LP turbine 220, and an exhaust section 238.

The fan section 214 includes a fan casing 240, which is secured to a nacelle (FIG. 1) surrounding the fan 202. The fan 202 includes a plurality of fan blades 224 disposed radially about the centerline axis 212. The HP compressor 218, the combustor 230, and the HP turbine 234 form an engine core 244 of the turbine engine 200, which generates combustion gases. The engine core 244 is surrounded by a core casing 231, which is coupled to the fan casing 240. The casing 240 is supported relative to the turbomachine by circumferentially spaced outlet guide vanes 282.

A high-speed shaft 248 is disposed coaxially about the centerline axis 212 of the turbine engine 200 and drivingly connects the HP turbine 234 to the HP compressor 218. A low-speed shaft 222, which is disposed coaxially about the centerline axis 212 of the turbine engine 200 and within the larger diameter annular high-speed shaft 248, drivingly connects the LP turbine 220 to the LP compressor 221 and the fan 202 (either directly or through a gearbox assembly 250). The high-speed shaft 248 and the low-speed shaft 222 are rotatable about the centerline axis 212.

The LP compressor 221 and the HP compressor 218, respectively, include a respective plurality of compressor stages 252, 254, in which a respective set of compressor blades 256, 258 rotate relative to a respective set of compressor vanes 260, 262 to compress or pressurize gas entering through the inlet 232. Referring now only to the HP compressor 218, a single compressor stage 254 includes multiple compressor blades 258 provided on a rotor disk 261 (or blades and disk are integrated together, referred to as a blisk). A compressor blade extends radially outwardly relative to the engine centerline 212, from a blade platform to a blade tip. Compressor vanes 262 are positioned upstream/downstream of and adjacent to rotating compressor blades 258. The disk 261 for a stage of compressor blades 258 is mounted to the high-speed shaft 248 (HPC). A stage of the HPC refers to a single disk of rotor blades or both the rotor blades and adjacent stator vanes (it is understood that either meaning can apply within the context of this disclosure without loss of clarity).

The HP turbine 234 has one or two stages 264. In a single turbine stage 264 turbine blades 268 are provided on a rotor disk 271. A turbine blade extends radially outwardly relative to the centerline axis 212, from a blade platform to a blade tip. The HP turbine 234 can also include a stator vane 272. The HP turbine 234 may have both an upstream nozzle adjacent the combustor exit and an exit nozzle aft of the rotor, or a nozzle upstream of rotor blades or downstream of the rotor blades.

Air exiting the HP turbine 234 enters the LP turbine or power turbine 220, which has a plurality of stages of rotating blades 270. The LP turbine 220 can have three, four, five or six stages. In a single LP turbine stage 266 (containing a plurality of blades coupled to the LP shaft 222) a turbine blade is provided on a rotor disk (connected to the LP shaft 222) and extends radially outwardly relative to the centerline axis 212, from a blade platform to a blade tip. The LP turbine 220 can also include a stator vane 274. The LP turbine 220 may have both an upstream nozzle and an exit nozzle aft of a stage, followed by the engine's exhaust nozzle 238.

The turbine engine 200 of FIG. 2 operates in a similar manner as the engine of FIG. 1. Airflow exiting the fan section 214 is split such that a portion of the airflow is channeled into an inlet 232 to the LP compressor 221, which then supplies pressurized airflow to the H P compressor 218, which further pressurizes the air. The pressurized airflow from the H P compressor 218 is mixed with fuel in the combustor 230 and ignited, thereby generating combustion gases. Some work is extracted from the combustion gases by the HP turbine 234, which drives the HP compressor 218 to produce a self-sustaining combustion. The combustion gases discharged from the HP turbine enter the LP turbine 220, which extracts additional work to drive the LP compressor 221 and the fan 202 (directly or through a gearbox assembly 250). The gas discharged from the LP turbine exits through the exhaust nozzle 238.

Some of the air supplied by the fan 202 bypasses the engine core 244 and is used for cooling of portions, especially hot portions, of the turbine engine 200, and/or used to cool or power other aspects of the aircraft. In the context of the turbine engine 200, the hot portions refer to a variety of portions of the turbine engine 200 downstream of the combustion section 228 (e.g., the turbine section 233). Other sources of cooling fluid include, but are not limited to, fluid discharged from the LP compressor 221 or the HP compressor 218.

The gas turbine engines 100 and 200 depicted in FIG. 1 and FIG. 2 are by way of example only. In other embodiments, the gas turbine engine may have any other suitable configuration, including, for example, any other suitable number or configurations of shafts or spools, fan blades, turbines, compressors, or combination thereof. The gearbox assembly may have any suitable configuration, including, for example, a star gear configuration, a planet gear configuration, a single-stage, a multi-stage, epicyclic, non-epicyclic, etc., as detailed further below. The gearbox may have a gear ratio in a range of 3:1 to 4:1, 3:5 to 4:1, 3.25:1 to 3.5:1, or 4:1 to 5:1. The fan assembly may be any suitable fixed-pitched assembly or variable-pitched assembly. The gas turbine engine may include additional components not shown in FIG. 1, such as rotor blades, stator vanes, etc. The fan assembly may be configured in any other suitable manner (e.g., as a fixed pitch fan) and further may be supported using any other suitable fan frame configuration. Aspects of the present disclosure may be incorporated into any other suitable turbine engine, including, but not limited to, turbofan engines, propfan engines, turbojet engines, turboprop, and turboshaft engines.

Figure 3:
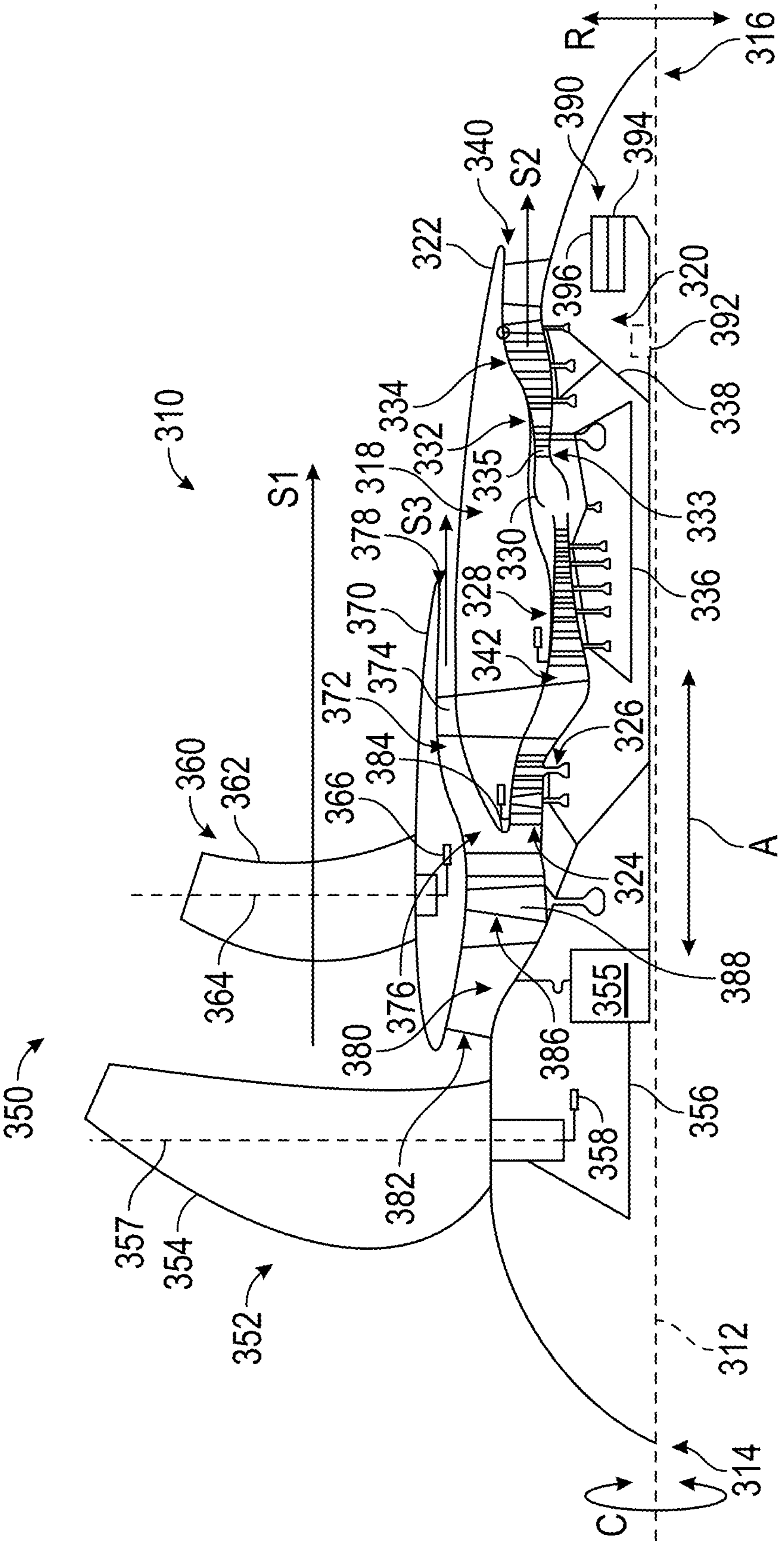
FIG. 3 shows a schematic view of an unducted, three-stream gas turbine engine, taken along a centerline axis of the engine.

FIG. 3 shows a schematic view of an unducted, three-stream, gas turbine engine 310 for an aircraft, that may incorporate one or more embodiments of the present disclosure. The gas turbine engine 310 is a "three-stream engine" in that its architecture provides three distinct streams (labeled S1, S2, and S3) of thrust-producing airflow during operation, as detailed further below.

As shown in FIG. 3, the gas turbine engine 310 defines an axial direction A, a radial direction R, and a circumferential direction C. Moreover, the gas turbine engine 310 defines a centerline axis 312 that extends along the axial direction A. In general, the axial direction A extends parallel to the centerline axis 312, the radial direction R extends outward from, and inward to, the centerline axis 312 in a direction orthogonal to the axial direction A, and the circumferential direction C extends three hundred sixty degrees (360°) around the centerline axis 312. The gas turbine engine 310 extends between a forward end 314 and an aft end 316, e.g., along the axial direction A.

The gas turbine engine 310 includes a core engine 320 and a fan assembly 350 positioned upstream thereof. Generally, the core engine 320 includes, in serial flow order, a compressor section, a combustion section, a turbine section, and an exhaust section. Particularly, as shown in FIG. 3, the core engine 320 includes an engine core 318 and a core cowl 322 that annularly surrounds the core engine 320. The core engine 320 and the core cowl 322 define a core inlet 324 having an annular shape. The core cowl 322 further encloses and supports a low-pressure (LP) compressor 326 (also referred to as a booster) for pressurizing the air that enters the core engine 320 through core inlet 324. A high-pressure (HP) compressor 328 receives pressurized air from the LP compressor 326 and further increases the pressure of the air. The pressurized air flows downstream to a combustor 330 where fuel is injected into the pressurized air and ignited to raise the temperature and the energy level of the pressurized air, thereby generating combustion gases.

The combustion gases flow from the combustor 330 downstream to a high-pressure (HP) turbine 332. The HP turbine 332 drives the HP compressor 328 through a first shaft, also referred to as a high-pressure (HP) shaft 336 (also referred to as a "high-speed shaft"). In this regard, the HP turbine 332 is drivingly coupled with the HP compressor 328. Together, the HP compressor 328, the combustor 330, and the HP turbine 332 define the engine core 318. The combustion gases then flow to a power turbine or low-pressure (LP) turbine 334. The LP turbine 334 drives the LP compressor 326 and components of the fan assembly 350 through a second shaft, also referred to as a low-pressure (LP) shaft 338 (also referred to as a "low-speed shaft"). In this regard, the LP turbine 334 is drivingly coupled with the LP compressor 326 and components of the fan assembly 350. The low-speed shaft 338 is coaxial with the high-speed shaft 336 in the embodiment of FIG. 3. After driving each of the HP turbine 332 and the LP turbine 334, the combustion gases exit the core engine 320 through a core exhaust nozzle 340. The core engine 320 defines a core flowpath, also referred to as a core duct 342, that extends between the core inlet 324 and the core exhaust nozzle 340. The core duct 342 is an annular duct positioned generally inward of the core cowl 322 along the radial direction R.

The fan assembly 350 includes a primary fan 352. For the embodiment of FIG. 3, the primary fan 352 is an open rotor fan, also referred to as an unducted fan. However, in other embodiments, the primary fan 352 may be ducted, e.g., by a fan casing or a nacelle circumferentially surrounding the primary fan 352. The primary fan 352 includes an array of fan blades 354 (only one shown in FIG. 3). The fan blades 354 are rotatable about the centerline axis 312 via a fan shaft 356. As shown in FIG. 3, the fan shaft 356 is coupled with the low-speed shaft 338 via a speed reduction gearbox, also referred to as a gearbox assembly 355, e.g., in an indirect-drive configuration. The gearbox assembly 355 is shown schematically in FIG. 3. The gearbox assembly 355 includes a plurality of gears for adjusting the rotational speed of the fan shaft 356 and, thus, the primary fan 352 relative to the low-speed shaft 338 to a more efficient rotational fan speed. The gearbox assembly may have a gear ratio of 4:1 to 12:1, or 7:1 to 12:1, or 4:1 to 10:1, or 5:1 to 9:1, or 6:1 to 9:1, and may be configured in an epicyclic star or planet gear configuration. The gearbox may be a single stage or compound gearbox.

The fan blades 354 can be arranged in equal spacing around the centerline axis 312. Each fan blade 354 has a root and a tip and a span defined therebetween. Each fan blade 354 defines a central blade axis 357. For the embodiment of FIG. 3, each fan blade 354 of the primary fan 352 is rotatable about their respective central blade axis 357, e.g., in unison with one another. One or more actuators 358 are controlled to pitch the fan blades 354 about their respective central blade axis 357. In other embodiments, each fan blade 354 is fixed or is unable to be pitched about the central blade axis 357.

The fan assembly 350 further includes a fan guide vane array 360 that includes fan guide vanes 362 (only one shown in FIG. 3) disposed around the centerline axis 312. For the embodiment of FIG. 3, the fan guide vanes 362 are not rotatable about the centerline axis 312. Each fan guide vane 362 has a root and a tip and a span defined therebetween. The fan guide vanes 362 can be unshrouded as shown in FIG. 3 or can be shrouded, e.g., by an annular shroud spaced outward from the tips of the fan guide vanes 362 along the radial direction R. Each fan guide vane 362 defines a central vane axis 364. For the embodiment of FIG. 3, each fan guide vane 362 of the fan guide vane array 360 is rotatable about their respective central vane axis 364, e.g., in unison with one another. One or more actuators 366 are controlled to pitch the fan guide vanes 362 about their respective central vane axis 364. In other embodiments, each fan guide vane 362 is fixed or is unable to be pitched about the central vane axis 364. The fan guide vanes 362 are mounted to a fan cowl 370.

The fan cowl 370 annularly encases at least a portion of the core cowl 322 and is generally positioned outward of the core cowl 322 along the radial direction R. Particularly, a downstream section of the fan cowl 370 extends over a forward portion of the core cowl 322 to define a fan flowpath, also referred to as a fan duct 372. Incoming air enters through the fan duct 372 through a fan duct inlet 376 and exits through a fan exhaust nozzle 378 to produce propulsive thrust. The fan duct 372 is an annular duct positioned generally outward of the core duct 342 along the radial direction R. The fan cowl 370 and the core cowl 322 are connected together and supported by a plurality of struts 374 (only one shown in FIG. 3) that extend substantially radially and are circumferentially spaced about the centerline axis 312. The plurality of struts 374 are each aerodynamically contoured to direct air flowing thereby. Other struts in addition to the plurality of struts 374 can be used to connect and support the fan cowl 370 and/or the core cowl 322.

The gas turbine engine 310 also defines or includes an inlet duct 380. The inlet duct 380 extends between an engine inlet 382 and the core inlet 324 and the fan duct inlet 376. The engine inlet 382 is defined generally at the forward end of the fan cowl 370 and is positioned between the primary fan 352 and the fan guide vane array 360 along the axial direction A. The inlet duct 380 is an annular duct that is positioned inward of the fan cowl 370 along the radial direction R. Air flowing downstream along the inlet duct 380 is split, not necessarily evenly, into the core duct 342 and the fan duct 372 by a splitter 384 of the core cowl 322. The inlet duct 380 is wider than the core duct 342 along the radial direction R. The inlet duct 380 is also wider than the fan duct 372 along the radial direction R.

The fan assembly 350 also includes a mid-fan 386. The mid-fan 386 includes a plurality of mid-fan blades 388 (only one shown in FIG. 3). The plurality of mid-fan blades 388 are rotatable, e.g., about the centerline axis 312. The mid-fan 386 is drivingly coupled with the LP turbine 334 via the low-speed shaft 338. The plurality of mid-fan blades 388 can be arranged in equal circumferential spacing about the centerline axis 312. The plurality of mid-fan blades 388 are annularly surrounded (e.g., ducted) by the fan cowl 370. In this regard, the mid-fan 386 is positioned inward of the fan cowl 370 along the radial direction R. The mid-fan 386 is positioned within the inlet duct 380 upstream of both the core duct 342 and the fan duct 372. A ratio of a span of a blade 354 to that of a mid-fan blade 388 (a span is measured from a root to tip of the respective blade) is greater than 2 and less than 10, to achieve the desired benefits of the third stream (S3), particularly the additional thrust it offers to the engine, which can enable a smaller diameter blade 354 (benefits engine installation).

Accordingly, air flowing through the inlet duct 380 flows across the plurality of mid-fan blades 388 and is accelerated downstream thereof. At least a portion of the air accelerated by the mid-fan blades 388 flows into the fan duct 372 and is ultimately exhausted through the fan exhaust nozzle 378 to produce propulsive thrust. Also, at least a portion of the air accelerated by the plurality of mid-fan blades 388 flows into the core duct 342 and is ultimately exhausted through the core exhaust nozzle 340 to produce propulsive thrust. Generally, the mid-fan 386 is a compression device positioned downstream of the engine inlet 382. The mid-fan 386 is operable to accelerate air into the fan duct 372, also referred to as a secondary bypass passage.

During operation of the gas turbine engine 310, an initial or incoming airflow passes through the fan blades 354 of the primary fan 352 and splits into a first airflow and a second airflow. The first airflow bypasses the engine inlet 382 and flows generally along the axial direction A outward of the fan cowl 370 along the radial direction R. The first airflow accelerated by the fan blades 354 passes through the fan guide vanes 362 and continues downstream thereafter to produce a primary propulsion stream or first thrust stream Si. A majority of the net thrust produced by the gas turbine engine 310 is produced by the first thrust stream Si. The second airflow enters the inlet duct 380 through the engine inlet 382.

The second airflow flowing downstream through the inlet duct 380 flows through the plurality of mid-fan blades 388 of the mid-fan 386 and is consequently compressed. The second airflow flowing downstream of the mid-fan blades 388 is split by the splitter 384 located at the forward end of the core cowl 322. Particularly, a portion of the second airflow flowing downstream of the mid-fan 386 flows into the core duct 342 through the core inlet 324. The portion of the second airflow that flows into the core duct 342 is progressively compressed by the LP compressor 326 and the HP compressor 328 and is ultimately discharged into the combustion section. The discharged pressurized air stream flows downstream to the combustor 330 where fuel is introduced to generate combustion gases or products.

The combustor 330 defines an annular combustion chamber that is generally coaxial with the centerline axis 312. The combustor 330 receives pressurized air from the HP compressor 328 via a pressure compressor discharge outlet. A portion of the pressurized air flows into a mixer. Fuel is injected by a fuel nozzle (omitted for clarity) to mix with the pressurized air thereby forming a fuel-air mixture that is provided to the combustion chamber for combustion. Ignition of the fuel-air mixture is accomplished by one or more igniters (omitted for clarity), and the resulting combustion gases flow along the axial direction A toward, and into, a first stage turbine nozzle of the HP turbine 332. The first stage turbine nozzle 333 is defined by an annular flow channel that includes a plurality of radially extending, circumferentially spaced nozzle vanes 335 that turn the combustion gases so that they flow angularly and impinge upon first stage turbine blades of the HP turbine 332. The combustion gases exit the HP turbine 332 and flow through the LP turbine 334 and exit the core duct 342 through the core exhaust nozzle 340 to produce a core air stream, also referred to as a second thrust stream S2. As noted above, the HP turbine 332 drives the HP compressor 328 via the high-speed shaft 336, and the LP turbine 334 drives the LP compressor 326, the primary fan 352, and the mid-fan 386 via the low-speed shaft 338.

The other portion of the second airflow flowing downstream of the mid-fan 386 is split by the splitter 384 into the fan duct 372. The air enters the fan duct 372 through the fan duct inlet 376. The air flows generally along the axial direction A through the fan duct 372 and is ultimately exhausted from the fan duct 372 through the fan exhaust nozzle 378 to produce a third stream, also referred to as a third thrust stream S3.

The third thrust stream S3 is a secondary air stream that increases fluid energy to produce a minority of total propulsion system thrust. In some embodiments, a pressure ratio of the third stream is higher than that of the primary propulsion stream (e.g., a bypass or a propeller driven propulsion stream). The thrust may be produced through a dedicated nozzle or through mixing of the secondary air stream with the primary propulsion stream or a core air stream, e.g., into a common nozzle. In certain embodiments, an operating temperature of the secondary air stream is less than a maximum compressor discharge temperature for the engine. Furthermore in certain embodiments, aspects of the third stream (e.g., airstream properties, mixing properties, or exhaust properties), and thereby a percent contribution to total thrust, are passively adjusted during engine operation or can be modified purposefully through use of engine control features (such as fuel flow, electric machine power, variable stators, variable inlet guide vanes, valves, variable exhaust geometry, or fluidic features) to adjust or to improve overall system performance across a broad range of potential operating conditions.

The gas turbine engine 310 depicted in FIG. 3 is by way of example only. In other embodiments, the gas turbine engine 310 may have any other suitable configuration. For example, in other embodiments, the primary fan 352 may be configured in any other suitable manner (e.g., as a fixed pitch fan) and further may be supported using any other suitable fan frame configuration. In other embodiments, the primary fan 352 can be ducted by a fan casing or a nacelle such that a bypass passage is defined between the fan casing and the fan cowl 370. Moreover, in other embodiments, any other suitable number or configuration of compressors, turbines, shafts, or a combination thereof may be provided. In still other embodiments, aspects of the present disclosure may be incorporated into any other suitable turbine engine, such as, for example, turbofan engines, propfan engines, turbojet engines, turboprop, turboshaft engines, and/or turbine engines defining two streams (e.g., a bypass stream and a core air stream).

Further, for the depicted embodiment of FIG. 3, the gas turbine engine 310 includes an electric machine 390 (motor-generator) operably coupled with a rotating component thereof. In this regard, the gas turbine engine 310 is a hybrid-electric propulsion machine. Particularly, as shown in FIG. 3, the electric machine 390 is operatively coupled with the low-speed shaft 338. The electric machine 390 can be mechanically connected to the low-speed shaft 338, either directly, or indirectly, e.g., by way of a gearbox assembly 392 (shown schematically in FIG. 3). Further, although in this embodiment the electric machine 390 is operatively coupled with the low-speed shaft 338 at an aft end of the low-speed shaft 338, the electric machine 390 can be coupled with the low-speed shaft 338 at any suitable location or can be coupled to other rotating components of the gas turbine engine 310, such as the high-speed shaft 336 or the low-speed shaft 338. For instance, in some embodiments, the electric machine 390 can be coupled with the low-speed shaft 338 and positioned forward of the mid-fan 386 along the axial direction. In some embodiments the engine of FIG. 2 also includes an electric machine coupled to the LP shaft and located in the engine's tail cone.

In some embodiments, the electric machine 390 can be an electric motor operable to drive or motor the low-speed shaft 338, e.g., during an engine burst. In other embodiments, the electric machine 390 can be an electric generator operable to convert mechanical energy into electrical energy. In this way, electrical power generated by the electric machine 390 can be directed to various engine and/or aircraft systems. In some embodiments, the electric machine 390 can be a motor/generator with dual functionality. The electric machine 390 includes a rotor 394 and a stator 396. The rotor 394 is coupled to the low-speed shaft 338 and rotates with rotation of the low-speed shaft 338. In this way, the rotor 394 rotates with respect to the stator 396, thereby generating electrical power. Although the electric machine 390 has been described and illustrated in FIG. 3 as having a particular configuration, the present disclosure may apply to electric machines having alternative configurations. For instance, the rotor 394 and/or the stator 396 may have different configurations or may be arranged in a different manner than illustrated in FIG. 3.

Figure 4:
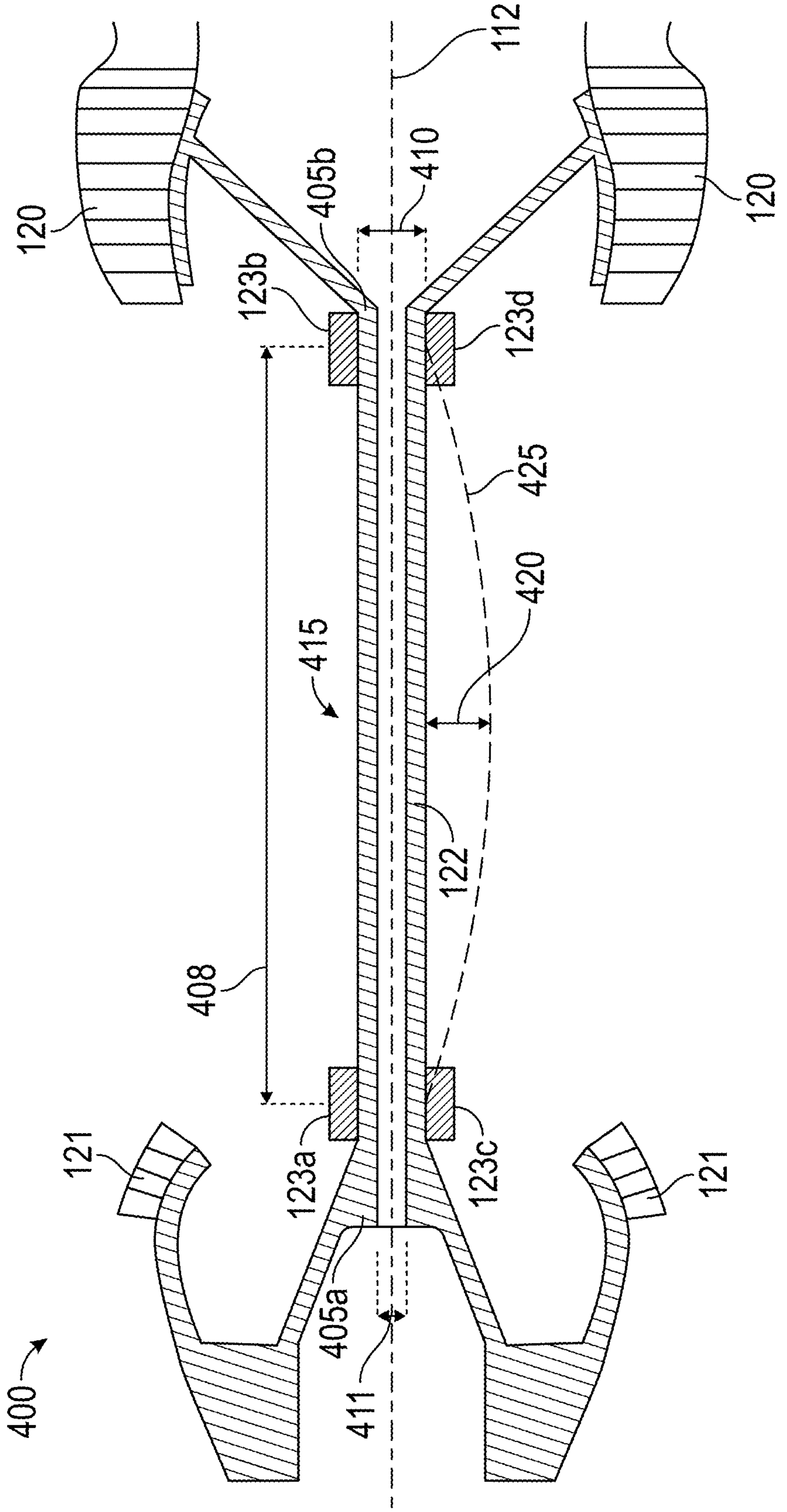
FIG. 4 shows an enlarged view of a portion of the cross-sectional view of FIG. 1.

FIG. 4 shows an enlarged view of a portion of the cross-sectional view of FIG. 1, that includes the low-pressure spool 400 according to some embodiments of the present disclosure. For example, a portion of the booster 121 and a portion of the low-pressure turbine 120 are shown mounted to the low-speed shaft 122 of the turbomachine 103, which in this example is a two-spool turbomachine. Alternatively, the low-speed shaft 122 may be an intermediate shaft in a three-spool turbomachine (not shown). The low-speed shaft 122 is supported by at least bearings 123*a* to 123*d*, which are located at mounting points 405*a*, 405*b* associated with the booster 121 location and a low-pressure turbine 120 location, respectively, for providing shaft rotational support at these locations. In the example of FIG. 4, bearings 123*a*, 123*b*, 123*c*, and 123*d* are all positioned inside of the mounting points 405*a* and 405*b*, which is referred to as an inbound bearing layout, or alternatively referred to as an overhung configuration for the booster 121 and low-pressure turbine 120. If the bearings were positioned outside of the mounting point 405*b*, then that would be referred to as an outbound layout. The bearings 123*a* to 123*d* can, however, be positioned at any point along the low-speed shaft 122, and may both be inbound, both be outbound, or one inbound and the other outbound.

The low-speed shaft 122 has a length "L" (indicated by arrow 408) and an outer diameter "D" (indicated by arrow 410). The length L is also referred to as $L_{MSR}$ and the outer diameter D is also referred to $D_{MSR}$, as detailed further below. The low-speed shaft 122 can be hollow, with an inner diameter "d" indicated by arrow 411). In cases when the diameter of the low-speed shaft 122 varies along the length L, the outer diameter "D" and the inner diameter "d" may be defined at a midpoint of the low-speed shaft 122 (also referred to as the midshaft 415). The thickness may be defined as the thickness of the walls of the low-speed shaft 122 in embodiments in which the low-speed shaft 122 is hollow. A difference between a stated outer diameter D and inner diameter d of the low-speed shaft 122 may be understood as the shaft's wall thickness. In cases when the wall thickness varies along the length of the low-speed shaft 122, the thickness may be defined as the difference between the inner diameter and the outer diameter at the midshaft 415.

In some embodiments, the length L can be understood as the portion of the low-speed shaft 122 between the bearings 123*a* to 123*d* and/or the mounting points 405*a*, 405*b* of engine components such as the booster 121 and the low-pressure turbine 120. For example, in the two-bearing arrangement of FIG. 4, the length L may be measured as the distance between midpoints of the bearings 123*a* to 123*b*, as indicated by the dashed vertical lines and arrow 408. For a four-bearing arrangement, there may be additional bearings along the shaft, in which case the length L may be measured as the distance between the midpoints of an innermost pair of bearings, or the distance between pairs or other groupings of bearings. In some embodiments, the length may be measured relative to specific bearings associated with specific engine components such as the booster 121 and the low-pressure turbine 120.

During operation, the low-speed shaft 122 rotates with a rotational speed that can be expressed in either rotations per minute (RPM), or as an outer diameter (OD) speed expressed in units of linear velocity, such as feet per second (ft/sec). The rotational stability of the low-speed shaft 122 relative to its operational range may be characterized by the resonance frequency of the fundamental or first order bending mode. When an operational speed is the same as this resonance frequency, the shaft is operating at its critical speed. The low-speed shaft 122, when supported by bearings 123*a* to 123*d*, has a mode shape for this first-order bending mode that may be generally described as a half-sinusoid, with a midshaft 415 location undergoing maximum displacement (indicated by arrow 420, which is exaggerated for clarity and is not to scale) and, therefore, having a maximum kinetic energy of displacement relative to other portions of the low-speed shaft 122. The fundamental mode shape is illustrated by dashed line 425 extending from bearing 123*c* to bearing 123*d* in FIG. 4, though this is only half of the amplitude of oscillation. This unstable mode is a standing wave across the length L of the low-speed shaft 122. The maximum deflection occurs when the excitation source has a periodicity or cyclic component near to the fundamental frequency. Since the bending mode is not active at the location of the innermost bearings 123*a* to 123*d* for the low-speed shaft 122, the instability cannot be mitigated with the use of bearing dampers. When an engine is designed, the shaft speed expected to produce the highest deflection or instability at the midshaft is the shaft speed that equals the critical speed.

If the critical speed of the shaft critical speed falls within the standard operational range, i.e., if the critical speed is below the redline speed or the low-speed shaft 122 is a supercritical shaft, then during routine operation, the low-speed shaft 122 may at times operate at or pass through the critical speed, which induces an unstable condition. Even if the engine is operated at the critical speed temporarily, there is a possibility of undetected vibration, whirl instability, and some likelihood of damage. For low vibration and stability, it is preferable to have an operating range free of any intervening critical speeds.

There is a desire to pursue engines capable of operating at higher redline speeds. This pursuit of higher operating speeds requires that the low-speed shaft 122 have a higher strength to weight characteristic if it is also desired that the shaft remain subcritical. The inventors sought this end result—higher speed shafts while remaining subcritical. To this end, a large number of engine designs were evaluated. Depending on the architecture, the positions and numbers of bearings relative to mounting points 405*a*, 405*b* were varied, and the resulting impact, not only on the critical speed but also the feasibility of such configurations given competing requirements (clearance, spacing, sump locations, oil supply lines), were taken into consideration, as will be readily apparent in view of the disclosure. A discussion of these embodiments follows. In the following discussion, strength to weight ratio is represented as E/rho, calculated as the ratio of Young's modulus E for the material (expressed, for example, in pounds per square foot) divided by the density rho (expressed, for example, in pounds per cubic inch). The shaft bending mode is represented as the critical rotational speed expressed in rotations per minute (RPM), though it could alternatively be expressed as the fundamental frequency of the bending mode in Hertz.

In some embodiments, high strength steel alloys, advanced materials, composite materials, and combinations thereof, were contemplated. For example, high strength-to-weight ratio materials such as titanium boride (TiB) or a titanium metal matrix composite (TiMMC), provided 30% to 50% increased strength-to-weight ratio relative to steel or titanium alloys. In addition, coatings with materials such as graphene were found to improve strength by a factor of two in lab tests, without impacting weight. These types of changes in material composition may be characterized in some embodiments by the ratio of E/rho.

Figure 5B:
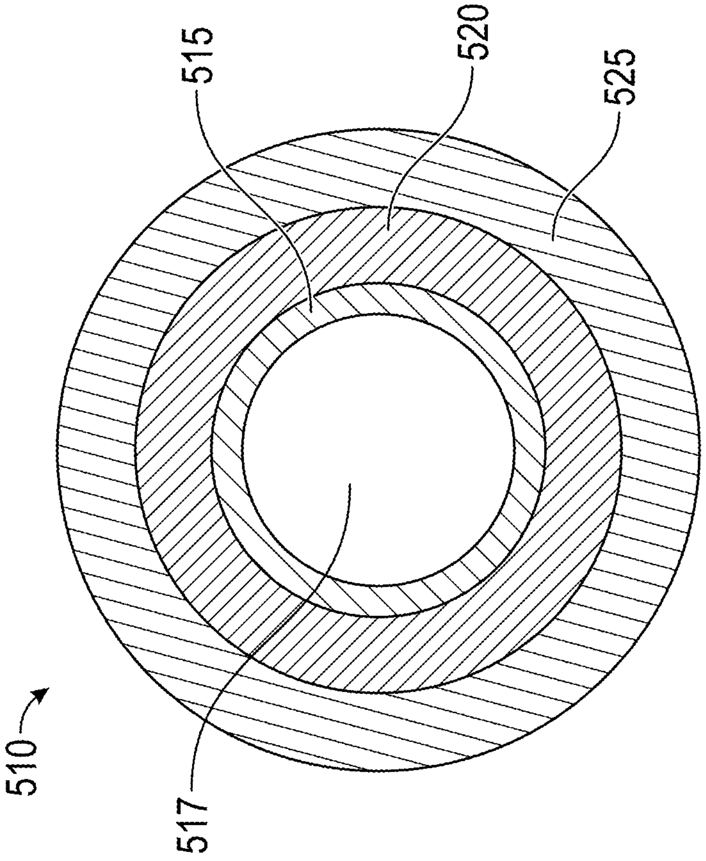
FIG. 5B shows a cross-sectional view of a composite shaft.
Figure 5A:
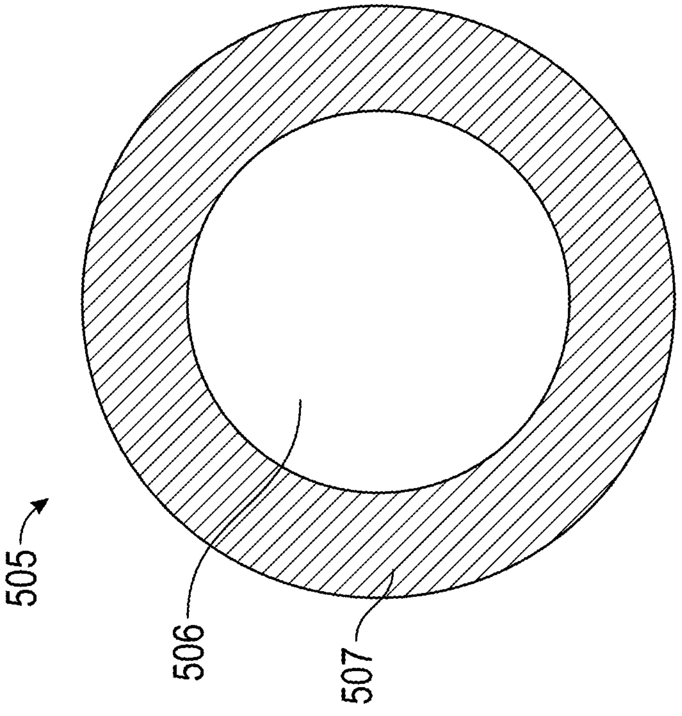
FIG. 5A shows a cross-sectional view of a steel shaft.

FIG. 5A shows a cross-sectional view of a steel shaft 505, with a standard hollow interior 506 surrounded by a steel layer 507, and geometry defined by a length L, outer diameter D, inner diameter d, etc.

FIG. 5B shows a cross-sectional view of an example of a composite shaft 510, with identical geometry to the steel shaft 505. Rather than being composed entirely of steel, the composite shaft 510 has an inner layer 515 surrounding a hollow interior 517, a middle layer 520, and an outer coating 525, all of different materials. The middle layer 520 in this example is also steel, though in other embodiments the composite shaft could use no steel at all, or have a different layer be steel.

For example, both the steel shaft 505 and the composite shaft 510 have length L of seventy-six inches and outer diameter of three inches, along with a standard inbound two-bearings configuration as depicted in FIG. 4. The fundamental frequency of the unstable mode for the steel shaft 505 is eighty Hertz (Hz), whereas the fundamental frequency for the composite shaft 510 is ninety Hz.

In other embodiments, more layers or fewer layers may be used. Some or all of these layers and coatings may be of numerous alternative materials to steel, including but not limited to TiB, TiMMC, other metals and metal matrix composites, silicon carbide (SiC), silicon carbide reinforced metals or alloys (e.g., SiC-MMC), aluminum alloys, graphene, or combinations thereof. The concepts of the present disclosure are not limited by the particular materials used for the layers and coatings. For the composite shaft 510, the critical speed corresponding to the unstable mode is increased relative to the (otherwise identical) steel shaft 505, which means that relative to the steel shaft 505, the composite shaft 510 can attain a higher rotational speed before reaching the critical speed.

Depending on the type of composite materials chosen and the relative thickness and arrangement of the layers, the ratio of stiffness to weight can be modified, and therefore, the critical speed can be increased. The inventors conceived of a variety of embodiments resulting from the selection of different composite materials, thicknesses, and bearings configurations to allow for operation at higher speed. Two such embodiments are listed in TABLE 1. These embodiments were considered as possible designs that could increase the shaft stiffness to weight ratio in such a way to be compatible with engine architecture and without requiring modifications or limitations on the targeted operating range for a subcritical shaft.

TABLE 1

| Embodiment | L (in) | D (in) | Bearing type | E/rho ($in^{-1}$) | Teff (in) | Mode (RPM) |
|---|---|---|---|---|---|---|
| 1 | 82.2 | 2.74 | 2-bearing outbound | 1.00E+08 | 0.35 | 4181 |
| 2 | 60.6 | 2.75 | inbound OTM | 1.27E+08 | 0.35 | 10263 |
| 3 | 82.2 | 2.74 | outbound OTM | 1.27E+08 | 0.35 | 6915 |

Embodiment 1 was evaluated using a high strength steel alloy and an outbound bearing layout. Embodiments 2 and 3 were evaluated with a composite material instead of steel alloy. Embodiment 2 uses overturning moment (OTM) bearings with an inbound bearing layout that is different from the layout used by Embodiment 1. Embodiment 3 uses OTM bearings with an outbound bearing layout that is similar to that used by Embodiment 1. These bearing types and layouts are described in further detail below with reference to FIG. 7A, FIG. 7B, and TABLE 3. The values shown in TABLE 1 illustrate that Embodiments 2 and 3 achieve a higher strength-to-weight ratio (E/rho) when using a composite material, instead of the steel alloy used in Embodiment 1. As a result of these differences, the shaft mode critical speed occurs at 4181 RPM for Embodiment 1, at 10263 RPM for Embodiment 2 and at 6915 for Embodiment 3.

The inventors also modified the shaft thickness along its length, to evaluate the effect on critical speed for a strength to weight ratio of E/rho that is not constant along the length L, and for different suitable materials. An example of a shaft with a uniform E/rho along its length L is shown in FIG. 6A, and examples of shafts having variable E/rho are shown in FIG. 6B and FIG. 6C.

Figures 6A, 6B, 6C:
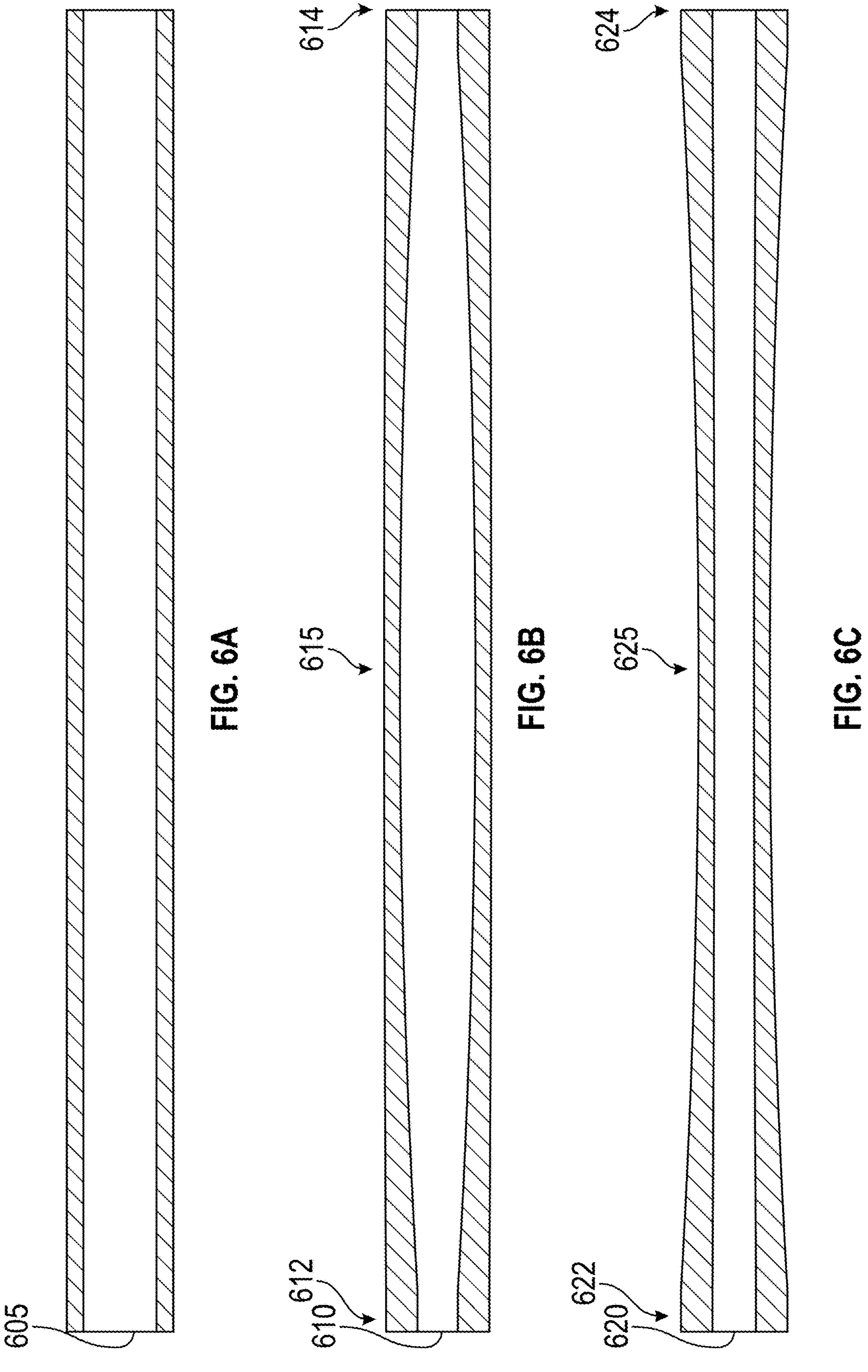
FIG. 6A shows a cross-sectional view of a uniform shaft with a constant diameter and thickness.
FIG. 6B shows a cross-sectional view of a concave shaft with a constant diameter and a variable thickness.
FIG. 6C shows a cross-sectional view of a convex shaft with a variable diameter and a variable thickness.

FIG. 6A conceptually shows a cross-sectional view of a uniform shaft 605 with a constant diameter and thickness. In this example, the uniform shaft 605 has a length L of seventy-six inches. The outer diameter D of the uniform shaft 605 is 3.0 inches. The uniform shaft 605 is hollow, with a constant wall thickness of 0.2 inch and corresponding constant inner radius of 1.3 inches along its length. For this example of a uniform shaft 605, and a two-bearing outbound configuration such as in FIG. 4, the fundamental frequency of the unstable mode is eighty Hz.

FIG. 6B conceptually shows a cross-sectional view of a concave shaft 610 with a constant outer diameter D and a variable thickness. For comparison, the uniform shaft 605 and the concave shaft 610 have the same material (e.g., hollow steel), bearings (outbound), and length (seventy-six inches), with a constant outer radius of 1.5 inches along its length. The outer diameter D of the concave shaft 610 is, therefore, 3.0 inches. Unlike the uniform shaft 605, however, the concave shaft 610 has a wall thickness of 0.3 inch at the ends 612, 614 (e.g., at the bearings, which are not shown in FIGS. 6A to 6C), and a thinner wall thickness of 0.15 inches in the midshaft region 615. This results in an inner radius of 1.35 inches in the midshaft region 615 and a smaller inner radius of 1.2 inches at the ends 612, 614. The concave shaft 610 therefore has a reduced mass density in the midshaft region 615. To achieve the resulting concave profile, various methods may be used to manufacture the concave shaft 610, such as a bottle boring technique.

FIG. 6C conceptually shows a cross-sectional view of a convex shaft 620 with a variable outer diameter D and a variable thickness. For comparison, the uniform shaft 605 and the convex shaft 620 have the same material (e.g., hollow steel), bearings (outbound), and length (seventy-six inches), with a constant inner radius of 1.2 inches along its length. Unlike the uniform shaft 605, the convex shaft 620 has a wall thickness of 0.3 inch at the ends 622, 624, and a thinner wall thickness of 0.15 inches in the midshaft region 625, just like the concave shaft 610. Unlike the concave shaft 610, the convex shaft 620 has an outer radius of 1.5 inches at the ends 622, 624, and a smaller outer radius of 1.35 inches in the midshaft region 625. The convex shaft 620 also has a reduced mass density in the midshaft region 625.

Since the radius (and, therefore, the diameter) are variable over the length of the convex shaft 620, the diameter D is defined in some embodiments as the diameter at the midshaft region 625, since this has the most relevance to the bending mode and undergoes maximum deflection. In the example of the convex shaft 620, the shaft outer diameter D is 2.7 inches in the midshaft region 625. In other embodiments, for example, embodiments when the radius has multiple minima and/or maxima, the diameter D may be defined at any of those minima or maxima. To achieve the resulting convex profile, various methods may be used to manufacture the convex shaft 620, such as external machining.

For both convex and concave thickness profiles, as well as types of variable thickness profiles, the thickness may be described using an effective thickness value, Teff. For a uniform shaft the thickness would simply be the difference between the outer diameter and the inner diameter. When these values are variable over the length of the shaft, the effective thickness can be calculated as the difference between the effective outer diameter and effective inner diameter. For example, the effective thickness may be defined at the midshaft in some embodiments.

With variable thickness, in some embodiments the concave shaft 610 and the convex shaft 620 can have twenty-five to thirty percent less weight than the uniform shaft 605 in the midshaft region 615 and 625, respectively. Note that the variation in thickness need not be continuous, for example a stepped change in geometry could also be used. As a result, the fundamental frequency of the unstable mode for both the concave shaft 610 and the convex shaft 620 is increased to ninety Hz, which is higher than the eighty Hz fundamental frequency for the uniform shaft 605. In other words, the concave shaft 610 and the convex shaft 620 can both attain a higher rotational speed than that of uniform shaft 605, before reaching subcritical speeds.

The concave shaft 610 and the convex shaft 620 are examples of different thickness profiles that may be used in some embodiments. Other thickness profiles are also contemplated, which reduce or increase the mass density of the shaft in the midshaft region. The concepts of the current disclosure are not limited by the particular thickness profile used.

Depending on the thickness profile, the ratio of stiffness to weight can be modified to produce significant changes in the critical speed. embodiments are listed in TABLE 2. These embodiments were considered as possible designs that could modify the effective thickness in such a way to be compatible with engine architecture and without requiring modifications or limitations on the targeted operating range for a subcritical shaft.

TABLE 2

| Embodiment | L (in) | D (in) | Bearing type | E/rho ($in^{-1}$) | Teff (in) | Mode (RPM) |
|---|---|---|---|---|---|---|
| 4 | 60.6 | 2.75 | inbound OTM | 1.00E+08 | 0.35 | 9001 |
| 5 | 82.2 | 2.74 | outbound OTM | 1.00E+08 | 0.35 | 6065 |
| 6 | 60.6 | 2.75 | inbound OTM | 1.00E+08 | 0.32 | 10039 |
| 7 | 82.2 | 2.74 | outbound OTM | 1.00E+08 | 0.32 | 6942 |

Embodiments 4, 5, 6, and 7 all use a steel alloy material composition. Embodiments 4 and 6 use an inbound bearing layout with OTM bearings, and Embodiments 5 and 7 use an outbound bearing layout with OTM bearings. Embodiments 4 and 5 are uniform shafts similar to the Example of FIG. 6A. Embodiments 6 and 7, however, have a convex thickness profile similar to the example of FIG. 6C, having been manufactured with a bottle boring manufacturing technique. The values shown in TABLE 2 illustrate that Embodiments 6 and 7 achieve a lower effective thickness Teff due to their convex profile, instead of the uniform profile for Embodiments 4 and 5. As a result of these differences, the shaft mode critical speed occurs at 9001 RPM for Embodiment 4, and at 10039 RPM for Embodiment 6. The shaft mode critical speed occurs at 6065 RPM for Embodiment 5, and at 6942 RPM for Embodiment 7.

The inventors also conceived of a variety of shafts with modified bearing configurations. Bearings are used to provide transverse support to the shaft along its length. Bearings may be ball-type bearings, which have a very small contact area with the shaft to provide less friction, or roller-type bearings, which have a large contact area with the shaft to provide increased rigidity and load bearing. Different types of bearings may be mixed in various bearing layouts. According to additional embodiments, different bearing layouts were considered, for different combinations of uniform, convex, and concave shafts, or varying shaft thickness profiles and material composition in order to determine which combination would work best for a given architecture and need, as well as taking into account competing engineering requirements.

A variety of combinations of bearing configurations were contemplated, such as embodiments when the number of bearings in duplex and/or straddling position relative to engine components (e.g., a booster 721 or a low-pressure turbine 720) were changed. Either or both of the engine components mounted to the shaft 722 may be straddled or overhung. It was found that these variations can improve the critical speed and/or be more suitable to accommodate space limitations, lubrication resources or other architecture-imposed limitations. The embodiments included locating bearings at different inbound or outbound positions relative to the mounting points 705*a*, 705*b*.

Specific bearing layouts were preferentially used in various embodiments. These are now described in more detail, though the concepts of the present disclosure are not limited by the particular number or arrangement of bearings described herein.

Figure 7A:
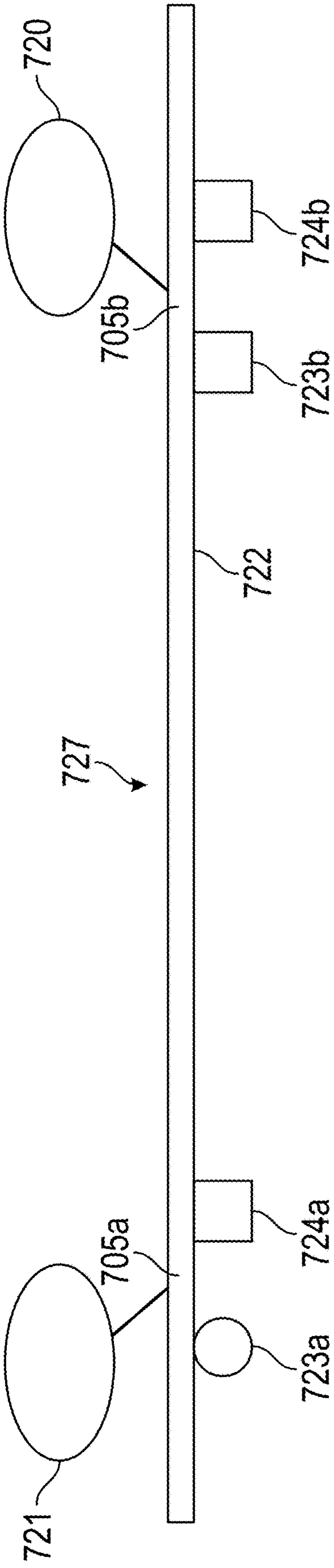
FIG. 7A shows a schematic view of a shaft using a four-bearing straddle configuration.

For example, FIG. 7A conceptually shows a low-pressure turbine 720 and a booster 721 mounted on a shaft 722 (e.g., a low-speed shaft) supported by a four-bearing straddle configuration. Additional bearings located around the circumference of the shaft 722 are omitted from FIG. 7A for clarity. In this system, one pair of bearings 723*a*, 724*a* straddle (i.e., placed forward and aft of) a mounting point 705*a* of the booster 721, and a second pair of bearings 723*b*, 724*b* straddle a mounting point 705*b* of the low-pressure turbine 720. In this example, bearings 724*a*, 723*b*, and 724*b* are roller bearings, and bearing 723*a* is a ball bearing, though these bearing types may vary in other embodiments. The length L for shaft 722 is represented in some embodiments as the distance between the midpoints or centers of the innermost bearings 724*a*, 723*b*. The four-bearing straddle layout is used in several embodiments described with reference to TABLE 3.

Figure 7B:
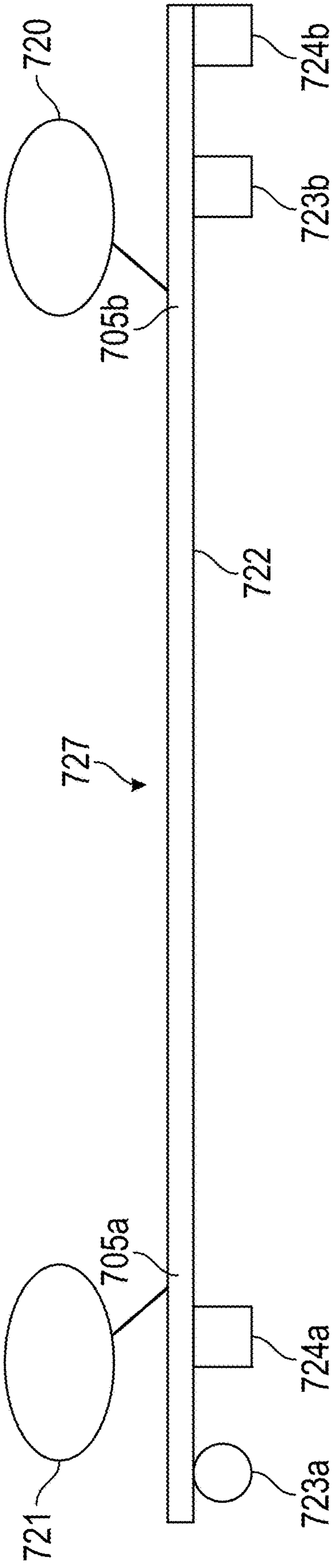
FIG. 7B shows a schematic view of a shaft using a four-bearing outbound configuration.

As another example, FIG. 7B conceptually shows a low-pressure turbine 720 and a booster 721 mounted on a shaft 722 supported by a four-bearing outbound configuration. Additional bearings located around the circumference of the shaft 722 are omitted from FIG. 7B for clarity. This system is similar to that of the straddle system shown in FIG. 7A, but differs in that bearings 723*a*, 724*a* are both placed forward of mounting point 705*a* of the booster 721, and bearings 723*b*, 724*b* are placed aft of mounting point 705*b* of the low-pressure turbine 720. The shaft 722 may extend beyond bearings 723*b*, 724*b*. As in the example of FIG. 7A, bearings 724*a*, 723*b*, and 724*b* are roller bearings, and bearing 723*a* is a ball bearing, though these bearing types may vary. The length L for shaft 722 is represented in some embodiments as the distance between the midpoints or centers of the innermost bearings 724*a*, 723*b*.

Figure 7C:
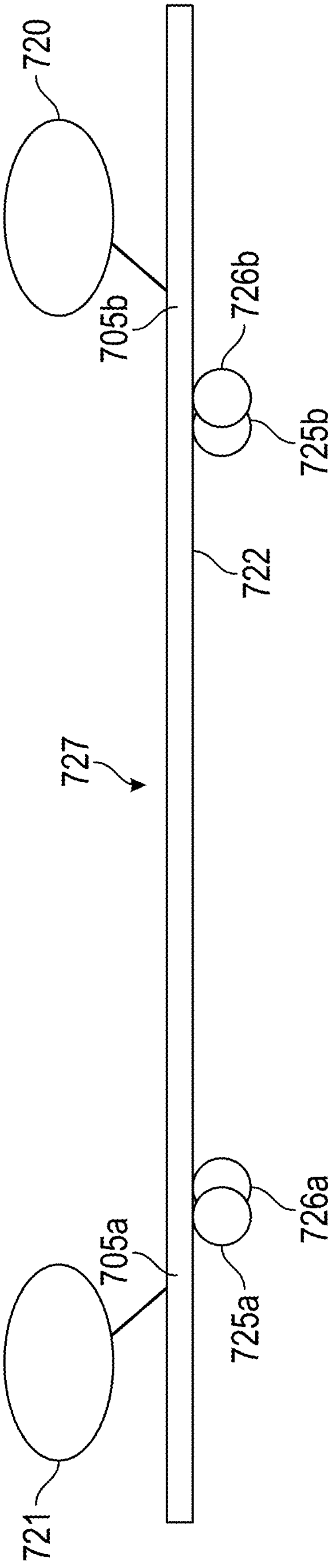
FIG. 7C shows a schematic view of a shaft using an inbound duplex configuration.

As yet another example, FIG. 7C conceptually shows a shaft 722 with an inbound duplex bearing configuration. Additional bearings located around the circumference of the shaft 722 are omitted from FIG. 7C for clarity. According to some embodiments, a first pair of ball bearings 725*a*, 726*a* is arranged in a duplex configuration aft of the mounting point 705*a* for the booster 721. A second pair of ball bearings 725*b*, 726*b* is arranged in a duplex configuration forward of the mounting point 705*b* for the low-pressure turbine 720. Duplex bearing arrangements may also be referred to as double-row bearings, or overturning moment (OTM) bearings, since they provide moment stiffness to the shaft, i.e., provide resistance to rotation across the bearing locations. In some embodiments duplex bearing types may include tandem bearings, back-to-back bearings, face-to-face bearings, and/or tapered roller bearings.

In the example shown in FIG. 7C, both the first pair of ball bearings 725*a*, 726*a* and the second pair of ball bearings 725*b*, 726*b* are in an inbound position, i.e., located closer towards the midshaft 727 than the respective mounting points 705*a*, 705*b*. In this position, the booster 721 and the low-pressure turbine 720 are referred to as overhung. This inbound OTM layout is used in Embodiments 2, 4, and 6, for example, described above with reference to TABLES 1 and 2.

Figure 7D:
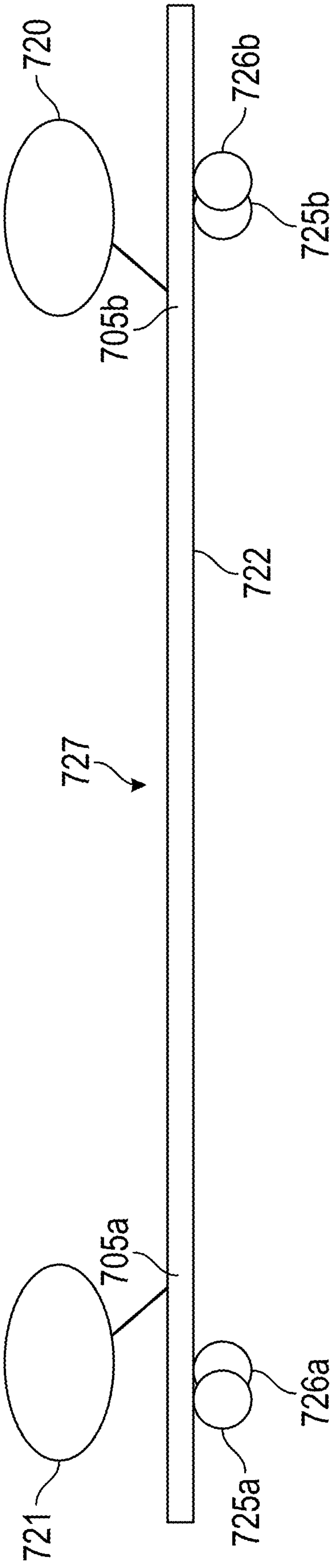
FIG. 7D shows a schematic view of a shaft using an outbound duplex configuration.

Alternatively, the first pair of ball bearings 725*a*, 726*a* and/or the second pair of ball bearings 725*b*, 726*b* may be in an outbound position, as shown in FIG. 7D, i.e., located farther from the midshaft 727 than the respective mounting points 705*a*, 705*b* of the booster 721 and the low-pressure turbine 720. The length L for the duplex bearing configurations shown in FIG. 7C and FIG. 7D may be represented in some embodiments as the distance between the midpoints or centers of the innermost ball bearings 726*a* and 725*b*, or alternatively, as the distance between the center of the first pair of ball bearings 725*a*, 726*a* and the center of the second pair of ball bearings 725*b*, 726*b*. The outbound OTM layout is used in Embodiments 3, 5, and 7, for example, described above with reference to TABLES 1 and 2.

Figure 7E:
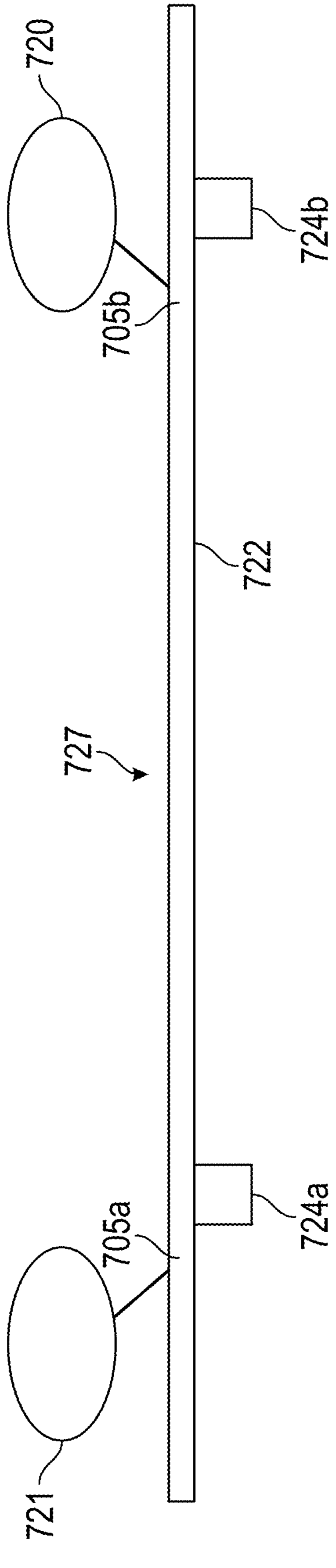
FIG. 7E shows a schematic view of a shaft using a two-bearing configuration.

As a further example, FIG. 7E conceptually shows a shaft 722 with a two-bearing configuration. This configuration employs a first bearing 724*a* positioned aft of the mounting point 705*a* for the booster 721, and a second bearing 724*b* positioned aft of the mounting point 705*b* for the low-pressure turbine 720. The length L for this two-bearing configuration is represented in some embodiments as the distance between the midpoints or centers of the bearings 724*a*, 724*b*. Alternative two-bearing configurations may position the two bearings in either an outbound configuration or an inbound configuration. An example of a two-bearing layout in an inbound configuration is shown in FIG. 1, that shows bearings 123*a*, 123*b*, 123*c*, and 123*d* are all located inbound of the mounting points for the booster 121 and the low-pressure turbine 120. Note that in this context, two is the number of bearings along the shaft 722, and does not include additional bearings along the circumference of the shaft 722. Embodiment 1, described above with reference to TABLE 1, uses a two-bearing layout in an outbound configuration (not shown).

In FIGS. 7A to 7E, the lines connecting the booster 721 to mounting point 705*a* and low-pressure turbine 720 to mounting point 705*b* are intended only to indicate schematically the general location of a net force of the core engine components (e.g., booster 721 or low-pressure turbine 720) acting on the shaft 722 relative to the bearings, and is illustrated in this fashion only for purposes of illustrating a relationship between the nearest engine component relative to the bearing(s). It will be understood that the actual loading on a shaft is distributed and comes from not only the engine components represented by booster 721 and low-pressure turbine 720, but other nearby structures as well. In these embodiments, the primary loading for purposes of this disclosure may, however, be thought of simply in terms of engine components attached to the shaft 722 (e.g., low-pressure turbine 720 and booster 721). It will be understood that the representation shown in FIGS. 7A to 7E is sufficient in defining the parts of the turbomachine that mostly influence the shaft 722 behavior.

As discussed, at least one bearing may have an overturning moment (OTM) capability, which can resist relative rotation across the bearing in at least a lateral plane or a vertical plane. These relative rotations may occur during bending of the shaft. The position along the shaft of such bearings with OTM capabilities may directly affect the critical speed, by providing constraints to the relative rotations of the shaft, in addition to the transverse support function of the bearings.

Examples of embodiments with different bearing arrangements are summarized in TABLE 3. Generally, the inventors found that the number of bearings, the position of the bearings and the OTM capability of the bearings can be selected to make a full range of operations subcritical for an engine. In other words, the selection of bearing layout can affect (either increase or decrease) the shaft's critical speed.

TABLE 3

| Embodiment | L (in) | D (in) | Bearing type | E/rho ($in^{-1}$) | Teff (in) | Mode (RPM) |
|---|---|---|---|---|---|---|
| 8 | 60.6 | 2.75 | 4-bearing straddle | 1.00E+08 | 0.35 | 7746 |
| 9 | 60.6 | 2.75 | 4-bearing straddle | 1.00E+08 | 0.32 | 8555 |
| 10 | 60.6 | 2.75 | 4-bearing straddle | 1.27E+08 | 0.35 | 8832 |
| 11 | 82.2 | 2.74 | 4-bearing straddle | 1.27E+08 | 0.32 | 9703 |
| 12 | 60.6 | 2.75 | inbound OTM | 1.27E+08 | 0.32 | 11386 |
| 13 | 82.2 | 2.74 | outbound OTM | 1.27E+08 | 0.32 | 7873 |

Embodiments 8, 9, 10, and 11 use a four-bearing straddle layout. Embodiments 8 and 9 use steel alloy, while Embodiments 10 and 11 use composite materials. Embodiments 8 and 10 have a uniform thickness profile, while Embodiments 9 and 11 have a concave thickness profile, manufactured using a bottle boring method. As a result of these differences, the shaft mode critical speed occurs at 7746 RPM for Embodiment 8, 8555 RPM for Embodiment 9, 8832 RPM for Embodiment 10, and 9703 RPM for Embodiment 11.

Embodiments 11, 12, and 13 all use composite material and concave thickness profile via bottle boring. However, Embodiment 11 uses a four-bearing straddle layout, Embodiment 12 uses an inbound OTM bearing layout, and Embodiment 13 uses an outbound OTM bearing layout. As a result of these differences, the shaft mode critical speed occurs at 9703 RPM for Embodiment 11, 11386 RPM for Embodiment 12, and 7873 RPM for Embodiment 13.

Embodiment 11 can also be compared to Embodiments 8, 9, and 10 as described with reference to TABLE 3. This allows a comparison of the impact on critical speed of using composite material, variable thickness profile, and both, on a shaft with a four-bearing straddle layout.

Embodiment 12 can be compared to Embodiments 2, 4, and 6 described with reference to TABLE 2. This allows a comparison of the impact on critical speed of using composite material, variable thickness profile, and both, on a shaft with an inbound OTM layout.

Embodiment 13 can be compared to Embodiments 3, 5, and 7 described with reference to TABLE 2. This allows a comparison of the impact on critical speed of using composite material, variable thickness profile, and both, on a shaft with an outbound OTM layout.

Additionally, Embodiments 2 and 3 (in TABLE 1), and 10 (in TABLE 3) can be compared, to evaluate the impact on critical speed of using different bearing layouts on shafts using composite material. Embodiments 6 and 7 (in TABLE 2) and 9 (in TABLE 3) can be compared, to evaluate the impact on critical speed of using different bearing layouts on shafts using concave thickness profiles.

The embodiments of turbomachine engines, and in particular the shafts associated with a power turbine described with reference to FIGS. 5A, 5B, 6A to 6C, 7A, and 7B, were found to provide an improvement in the performance of a shaft vis-à-vis its operating range. In addition to the mentioned embodiments and those provided in TABLES 1 to 3, the types of improvements to the critical speed of the shaft when these features were combined, taking into consideration the various benefits, as well as down-sides, to selecting a particular configuration for a turbomachine architecture.

Examples of a subcritical shaft with a high redline speed include a shaft with a redline speed of, e.g., 70 ft/sec and adapted for a shaft mode of 5293 RPM, a shaft with a redline speed of, e.g., 75 ft/sec and adapted for a shaft mode of 6380 RPM, and a shaft with a redline speed of, e.g., 181 ft/sec and adapted for a shaft mode of 11410 RPM.

FIGS. 8A to 13 illustrate various gas turbine engines. In the embodiments of FIGS. 8A to 13, the low-pressure shaft is supported within the engine with different bearing arrangements. The gas turbine engines of FIGS. 8A to 13 may include structure that is the same as, or similar to, the gas turbine engines described with respect to FIGS. 1 to 3 and the gas turbine engines may operate the same as, or similar, as the turbine engines described with respect to FIGS. 1 to 3. Accordingly, reference numerals are omitted from FIGS. 8A to 13 for clarity, but it is understood that features of similar appearance are the same as or similar to the like features shown in FIGS. 1 to 3. Although only one half of the gas turbine engine is shown in FIGS. 8A to 13, is its understood that a mirror image of the depicted half exists on the other side of the centerline axis (e.g., similar to the gas turbine engine 100 shown in FIG. 1).

Figure 8A:
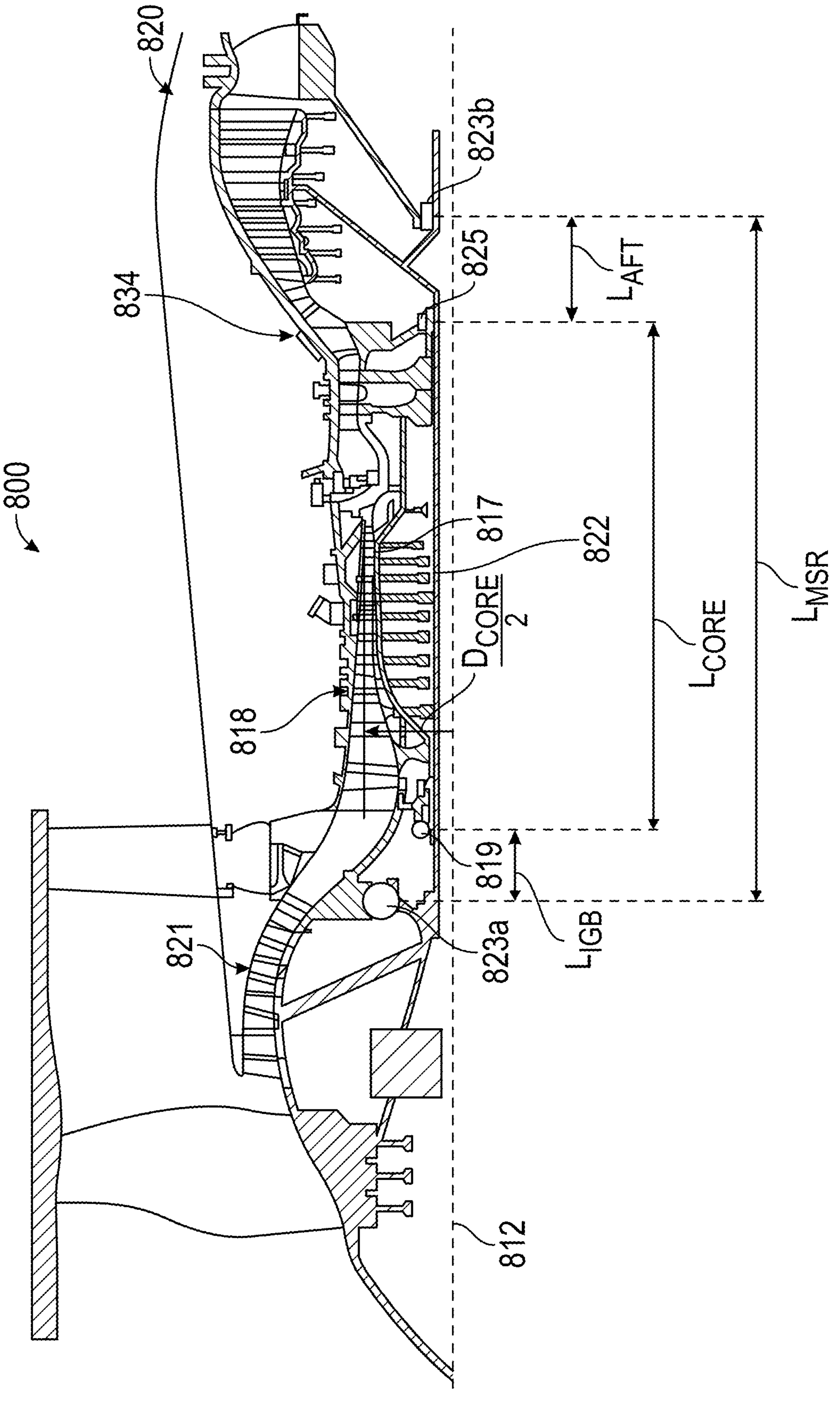
FIG. 8A shows a schematic, cross-sectional view, taken along a centerline axis, of a ducted gas turbine engine, according to the present disclosure.

FIG. 8A shows a cross-sectional view of an exemplary gas turbine engine 800 having a centerline axis 812. The gas turbine engine 800 includes a low-pressure compressor 821, a high-pressure compressor 818, a low-pressure turbine 820, and a high-pressure turbine 834. These features operate in the same manner as described with respect to FIGS. 1 to 3. A low-pressure shaft 822 (also referred to as a "low-speed shaft") extends between the low-pressure compressor 821 and the low-pressure turbine 820. Together, the high-pressure compressor 818, a combustor (e.g., any of the combustors or combustion sections detailed herein), and the high-pressure turbine 834 define an engine core.

The low-pressure shaft 822 is rotationally supported in the gas turbine engine 800 with one or more bearings. In the embodiment illustrated in FIG. 8A, the gas turbine engine 800 includes a first bearing 823*a* (also referred to in the art as "Brg 2"), a second bearing 819 (also referred to in the art as "Brg 3"), a third bearing 825 (also referred to in the art as "Brg 4"), and a fourth bearing 823*b* (also referred to in the art as "Brg 5"). The low-pressure shaft 822 is supported by one bearing on a forward side of the core engine (e.g., first bearing 823*a*) and one bearing on an aft side of the core engine (e.g., fourth bearing 823*b*). The high-pressure shaft is supported by the second bearing 819 on a forward side and the third bearing 825 on the aft side. The first bearing 823*a* and the second bearing 819 may be ball bearings, although other types of bearings or rotational supports are contemplated. The third bearing 825 and the fourth bearing 823*b* may be roller bearings, although other types of bearings or rotational supports are contemplated. Although shown as a single bearing at each location, the bearings may be a plurality of bearings. For example, the bearing 823*a* could comprise two axially spaced bearings.

In FIG. 8A, the length LMSR is the length of the low-pressure shaft 822 employed in relationship (1) (below) to determine the midshaft rating of the low-pressure shaft 822. The length LMSR is defined between the inboard low-pressure shaft forward bearing (e.g., the first bearing 823*a*) and the inboard low-pressure shaft aft bearing (e.g., the fourth bearing 823*b*). The length LMSR is the lateral distance, parallel to the centerline axis 812, defined between midpoints of the first bearing 823*a* and the fourth bearing 823*b*.

The length LIGB is the length from the inboard low-pressure shaft forward bearing (e.g., the first bearing 823*a*) to the core forward bearing (e.g., the second bearing 819). The length $L_{IGB}$ is the lateral distance, parallel to the centerline axis 812, defined between midpoints of the first bearing 823*a* and the second bearing 819.

The length $L_{CORE}$ is the length of the engine core (e.g., the length including the high-pressure compressor 818, the combustor, and the high-pressure turbine 834). The length $L_{CORE}$ is defined between the core forward bearing (e.g., the second bearing 819) and the core aft bearing (e.g., the third bearing 825). The length $L_{CORE}$ is the lateral distance, parallel to the centerline axis 812, defined between midpoints of the second bearing 819 and the third bearing 825.

The length $L_{AFT}$ is the length from aft of the core to the inboard low-pressure shaft aft bearing (e.g., the fourth bearing 823*b*). The length $L_{AFT}$ is the lateral distance, parallel to the centerline axis 812, defined between midpoints of the third bearing 825 and the fourth bearing 823*b*.

The core diameter $D_{CORE}$ represents the diameter of the engine core. The diameter $D_{CORE}$ is defined by the outer diameter of the exit from a last stage 817 of the high-pressure compressor 818. The radius of the core is shown in FIG. 8A as $D_{CORE}/2$.

Figure 8B:
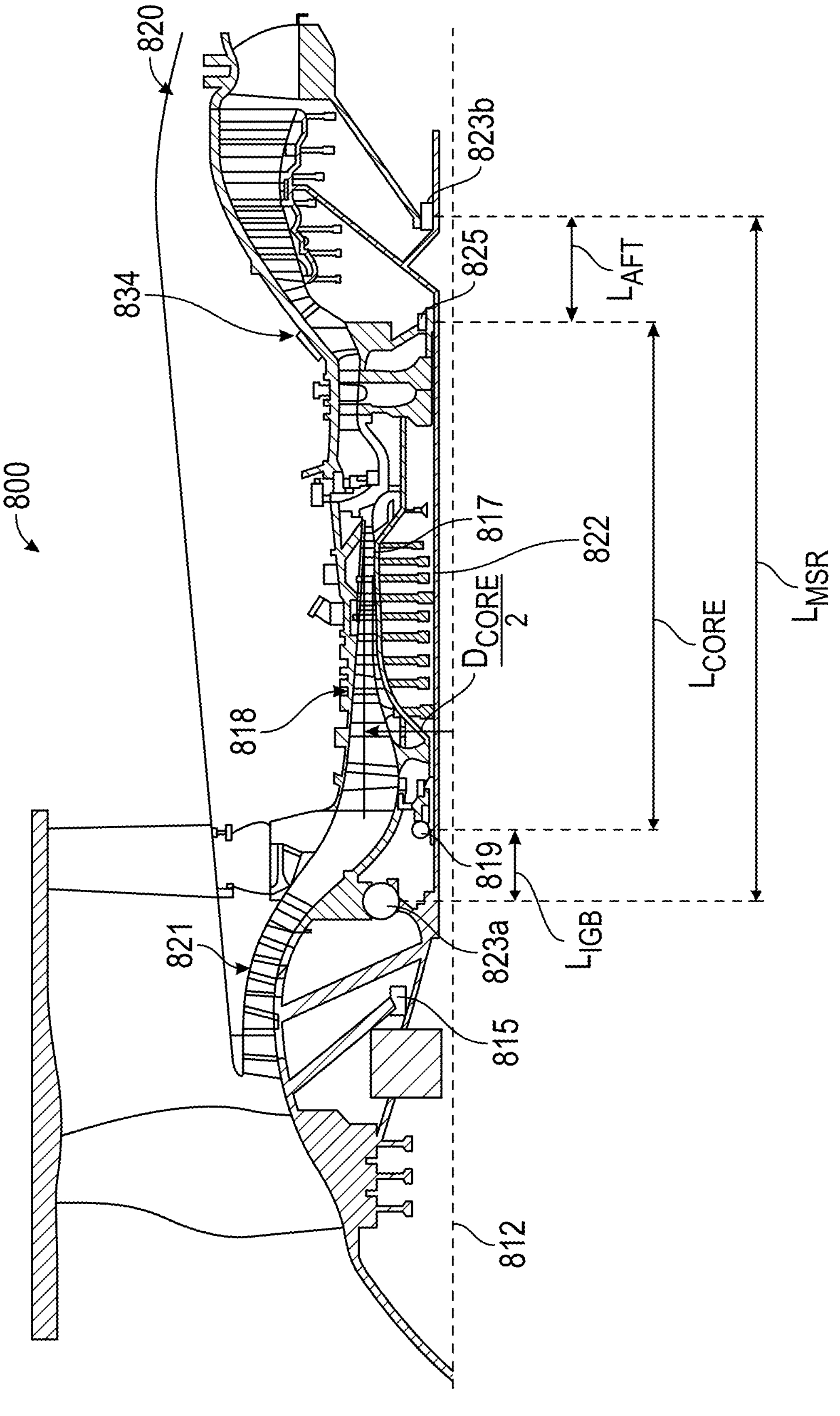
FIG. 8B shows a schematic, cross-sectional view, taken along a centerline axis, of a ducted gas turbine engine, according to the present disclosure.

FIG. 8B shows a cross-sectional view of the exemplary gas turbine engine of FIG. 8A with the addition of a second forward bearing (e.g., an additional bearing 815) on the low-pressure shaft 822. The additional bearing 815 may be a roller bearing and the first bearing 823*a* may be a ball bearing. In this arrangement, the low-pressure shaft has two bearings forward of the core (e.g., first bearing 823*a* and additional bearing 815) and one bearing aft of the core (e.g., bearing 823*b*).

Figure 9:
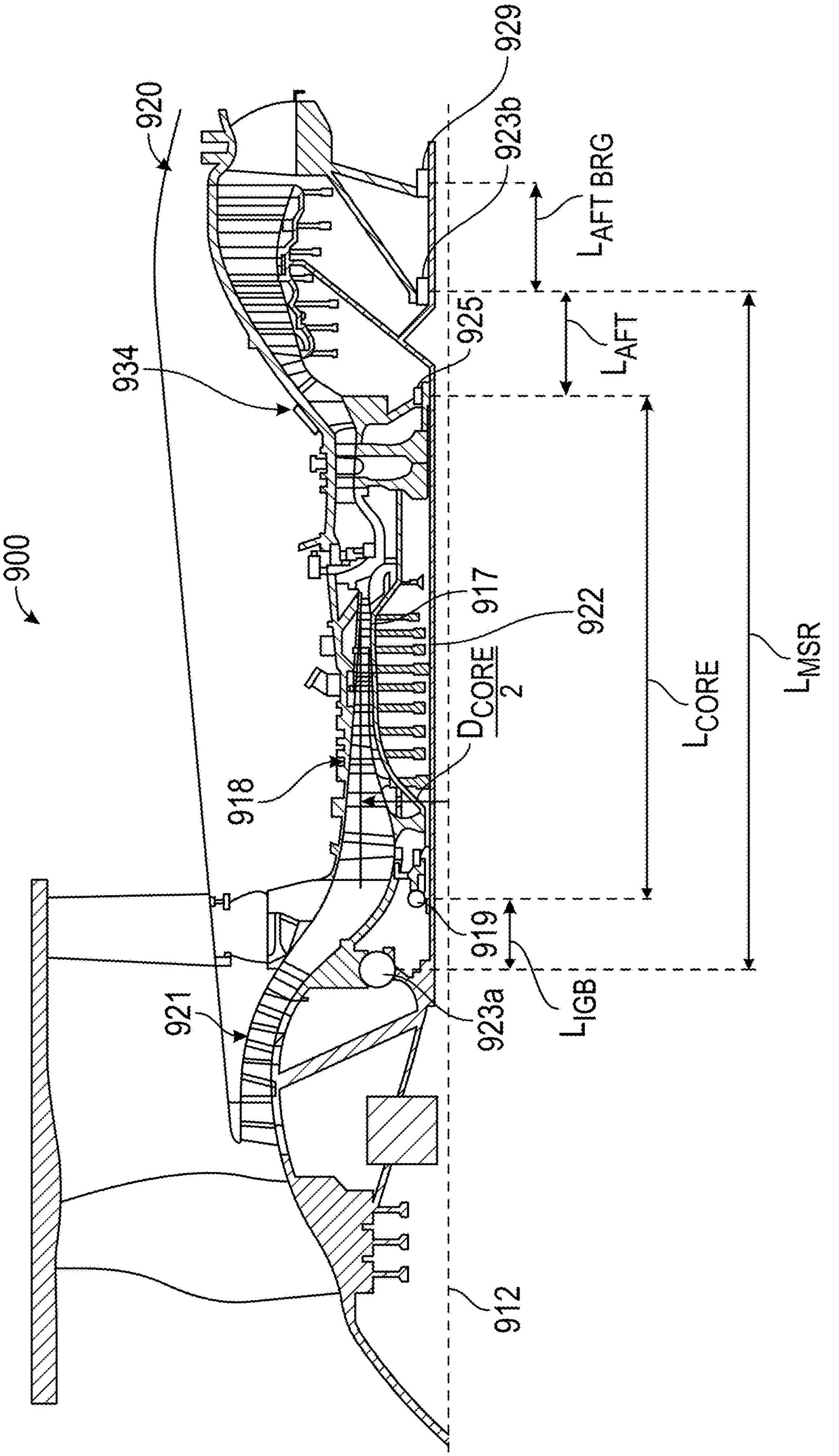
FIG. 9 shows a schematic, cross-sectional view, taken along a centerline axis, of a ducted gas turbine engine, according to the present disclosure.

FIG. 9 shows a cross-sectional view of an exemplary gas turbine engine 900 having a centerline axis 912. The gas turbine engine 900 includes a low-pressure compressor 921, a high-pressure compressor 918, a low-pressure turbine 920, and a high-pressure turbine 934. These features operate in the same manner as described with respect to FIGS. 1 to 3. A low-pressure shaft 922, (also referred to as a "low-speed shaft"), extends between the low-pressure compressor 921 and the low-pressure turbine 920. Together, the high-pressure compressor 918, a combustor (e.g., any of the combustors or combustion sections detailed herein), and the high-pressure turbine 934 define an engine core.

The low-pressure shaft 922 is rotationally supported in the gas turbine engine 900 with one or more bearings. In the embodiment illustrated in FIG. 9, the gas turbine engine 900 includes a first bearing 923*a* (also referred to in the art as "Brg 2"), a second bearing 919 (also referred to in the art as "Brg 3"), a third bearing 925 (also referred to in the art as "Brg 4"), a fourth bearing 923*b* (also referred to in the art as "Brg 5"), and a fifth bearing 929 (also referred to in the art as "Brg 6"). The low-pressure shaft 922 is supported by one bearing on the forward side of the core (e.g., first bearing 923*a*) and two bearings on the aft side of the core (e.g., fourth bearing 923*b* and fifth bearing 929). The high-pressure shaft is supported by the second bearing 919 on a forward side and the third bearing 925 on the aft side. The first bearing 923*a* and the second bearing 919 may be ball bearings, although other types of bearings or rotational supports are contemplated. The third bearing 925, the fourth bearing 923*b*, and the fifth bearing 929 may be roller bearings, although other types of bearings or rotational supports are contemplated.

In FIG. 9, the length $L_{MSR}$ is the length of the low-pressure shaft 922 employed in relationship (1) (below) to determine the midshaft rating of the low-pressure shaft 922. The length $L_{MSR}$ is defined between the inboard low-pressure shaft forward bearing (e.g., the first bearing 923*a*) and the inboard low-pressure shaft aft bearing (e.g., the fourth bearing 923*b*). The length $L_{MSR}$ is the lateral distance, parallel to the centerline axis 912, defined between midpoints of the first bearing 923*a* and the fourth bearing 923*b*.

The length $L_{IGB}$ is the length from the inboard low-pressure shaft forward bearing (e.g., the first bearing 923*a*) to the core forward bearing (e.g., the second bearing 919). The length $L_{IGB}$ is the lateral distance, parallel to the centerline axis 912, defined between midpoints of the first bearing 923*a* and the second bearing 919.

The length $L_{CORE}$ is the length of the engine core (e.g., the length including the high-pressure compressor 918, the combustor, and the high-pressure turbine 934). The length $L_{CORE}$ is defined between the core forward bearing (e.g., the second bearing 919) and the core aft bearing (e.g., the third bearing 925). The length $L_{CORE}$ is the lateral distance, parallel to the centerline axis 912, defined between midpoints of the second bearing 919 and the third bearing 925.

The length $L_{AFT}$ is the length from aft of the core to the inboard low-pressure shaft aft bearing (e.g., the fourth bearing 923*b*). The length $L_{AFT}$ is the lateral distance, parallel to the centerline axis 912, defined between midpoints of the third bearing 925 and the fourth bearing 923*b*.

The length $L_{AFT\ BRG}$ is the length from the inboard low-pressure shaft aft bearing (e.g., the fourth bearing 923*b*) to an aftmost bearing (e.g., the fifth bearing 929). The length $L_{AFT\ BRG}$ is the lateral distance, parallel to the centerline axis 912, defined between midpoints of the fourth bearing 923*b* and the fifth bearing 929.

Figure 10:
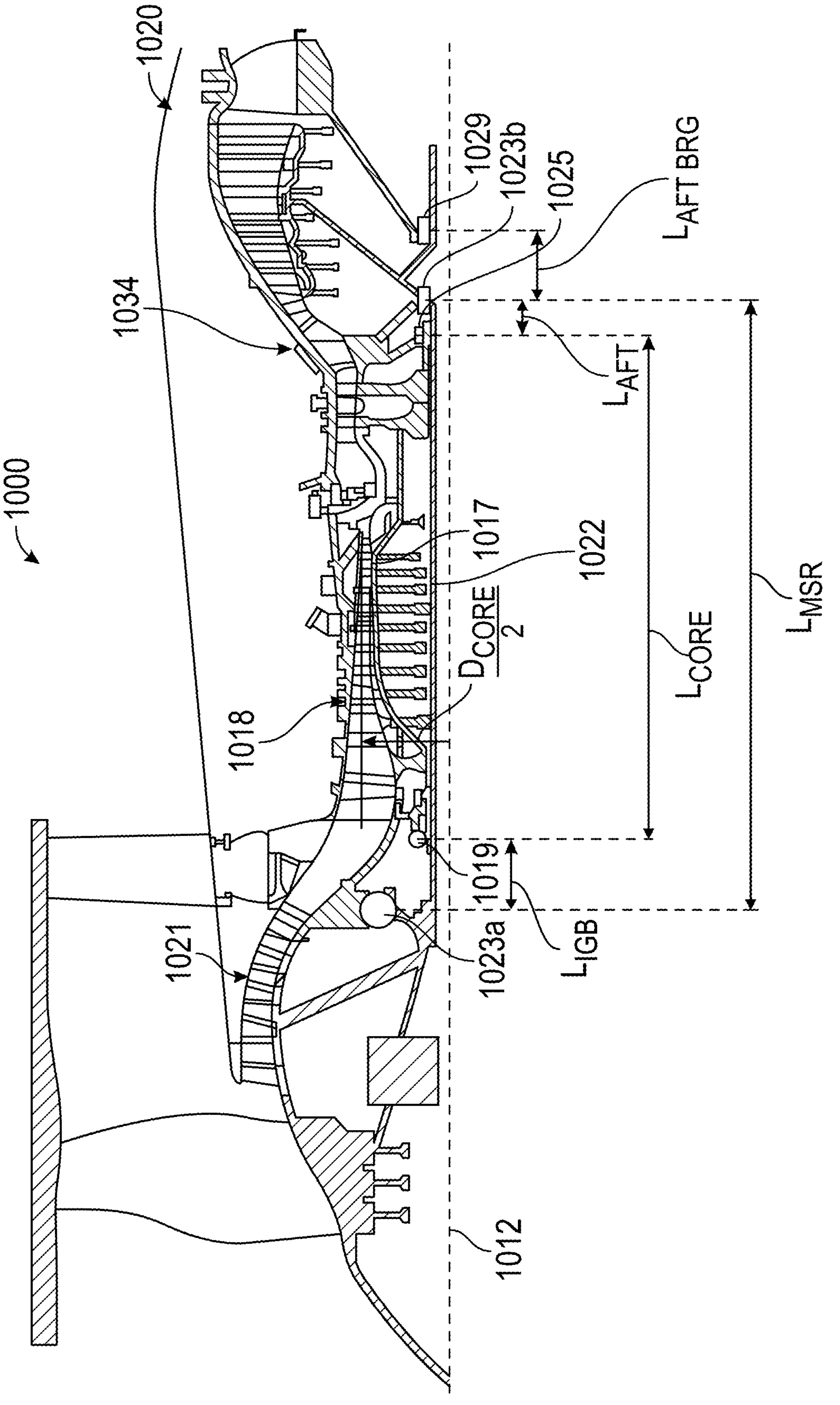
FIG. 10 shows a schematic, cross-sectional view, taken along a centerline axis, of ducted a gas turbine engine, according to the present disclosure.

The core diameter $D_{CORE}$ represents the diameter of the engine core. The diameter $D_{CORE}$ is defined by the outer diameter of the exit from a last stage 917 of the high-pressure compressor 918. The radius of the core is shown in FIG. 9 as $D_{CORE}/2$, FIG. 10 shows a cross-sectional view of an exemplary gas turbine engine 1000 having a centerline axis 1012. The gas turbine engine 1000 includes a low-pressure compressor 1021, a high-pressure compressor 1018, a low-pressure turbine 1020, and a high-pressure turbine 1034. These features operate in the same manner as described with respect to FIGS. 1 to 3. A low-pressure shaft 1022, (also referred to as a "low-speed shaft"), extends between the low-pressure compressor 1021 and the low-pressure turbine 1020. Together, the high-pressure compressor 1018, a combustor (e.g., any of the combustors or combustion sections detailed herein), and the high-pressure turbine 1034 define an engine core.

The low-pressure shaft 1022 is rotationally supported in the gas turbine engine 1000 with one or more bearings. In the embodiment illustrated in FIG. 10, the gas turbine engine 1000 includes a first bearing 1023*a* (also referred to in the art as "Brg 2"), a second bearing 1019 (also referred to in the art as "Brg 3"), a third bearing 1025 (also referred to in the art as "Brg 4"), a fourth bearing 1023*b* (also referred to in the art as "Brg 5"), and a fifth bearing 1029 (also referred to in the art as "Brg 6"). The low-pressure shaft 1022 is supported by one bearing on the forward side of the core (e.g., first bearing 1023*a*) and two bearings on the aft side of the core (e.g., fourth bearing 1023*b* and fifth bearing 1029), where the two aft bearings are straddled as shown in FIG. 10. The high-pressure shaft is supported by the second bearing 1019 on a forward side and the third bearing 1025 on the aft side. The first bearing 1023*a* and the second bearing 1019 may be ball bearings, although other types of bearings or rotational supports are contemplated. The third bearing 1025, the fourth bearing 1023*b*, and the fifth bearing 1029 may be roller bearings, although other types of bearings or rotational supports are contemplated.

In FIG. 10, the length $L_{MSR}$ is the length of the low-pressure shaft 1022 employed in relationship (1) (below) to determine the midshaft rating of the low-pressure shaft 1022. The length $L_{MSR}$ is defined between the inboard low-pressure shaft forward bearing (e.g., the first bearing 1023*a*) and the inboard low-pressure shaft aft bearing (e.g., the fourth bearing 1023*b*). The length $L_{MS}$R is the lateral distance, parallel to the centerline axis 1012, defined between midpoints of the first bearing 1023*a* and the fourth bearing 1023*b*.

The length $L_{IGB}$ is the length from the inboard low-pressure shaft forward bearing (e.g., the first bearing 1023*a*) to the core forward bearing (e.g., the second bearing 1019). The length $L_{IGB}$ is the lateral distance, parallel to the centerline axis 1012, defined between midpoints of the first bearing 1023*a* and the second bearing 1019.

The length $L_{CORE}$ is the length of the engine core (e.g., the length including the high-pressure compressor 1018, the combustor, and the high-pressure turbine 1034). The length $L_{CORE}$ is defined between the core forward bearing (e.g., the second bearing 1019) and the core aft bearing (e.g., the third bearing 1025). The length $L_{CORE}$ is the lateral distance, parallel to the centerline axis 1012, defined between midpoints of the second bearing 1019 and the third bearing 1025.

The length $L_{AFT}$ is the length from aft of the core to the inboard low-pressure shaft aft bearing (e.g., the fourth bearing 1023*b*). The length $L_{AFT}$ is the lateral distance, parallel to the centerline axis 1012, defined between midpoints of the third bearing 1025 and the fourth bearing 1023*b*.

The length $L_{AFT\ BRG}$ is the length from the inboard low-pressure shaft aft bearing (e.g., the fourth bearing 1023*b*) to an aftmost bearing (e.g., the fifth bearing 1029). The length $L_{AFT\ BRG}$ is the lateral distance, parallel to the centerline axis 1012, defined between midpoints of the fourth bearing 1023*b* and the fifth bearing 1029.

The core diameter $D_{CORE}$ represents the diameter of the engine core. The diameter $D_{CORE}$ is defined by the outer diameter of the exit from a last stage 1017 of the high-pressure compressor 1018. The radius of the core is shown in FIG. 10 as $D_{CORE}/2$.

Figure 11:
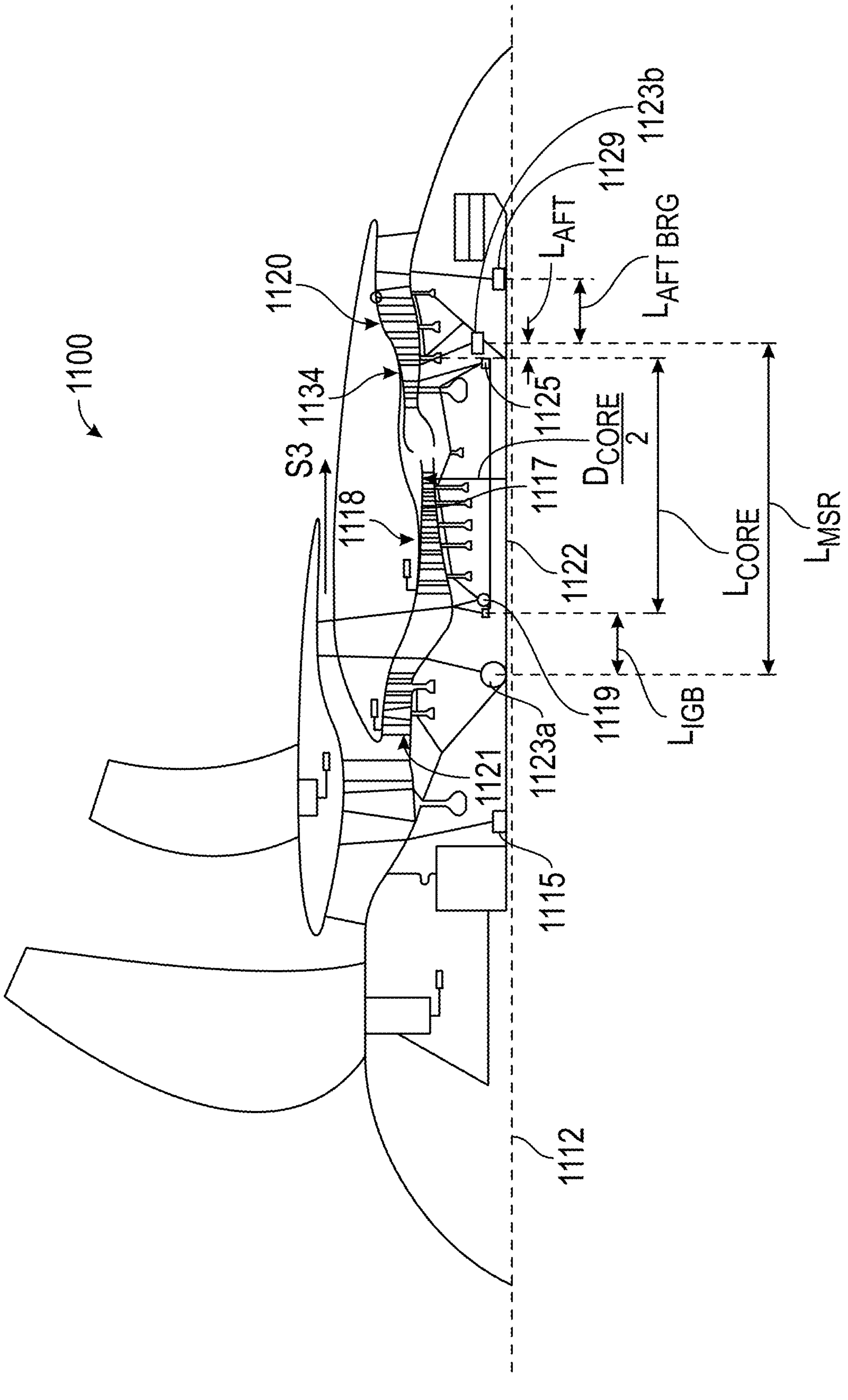
FIG. 11 shows a schematic view, taken along a centerline axis, of an unducted gas turbine engine, according to the present disclosure.

FIG. 11 shows a schematic view of an exemplary gas turbine engine 1100 having a centerline axis 1112. The gas turbine engine 1100 includes a low-pressure compressor or booster 1121, a high-pressure compressor 1118, a low-pressure turbine 1120, and a high-pressure turbine 1134. These features operate in the same manner as described with respect to FIGS. 1 to 3. In particular, the gas turbine engine 1100 is a three-stream, open fan engine, similar to the gas turbine engine of FIG. 3. A low-pressure shaft 1122, (also referred to as a "low-speed shaft"), extends between the low-pressure compressor 1121 and the low-pressure turbine 1120. Together, the high-pressure compressor 1118, a combustor (e.g., any of the combustors or combustion sections detailed herein), and the high-pressure turbine 1134 define an engine core.

The low-pressure shaft 1122 is rotationally supported in the gas turbine engine 1100 with one or more bearings. In the embodiment illustrated in FIG. 10, gas turbine engine 1100 includes a first bearing 1123*a* (also referred to in the art as "Brg 2"), a second bearing 1119 (also referred to in the art as "Brg 3"), a third bearing 1125 (also referred to in the art as "Brg 4"), a fourth bearing 1123*b* (also referred to in the art as "Brg 5"), and a fifth bearing 1129 (also referred to in the art as "Brg 6"). The low-pressure shaft 1122 is supported by two bearings on the forward side of the core (e.g., the first bearing 1123*a* and a six bearing 1115 forward of the first bearing 1123*a*) and two bearings on the aft side of the core (e.g., the fourth bearing 1123*b* and the fifth bearing 1129). The high-pressure shaft is supported by the second bearing 1119 on a forward side and the third bearing 1125 on the aft side. The first bearing 1123*a* and the second bearing 1119 may be ball bearings, although other types of bearings or rotational supports are contemplated. The third bearing 1125, the fourth bearing 1123*b*, and the fifth bearing 1129 may be roller bearings, although other types of bearings or rotational supports are contemplated.

In FIG. 11, the length $L_{MSR}$ is the length of the low-pressure shaft 1122 employed in relationship (1) (below) to determine the midshaft rating of the low-pressure shaft 1122. The length $L_{MSR}$ is defined between the inboard low-pressure shaft forward bearing (e.g., the first bearing 1123*a*) and the inboard low-pressure shaft aft bearing (e.g., the fourth bearing 1123*b*). The length $L_{MSR}$ is the lateral distance, parallel to the centerline axis 1112, defined between midpoints of the first bearing 1123*a* and the fourth bearing 1123*b*.

The length $L_{IGB}$ is the length from the inboard low-pressure shaft forward bearing (e.g., the first bearing 1123*a*) to the core forward bearing (e.g., the second bearing 1119). The length $L_{IGB}$ is the lateral distance, parallel to the centerline axis 1112, defined between midpoints of the first bearing 1123*a* and the second bearing 1119. This space is typically needed for the engine's accessory gearbox that is coupled to the high-pressure (HP) shaft.

The term "IGB" refers to the inlet gearbox to drive the core to start the engine, run pumps or other accessories. Referring to FIGS. 8A to 11, the location of the first bearing 823*a*, 923*a*, 1023*a*, and 1123*a* relative to the second bearing 819, 919, 1019, and 1119 may also be chosen for reasons isolating, or reducing a dynamic coupling between vibration modes of the LP shaft (i.e., bending mode excited between the LP shaft rotates at its critical speed) and modes associated with other components supported by a separate frame from, or the same frame supporting the core. For example, referring to FIG. 11, coupling between a modal property of the frame supporting the mid-fan (located directly below the outlet guide vanes) and the modal property of the LP shaft may excite the LP shaft when the engine operates at certain speeds. The distance $L_{IGB}$ distance may also be affected when stages are added or removed from the booster (e.g., booster 1121) and/or when the outlet guide vanes are moved closer or further away from the primary fan. The $L_{IGB}$ distance may also increase relative to the HPC front end in order to align the forward bearing (e.g., first bearing 1123*a*) more closely with the axial center of gravity of the frame supporting the booster and OGV. The core is normally supported by a separate frame from the frames that supports the fan, gearbox and booster. In some embodiments the first bearing 1123*a* and the second bearing 1119 may be located so as to provide direct support for both a center frame (supporting the core) and a forward frame (supporting, e.g., the booster).

The length $L_{CORE}$ is the length of the engine core (e.g., the length including the high-pressure compressor 1118, the combustor, and the high-pressure turbine 1134). The length $L_{CORE}$ is defined between the core forward bearing (e.g., the second bearing 1119) and the core aft bearing (e.g., the third bearing 1125). The length $L_{CORE}$ is the lateral distance, parallel to the centerline axis 1112, defined between midpoints of the second bearing 1119 and the third bearing 1125.

The length $L_{AFT}$ is the length from aft of the core to the inboard low-pressure shaft aft bearing (e.g., the fourth bearing 1123*b*). The length $L_{AFT}$ is the lateral distance, parallel to the centerline axis 1112, defined between midpoints of the third bearing 1125 and the fourth bearing 1123*b*. The length $L_{AFT\ BRG}$ is the length from the inboard low-pressure shaft aft bearing (e.g., the fourth bearing 1123*b*) to an aftmost bearing (e.g., the fifth bearing 1129). The length $L_{AFT\ BRG}$ is the lateral distance, parallel to the centerline axis 1112, defined between midpoints of the fourth bearing 1123*b* and the fifth bearing 1129. The bearing distances $L_{AFT}$ and $L_{AFT\ BRG}$ may be affected by the number of stages in the LPT. If a stage is added then the distances aftwards of $L_{AFT}$ and/or $L_{AFT\ BRG}$ from the HPT aft end may increase given the increased weight and support needed for additional stages, e.g., 3 to 4 stages, or 4 to 5 stages. Additionally, the bearings 1023*b*, 929 and 1123*b* in the embodiments of FIGS. 9 to 11 may be desired for higher speed L P shafts. The additional bearing can add a dampening effect to the LP shaft primary mode, or otherwise influence the mode shape so that its deflection at resonance is reduced. The bearing distances $L_{AFT}$ and $L_{AFT\ BRG}$ may be affected by the presence of an electric machine (e.g., the electric machine 390 described with respect to FIG. 3) coupled to the low-pressure shaft. The electric machine may increase the weight on the low-pressure shaft and, thus, increase the load that the bearings on the low-pressure shaft need to support and may also affect the frequency of the low-pressure shaft. Thus, the bearing distances $L_{AFT}$ and $L_{AFT\ BRG}$ are affected by the additional load from the electric machine. For example, in embodiments with an electric machine near an aft portion of the core, the bearing distances may increase or decrease in a direction further aft or further forward compared to embodiments without an electric machine, depending on the particular location of the electric machine within the engine. That is, the location of the bearings may be moved to a location more forward or more aft as compared to embodiments without an electric machine.

The core diameter $D_{CORE}$ represents the diameter of the engine core. The diameter $D_{CORE}$ is defined by the outer diameter of the exit from a last stage 1117 of the high-pressure compressor 1118. The radius of the core is shown in FIG. 11 as $D_{CORE}/2$.

Figure 12:
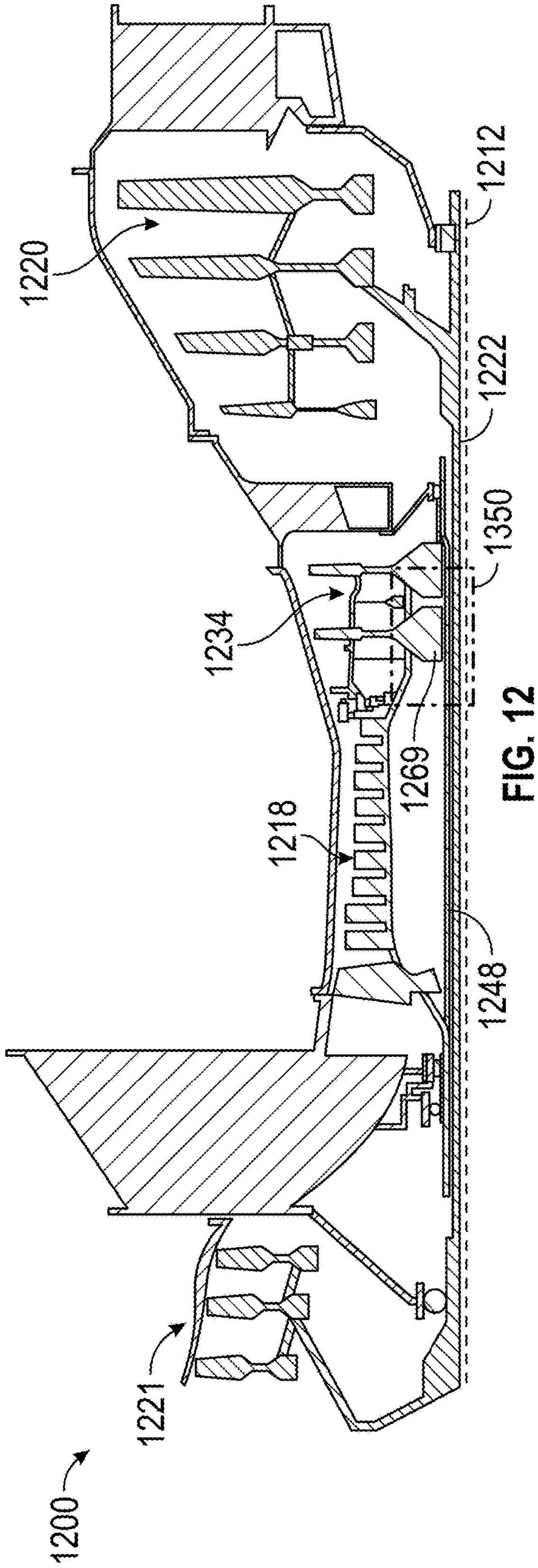
FIG. 12 shows a schematic, partial cross-sectional view, taken along a centerline axis, of a gas turbine engine, according to the present disclosure.

FIG. 12 shows a partial cross-sectional view of an exemplary gas turbine engine 1200 having a centerline axis 1212. The gas turbine engine 1200 includes a low-pressure compressor 1221, a high-pressure compressor 1218, a low-pressure turbine 1220, and a high-pressure turbine 1234. Together, the high-pressure compressor 1218, a combustor (e.g., any of the combustors or combustion sections detailed herein), and the high-pressure turbine 1234 define an engine core. These features operate in the same manner as described with respect to FIGS. 1 to 3. A low-pressure shaft 1222, (also referred to as a "low-speed shaft"), extends between the low-pressure compressor 1221 and the low-pressure turbine 1220. A high-pressure shaft 1248 (also referred to as a "high-speed shaft") is supported by bearings and connects the high-pressure compressor 1218 and the high-pressure turbine 1234. As shown and previously described the high-pressure turbine 1234 includes one or more stages, represented by high-pressure turbine stage 1269.

Figure 13:
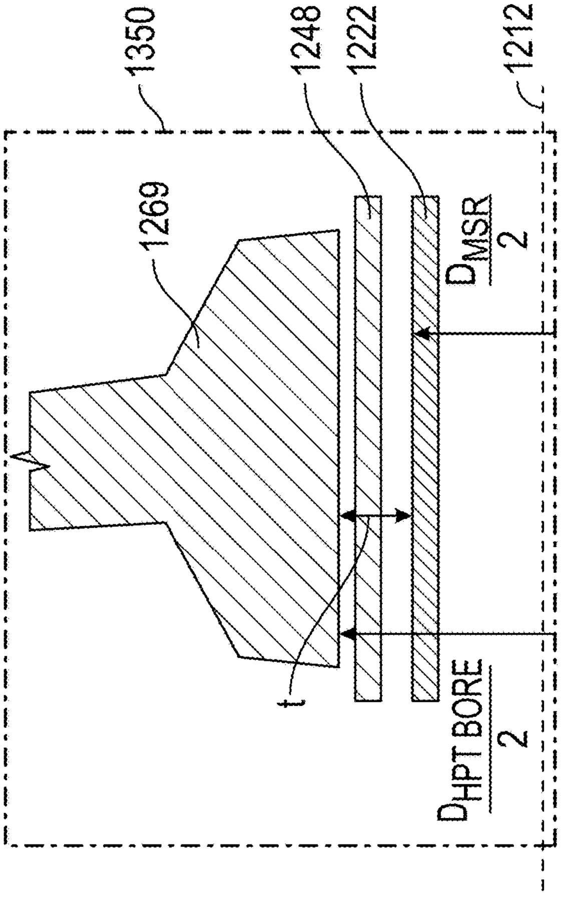
FIG. 13 shows an enlarged cross-sectional view of a portion of the gas turbine engine of FIG. 12, according to the present disclosure.

FIG. 13 illustrates a cross-sectional detailed view 1350 of the high-pressure turbine stage 1269 of FIG. 12. In the example of FIGS. 12 and 13, the high-pressure turbine 1234 has a core diameter $D_{HPT\ BORE}$ defined by an inner diameter of the turbine stage 1269. The radius of the turbine stage 1269 is illustrated in FIG. 13 from the centerline axis 1212 to the high-pressure turbine stage 1269, and represented as $D_{HPT\ BORE}/2$. The low-pressure shaft 1222 has a diameter $D_{MSR}$ that is defined by an outer diameter of the low-pressure shaft 1222. The radius of the low-pressure shaft 1222 is illustrated in FIG. 13 from the centerline axis 1212 to the outer diameter of the low-pressure shaft 1222, and represented as $D_{MSR}/2$. The diameter $D_{MSR}$ is the diameter employed in relationship (1) to determine the midshaft rating of the low-pressure shaft 1222. The difference between $D_{HPT\ CORE}$ and $D_{MSR}$ define an intershaft thickness t.

As mentioned earlier, the inventors sought to improve upon the operating speed of a low-speed shaft, also referred to as the low-pressure shaft. With regard to the speed of the low-speed shaft, consideration was given not simply to those factors affecting the low-pressure shaft, but also to factors considering the engine core of the engine, such as, the length of the engine core, the diameter of the engine core, the material of the components within the engine, the number of stages present in the high-pressure compressor, low-pressure compressor, high-pressure turbine, low-pressure turbine, and the location of bearings. In contrast to existing gas turbine engines requiring lower speeds, embodiments considered presented challenges in determining how the low-speed shaft speed could be increased without operating at or near a critical speed, for at least sustained periods of time or during standard flight periods (i.e., takeoff or max thrust).

Further, a selection of power turbine shaft and bearing arrangements, and location of those bearings for a turbomachine takes into consideration other factors, some of which can limit the selection of a shaft. The inventors however realized during the course of making the several embodiments referred to in the foregoing that there is a particular range of designs, constraints on feasible designs that provided an unexpected benefit. The interplay between components can make it particularly difficult to select or develop one component during engine design and prototype testing, especially when some components are at different stages of completion. For example, one or more components may be nearly complete, yet one or more other components may be in an initial or preliminary phase where only one (or a few) design parameters are known. It is desired to arrive at what is possible at an early stage of design, so that the down selection of candidate optimal designs, given the tradeoffs, become more possible. Heretofore the process has sometimes been more ad hoc, selecting one design or another without knowing the impact when a concept is first taken into consideration.

Even taken separately from the integration of a shaft design with the rest of an engine, modifying an existing shaft to increase its critical speed is challenging, and the impact of the different types of improvements and configurations on critical speed is not easily predictable without empirical experimentation and simulation, which can be enormously expensive and time-consuming. In some cases, a modification may even result in lowering the critical speed.

It is desirable to narrow the range of configurations or combination of features that can yield favorable results given the constraints of the design, feasibility, manufacturing, certification requirements, etc. early in the design selection process to avoid wasted time and effort. During the course of the evaluation of different embodiments as set forth above, the inventors discovered, unexpectedly, that there exists a relationship between the critical speed of the shaft and the ratio L/D (also referred to as LMSR/DMSR), which uniquely identifies a finite and readily ascertainable (in view of this disclosure) number of embodiments suitable for a particular architecture that can avoid a supercritical or critical shaft situation during normal operation of an engine. This relationship is referred to by the inventors as the midshaft rating (MSR), and is calculated according to the following relationship (1) between length, diameter and a redline speed (ft/sec) measured at the outer diameter of the shaft:

$$\text{Midshaft Rating } MSR=(L_{MSR}/D_{MSR})(\text{Shaft } OD \text{ Speed at redline})^{1/2} \quad (1)$$

LMSR/DMSR is shaft length divided by effective shaft outer diameter. The ratio LMSR/DMSR is multiplied with the square root of the outer diameter (OD) rotation speed (OD Speed) at the redline speed for the engine architecture. Generally, the length LMSR and diameter DMSR are expressed in inches, and the shaft OD redline speed is the linear speed of the shaft surface. The OD redline speed in feet per second is calculated as the shaft mode speed (in RPM) multiplied by the outer circumference of the shaft (the outer diameter of the shaft multiplied by the number π), and with additional corrections to convert from inches to feet and from minutes to seconds. Accordingly, the midshaft rating has units of (velocity)1/2.

The midshaft rating identifies embodiments for a turbomachine's power turbine that allow subcritical operation of the engine for a rated redline speed. TABLE 5 lists embodiments of the turbine shaft along with its associated MSR value. The embodiments can inform one of the dimensions or qualities of the shaft that are believed reasonable and practical for a shaft according to its basic features and the intended, rated critical speed. In other words, the midshaft rating, and, optionally, the LMSR/DMSR ratio and/or the OD speed at redline, indicates the operating ranges of interest, taking into account the constraints within which a turbomachine operates, e.g., size, dimensions, cost, mission requirements, airframe type, etc.

In other embodiments, the midshaft rating may also, or alternatively, be used to define the propulsive system operating at a relatively high redline speed. Such things as the requirements of a propulsive system, the requirements of its subsystem(s), airframe integration needs and limitations, and performance capabilities may, therefore, be summarized or defined by the midshaft rating.

In still other embodiments, the midshaft rating may additionally provide a particularly useful indication of the efficiency and effectiveness of the engine during initial development, e.g., as a tool to accept or reject a particular configuration. Thus, the midshaft rating can be used, for example, to guide low-speed shaft development. Therefore, the midshaft rating can also improve the process of developing a turbomachine engine.

As mentioned earlier, next generation gas turbine engine cores are expected to operate at higher power densities, which can include a same level of power output as exists in current engines, but using a lighter weight core. A reduced weight core includes components coupled through the high speed shaft, which are the high-pressure compressor (HPC) and the high-pressure turbine (HPT). A higher power density will also mean higher engine operating temperatures, particularly at the HPC exit stage, combustor exit, HPT nozzle exit, and LPT. These changes in power density also result in changes in core size (length, width, bore heights, etc.) and in some cases significant changes in core weight, such as when a CMC material is used for core components. As such, it is desirable to assess the impact that next generation cores operating at higher power density can have on engine dynamics (e.g., dynamics of the LP shaft, the HP shaft, and/or a gearbox of the engine).

These changes in engine core size and weight effects not only the dynamic behavior of the HP shaft, but also can significantly influence the dynamic behavior of the LP shaft, e.g., the critical speed, that results in undesired vibrations. Likewise, the dynamic behavior of the LP shaft can influence the dynamics of the HP shaft. Dynamic excitation of natural modes/frequencies of these two shafts, while decoupled in rotation from each other, nonetheless can interact and amplify each other's natural modes of vibration via load paths through their respective supporting bearings.

The inventors sought to arrive at an engine architecture that has acceptable dynamic behavior at redline, cruise and maximum thrust operating conditions when a higher power density core is installed in the engine, including whether the LP shaft can operate at a subcritical speed at redline when the higher power density core is used. Several engine architectures were evaluated to determine whether changes reflecting a higher power density core would cause unacceptable vibration for either or both of the HP shaft and the LP shaft. The core weights and sizes reflect improved performance from the general perspective of a reduced Specific Fuel Consumption (SFC), but could also create unanticipated or unmanageable dynamic excitation when the LP shaft and the HP shaft are operated at high speeds. It was necessary therefore to study the impacts on MSR and related critical dynamics for variations in such things as HPC stages to raise the overall pressure ratio of the gas entering the combustion chamber, and/or an increased number of stages for the HPT, the overall length of the LP shaft accounting for other changes in the engine cross-section affected by changes in the HPC and/or HPT, and the impact on stiffness and weight when advanced material such as CMC material is used in the core.

Changes to these aspects of the core influence, not only an overall length, weight, and size of the HPC and HPT, but also placement of shaft-supporting bearings and accessories. Changes in the core affect placement of other engine components encased within a core cowl. Thus, examining the effects of, e.g., adding an additional HPC stage, require an understanding of adjacent engine components that need to accommodate an increased length of the core. To date, acceptable designs vs. unacceptable core design practice (from the perspective of structural dynamics) have often involved an iterative process involving design on experiment studies where many variations on architecture design are considered, with the hope that one of the variations might provide the desired configuration satisfying both core performance and dynamic stability for both the HP shaft and LP shaft. After consideration of several embodiments of a next generation engine core having between 8 and 11 stages for an HPC and 1 to 2 stages for an HPT, as well as different material (e.g., CMC material, Ni superalloys) each requiring different bearing placements relative to the core, it was found there are relationships between the length of the core, bearing supports at each end and $L_{MSR}$ for each of the foregoing modifications to a core that produces a good approximation for the dynamic behavior of the engine. These relationships define the dynamic behaviors of the HP shaft and LP shaft in terms of factors attributable to a higher power density core, enabling the inventors to arrive at an improved engine design, one that took into account the often competing interests between dynamic stability and achieving a more compact and higher power density core.

With reference back to FIGS. 8A to 11, the LP shaft 822 length from the forward bearing 823*a* to the aft bearing 823*b*, i.e., $L_{MSR}$, can be broken down into three portions: a length forward of the core ($L_{IGB}$), a length aft of the core ($L_{AFT}$), and the portion of the LP shaft that extends from the aft portion of the HPT to the forward end of the HPC ($L_{CORE}$). The flexural rigidity per unit length of the LP shaft along the length of the core is typically significantly lower than portions outside the core for embodiments disclosed herein of LP shaft where the flexural rigidity per unit length scales inversely with the shaft outer diameter (e.g., same material throughout, no variation in wall thickness through LP shaft across core, etc.).

$L_{MSR}$ is defined according to the relationship:

$$L_{MSR}=L_{IGB}+L_{CORE}+L_{AFT} \quad (2)$$

$L_{IGB}$ represents a minimum distance from core forward end and forward inboard low-pressure shaft bearing (e.g., 823*a* in FIG. 8A) to the forward core bearing (e.g., 819 in FIG. 8A). The length $L_{IGB}$ can range from four inches to twelve inches (the minimum length of four inches accommodates an accessary gearbox). The distance may be increased or decreased depending on factors such as, location of other components supported by a common frame, the location of the axial center of gravity for a frame, etc. as discussed earlier. Taking these factors into consideration, the length $L_{IGB}$ may be estimated based on $D_{CORE}$ using (3):

$$L_{IGB} = 0.16 * D_{CORE} + 1.7 \tag{3}$$

Wherein $D_{CORE}$ is the diameter (measured from the engine centerline) of the last stage of the high-pressure compressor, measured as the tip to tip diameter of the rotor of the exit or aft-most/last stage of the high-pressure compressor. $D_{CORE}$ varies from ten inches to thirty inches depending on whether there are 8, 9, 10 or 11 stages in the HPC. Examples are provided below in TABLE 4. Relation (3) is valid only for an HPC having 8, 9, 10 or 11 stages.

It was found, unexpectedly, after review and consideration of several different core sizes, that the following relationship exists between a core length $L_{CORE}$, $D_{CORE}$ and compressor and turbine stages. Relationship (4) provides a good approximation to the core length (e.g., the length defined by the high-pressure compressor, the combustor, and the high-pressure turbine). from the HPC entrance to HPT exit:

$$L_{CORE} = \left[m^{(20+m)} * n^{(10+n)}\right]^{\left(\frac{1}{100}\right)} * D_{CORE} + CIS \tag{4}$$

Thanks to this relationship, the influence of core length changes impacted by adding additional HPC or HPT stages can be directly related to engine dynamics, thereby leading to in an improved engine design that balances dynamics needs against a higher pressure ratio core choice for higher power density. The symbol m is the number of stages in the high-pressure compressor and n is the number of stages in the high-pressure turbine. The CIS accounts for changes in core supporting structure, seals, nozzle sizes, and changes to the combustor length associated with a change in the HPC and/or HPT stages. It was found that CIS can be from twenty inches up to thirty inches for HPC stages ranging between 8 to 11 and 1 to 2 HPT stages. The relation in (4) for $L_{CORE}$ is valid only for m being eight, nine, ten, or eleven, and n being one or two.

The aft length $L_{AFT}$ is the length from the aft core bearing (e.g., third bearing 825 in FIG. 8A) to the aft inboard low-pressure shaft bearing (e.g., fourth bearing 823*b* in FIG. 8A). It was found that $L_{AFT}$ can be from two inches to twenty-four inches, depending on the specific spacing needs/preferences aft of the HPT and turbine rear frame integration with the rotor. Also, placement of this bearing can be influenced by whether additional LPT stages are added, dynamics of the LP shaft and turbine rear frame. In some cases an additional bearing $L_{AFT\ BRG}$ as discussed earlier TABLE 4 shows various embodiments to determine $L_{MSR}$ according to relationships (2) to (4). The embodiments shown in TABLE 4 align with the like embodiment numbers in FIGS. 20A to 20I.

TABLE 4

| Embodiment | $L_{MSR}$ in | $L_{IGB}$ in | $L_{CORE}$ in | $L_{AFT}$ in | $D_{CORE}$ in | CIS in | HPC stages | HPT stages |
|---|---|---|---|---|---|---|---|---|
| 74 | 54.9 | 4 | 47 | 4 | 15 | 20 | 8 | 1 |
| 75 | 60.8 | 4 | 54 | 3 | 15 | 23 | 9 | 2 |
| 76 | 66.5 | 4 | 59 | 4 | 15 | 26 | 10 | 2 |
| 77 | 71.3 | 4 | 64 | 3 | 15 | 30 | 11 | 2 |
| 78 | 58.9 | 4 | 48 | 7 | 15 | 21 | 8 | 1 |
| 79 | 61.8 | 4 | 54 | 4 | 15 | 23 | 9 | 2 |
| 80 | 71.3 | 4 | 64 | 3 | 15 | 30 | 11 | 2 |
| 81 | 60.4 | 4 | 52 | 4 | 17 | 22 | 8 | 1 |
| 82 | 64.9 | 4 | 58 | 3 | 17 | 23 | 9 | 2 |
| 83 | 68 | 6 | 58 | 4 | 16 | 24 | 10 | 2 |
| 84 | 75.9 | 4 | 69 | 3 | 17 | 30 | 11 | 2 |

$D_{MSR}$ is defined according to the relationship:

$$D_{MSR} = D_{HPT\ BORE} - 2t \tag{5}$$

$D_{HPT\ BORE}$ is the rotor bore diameter for the first stage of the high-pressure turbine. Its size may be approximated according to the relationship:

$$D_{HPT\ BORE} = 0.26 D_{CORE} + 0.6 \tag{6}$$

The thickness t is the intershaft thickness between the low-pressure shaft and the high-pressure turbine bore (e.g., as shown in FIG. 13). The thickness t can vary from 450 mils and 650 mils (from 0.45 in to 0.65 in).

CMC material is expected to be used in the HPT, LPT, and HPC parts of a core engine as this type of material can withstand higher temperatures than more traditional metal alloys. Given the differences in material properties for a CMC material, particularly the higher strength to weight ratio (or higher specific modulus) of CMC versus a metal alloy used in existing gas turbine engines in use currently, there is a need to ascertain the expected effects on HP shaft dynamics and LP shaft dynamics. Use of a CMC material introduces opportunities to increase a critical speed of the LP shaft, not only due to a weight reduction but also in making more space available for increasing the LP shaft diameter extending through the core given the materials higher strength. The components made, at least in-part, from CMC material may include the HP compressor rotors and disks, the HP turbine nozzles and/or rotors and rotor disks, and the LP turbine nozzles and/or rotors and disks. CMC allows for components to be made more stiff or reduced in size while having the same strength properties as metal alloys, thereby having equivalent capability for sustaining high stresses associated with centrifugal forces at high temperatures and operating speeds, in addition to reducing the weight of the core, as compared to metals. CMC also introduces new and untested structural dynamics, which can introduce tradeoffs or compromise between a desired aero-performance (temperatures, rotation rates, pressure ratios) and stable dynamics at cruise, takeoff/max thrust and redline speeds for both the HP shaft and LP shaft.

CMC provided in the low-pressure turbine, which drives the LP shaft, can enable an increased critical speed due to a reduced weight, thereby affecting MSR of the midshaft. For example, and referring back to FIGS. 1 to 11, rotors, blades, blades and discs, a single stage, or multiple stages (e.g., the turbine stages 266), in the low-pressure turbine module may be formed partially or wholly of CMC. In some embodiments, a first, second, third, fourth or fifth stage of a LPT may have airfoils made from a CMC material, for example the aft-most stage airfoils (i.e., $3^{rd}$, $4^{th}$ or $5^{th}$ stage) may be made entirely or partially from CMC material. LPT nozzles may be made from CMC material. Or both the LPT airfoils on rotor and nozzle airfoils may be made from CMC material. When CMC is used in the LPT, the inventors discovered that the critical speed at which the low-pressure shaft can operate is increased significantly while also taking into account for the relatively brittle nature and temperature-dependent strength properties of CMC that goes along with the reduced weight (or increase in specific strength) benefits that the material provides. That is, with strength and toughness needs across different environments and operating conditions realized, the inventors found a relation between CMC material used in the core for a resulting comparatively higher critical speed for the LP shaft, for maintaining a critical speed for increases in core length when used in the LPT, and for higher critical speeds without an associated un-acceptable MSR value indicating that the design using CMC material could have an LP shaft operating in a critical or supercritical range. In this way, the CMC material is used to increase the power density of the gas turbine engine, while taking into account the affects on MSR and the engine dynamics. For example, and referring back to FIGS. 1 to 14, CMC used for the HPT and/or the HPC airfoils, HPT nozzle, and rotor disks supporting airfoils that influence the length of the core can influence the LP shaft design for other reasons as well, as explained in greater detail below. Example embodiments showing effect on LP shaft MSR values and critical speed for CMC used in the LPT are included in the Tables of FIGS. 20A to 20I. It was found that for an LPT made at least partially from CMC material the effective reduction in mass, i.e., the mass reduction can influence the MSR and critical speed by an amount that provides more opportunities for increased efficiency by enabling a higher rotation speed. FIGS. 20A to 20I provide examples.

Figure 14:
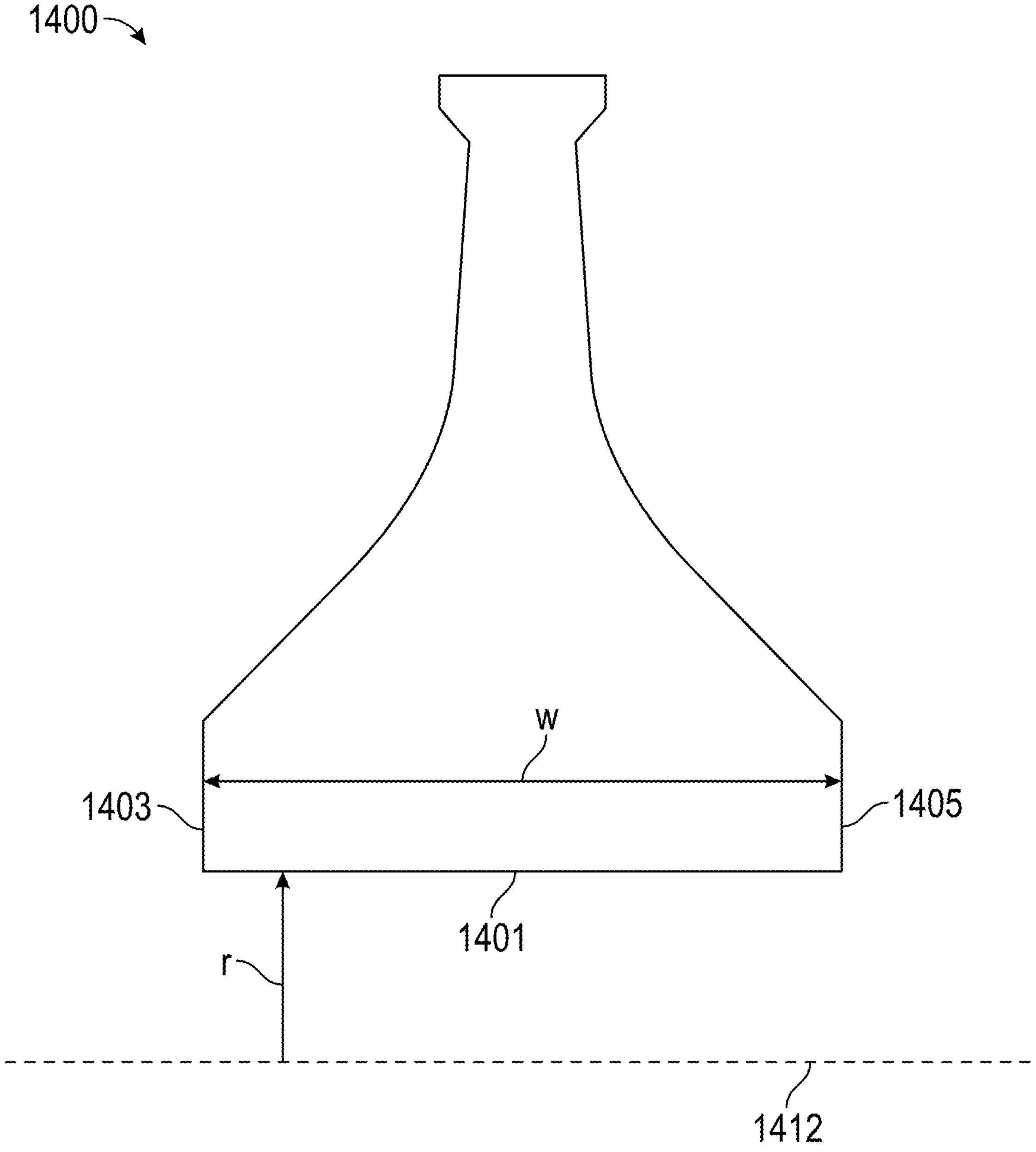
FIG. 14 shows an exemplary blade for an engine, according to the present disclosure.

Use of CMC material in the HPT rotor blades also affects the size of the HPT bore radius, because the higher strength to weight ratio of CMC material (when used for the rotor blades) reduces the strength requirements for the disk supporting the blades, thereby permitting the bore radius to increase. The bore radius limits the outer diameter of the LP shaft. It is desirable to increase the bore radius of the high-pressure turbine (first stage) to allow an increase in the low-pressure shaft diameter (e.g., $D_{MSR}$). Referring to FIG. 14, a cross-sectional view of a first stage HPT airfoil disk 1400 is shown. The blade disk 1400 has a bore radius r defined from an engine centerline axis 1412 to an inner surface 1401 of the disk bore. Use of CMC material for the rotor blade permits an increase in the radius r to enable a larger $D_{MSR}$ for the LP shaft, thereby affecting the critical speed and MSR of the midshaft. CMC material for the bore disk may also be desired. Each blade disk 1400 has a width w measured from a forward edge 1403 to an aft edge 1405. For a disk made from CMC material, the increased specific modulus (strength/weight) may allow for a meaningful reduction in the width w of the disk and therefore a reduction in $L_{CORE}$, which can enable an increased critical speed and higher MSR value, which is desired. Even if a metal alloy is used for the disk, a reduced width can be realized because of the lighter weight airfoil it needs to support.

FIG. 15 compares the properties of MI and CVI type CMC material compared to conventional metal alloys. The HPT may be made from CVI or MI types of CMC material, or a hybrid of MI and CVI. In some embodiments the HPT is made from CVI type CMC material, such as the airfoil, while the disk is made from a metal alloy (separate parts coupled through a dovetail slot), or both the disk and airfoil is made from the CVI material (blisk). In some embodiments the surface of an airfoil (LPT, HPT either on nozzles or rotors) facing the hot gas may be made from CVI material while the surface facing away from the hot gas is made from the MI material. The consideration of material to use includes not only high temperature resistance but also the strength and toughness of the material.

Figure 16:
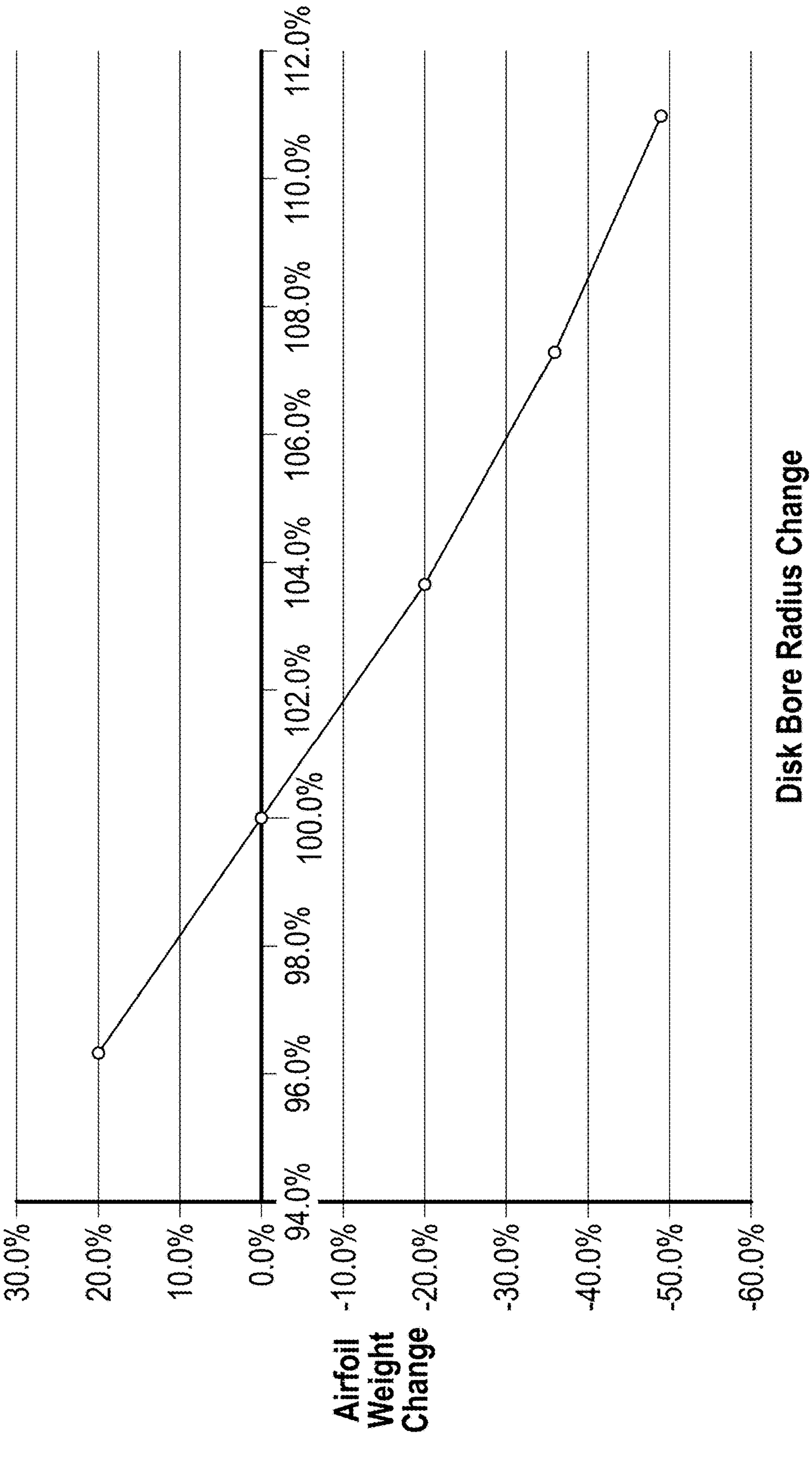
FIG. 16 shows a plot depicting disk bore radius change as a factor of airfoil weight change.

Referring to FIG. 16, the effects of using a CMC material in the HPT are shown. As more CMC material is used, the strength requirements needed to react the airfoil inertial loading reduces. As shown when the airfoil weight is reduced to 50% using CMC material, the radius of the bore increases by approximating 11%. This translates into a stiffer LP shaft (higher $D_{MSR}$), thereby providing a higher critical speed and a higher MSR value. FIGS. 20A to 20I include embodiments of an engine where the MSR and/or critical speed may increase as a result of an increased HPT disk bore radius.

Figure 17:
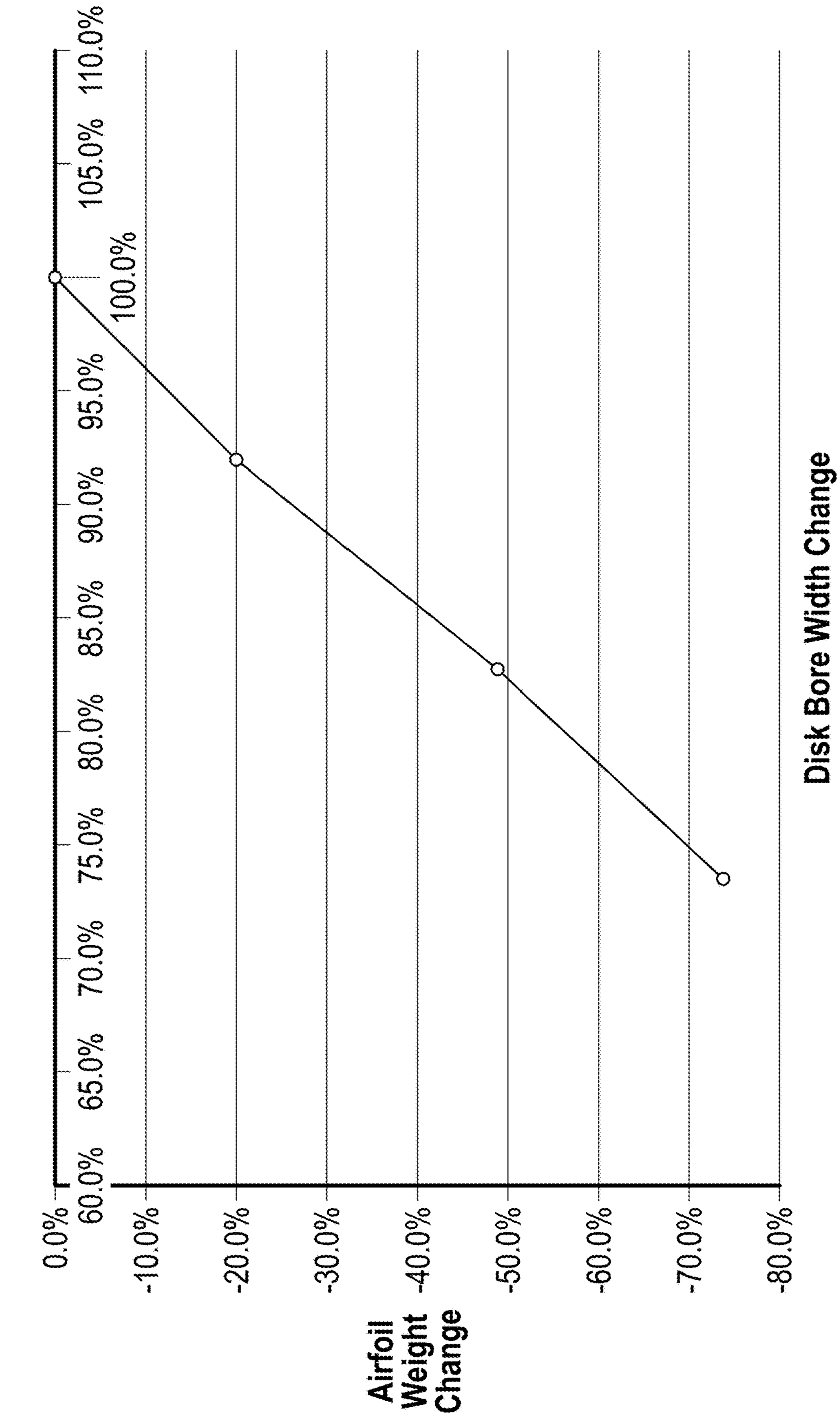
FIG. 17 shows a plot depicting disk bore width change as a factor of airfoil weight change.

Referring to FIG. 17, further effects of using a CMC material in the HPT are shown. As more material is used, the strength requirements needed to react the airfoil inertial loading reduces. As shown when the airfoil weight is reduced to 50% using CMC material, the width of the bore decreases by approximately 17%. This translates into a stiffer HP and LP shaft (lower $L_{CORE}$ and $L_{MSR}$), enabling higher critical speeds, mitigating against lower critical speeds as a result of adding additional stages to the HPC and/or HPT. FIGS. 20A to 20I include embodiments of an engine where the MSR and/or critical speed increase when the HPT disk width is decreased, enabling a decrease in $L_{MSR}$.

In addition to the aforementioned dimensional and weight changes in the core attributed to use of CMC material and affecting the LP shaft dynamics, using CMC material will also effect vibrational response for the HP shaft, also referred to as HP shaft dynamics.

Figure 19A:
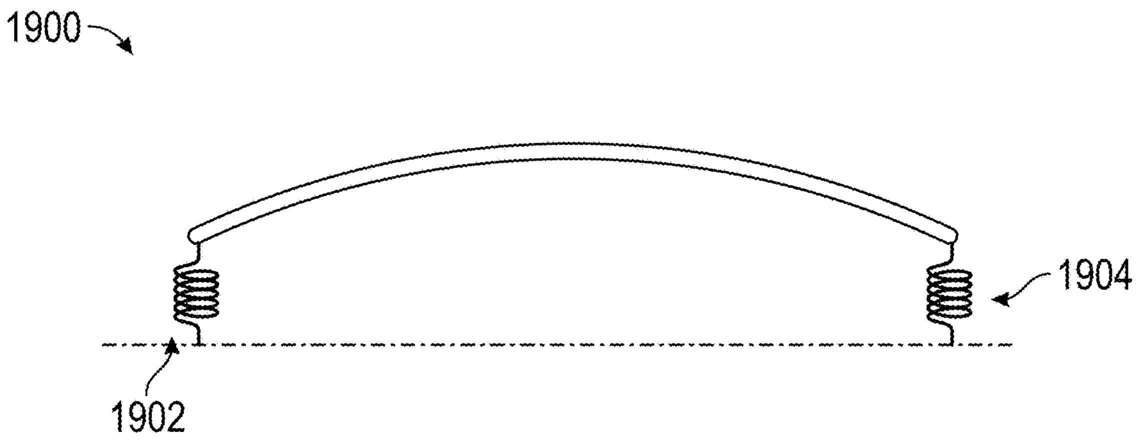
FIG. 19A shows a first bending mode of a shaft.
Figure 19B:
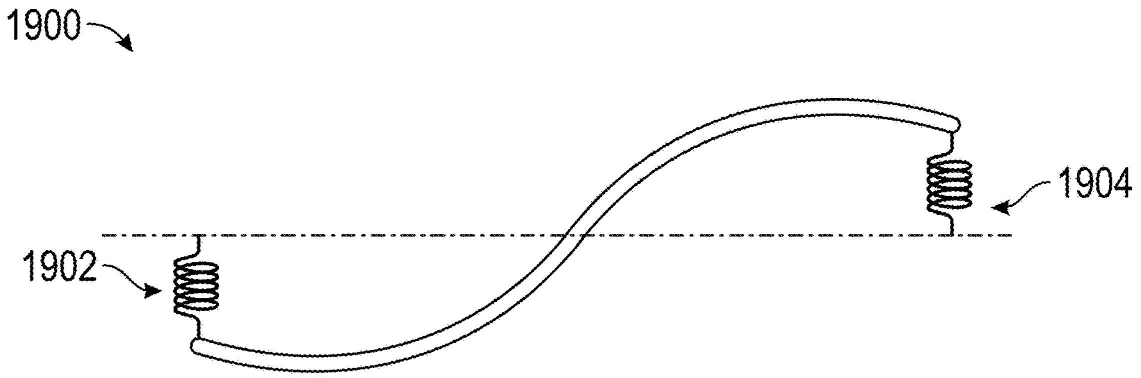
FIG. 19B shows a second bending mode of a shaft.
Figure 19C:
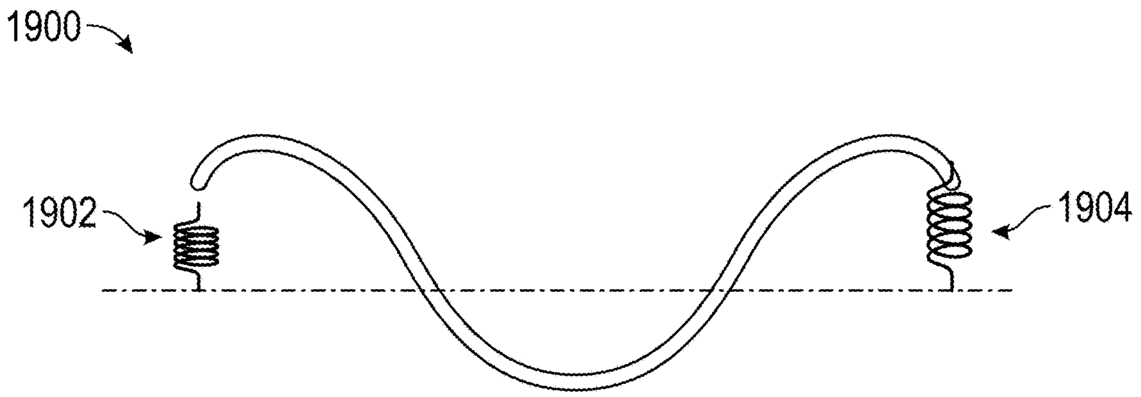
FIG. 19C shows a third bending mode of a shaft.

As alluded to earlier, the inventors further considered the effects that an HP shaft has on LP shaft dynamics and how LP shaft dynamics can also influence HP shaft dynamics. Based on the studies done, it was found unexpectedly that there are certain relationships between HP shaft dynamics and LP shaft dynamics that influence the design of a higher power density core from the perspective of maintaining stable dynamics during engine operations. Referring to FIGS. 19A to 19C, there is shown a schematic view of a high-pressure shaft (HP shaft) corresponding to the predominate three typical mode shapes of the HP shaft that need to be taken into consideration when designing an engine core and avoiding dynamic instability not only in the HP shaft, but also in the LP shaft, as realized by the inventors. The deformed HP shaft is supported at its ends by the HP shaft forward and aft bearings 1902 and 1904, respectively. The bearings are represented by their stiffnesses (shown as springs). FIG. 19A illustrates a first mode, also referred to as a fundamental bounce mode, also known as a bow rotor mode, of the high-pressure shaft 1900. The first mode can occur at sub-idle speeds of the high-pressure shaft, which are about twenty percent to thirty percent below a redline speeds of the low-pressure rotor (e.g., about ten percent below cruise speeds). In FIG. 19B, the high-pressure shaft 1900 has a second mode, also known as the pitch mode. The second mode occurs at near to cruise speeds of the high-pressure shaft, which are about twenty percent to thirty percent below the high-pressure shaft redline speeds. In FIG. 19C, the high-pressure shaft 1900 has a third mode, also known as a S-shaped mode. The third mode occurs near redline speeds of the high-pressure shaft.

The inventors found, during the course of evaluating several different core designs (designs that provide higher power densities, as discussed earlier) from the perspective of maintaining dynamic stability between and among the HP shaft and LP shaft the following relationships. These relationships take into account the trade-offs that need to be made, so that the design accounts not only for features of the core length, size and weight, and representative of a higher overall pressure ratio and increased operating temperatures (including use of CMC material), but also the effects that these changes in the core can have on both the HP shaft and the LP shaft.

A first relationship concerns the high-pressure shaft redline speed, or high speed shaft rating HSR given by (7):

$$HSR = 10^{-6} * N2_{r/l} * D_{CORE} * \left(\frac{L_{CORE}}{D_{CORE}}\right)^2 \quad (7)$$

$L_{CORE}$ and $D_{CORE}$ are defined as described previously. $N2_{r/l}$ is the redline speed for the HP shaft. The redline speed $N2_{r/l}$ is from 11000 RPM to 25000 RPM. $L_{CORE}$ is from forty-three inches to eighty inches. $D_{CORE}$ is from 13.8 inches to 30.6 inches. HSR is from 1.9 to 4.3.

For stable operating conditions the high-pressure shaft third mode should be placed above the redline speed of the HP shaft and satisfying (8):

$$-0.1822 * HSR + HST > 0 \quad (8)$$

HST accounts for the effects that the HPC pressure ratio and the HPC exit temperature can have on the third mode. T25 is the temperature in Rankine (R) at the high-pressure compressor (HPC) inlet. A good approximation for HST can be made in terms of only the T25, using (9):

$$HST = -0.0014 * T25 + 1.61 \quad (9)$$

Where T25 is from 615 R to 855 R and HST is from 0.46 to 0.78.

For stable operating conditions the high-pressure shaft second mode should be placed 20% below the redline speed of the HP shaft satisfying (10):

$$-0.1215 * HSR + \left(\frac{2 * HST - 1}{3}\right) < -0.2 \quad (10)$$

A second relationship concerns the low-pressure shaft redline speed, or high-speed shaft rating $HSR_{LP}$ given by (11):

$$HSR_{LP} = 10^{-6} * N1_{r/l} * D_{CORE} * \left(\frac{L_{CORE}}{D_{CORE}}\right)^2 \quad (11)$$

$L_{CORE}$ and $D_{CORE}$ are defined as described previously. $N1_{r/l}$ is the redline speed for the LP shaft. For stable operating conditions the high-pressure shaft first mode should be placed either 20% below or above the redline speed of the LP shaft satisfying (12):

$$\frac{0.55}{(HSR_{LP})^2} + LST < -0.2 \text{ OR } \frac{0.55}{(HSR_{LP})^2} + LST > 0 \quad (12)$$

LST accounts for the effects that the HPC pressure ratio and the HPC exit temperature can have on the first mode. T25 is the temperature in Rankine (R) at the high-pressure compressor (HPC) inlet. A good approximation for LST can be made in terms of only the T25, using (13):

$$LST = -0.0023 * T25 + 1.18 \quad (13)$$

Where T25 is from 615 R to 855 R and LST is from −0.2 to −0.74.

Relationships (7) through (13) when used together individually or together (depending on application or changes made to a design) can identify an improved core accounting for characteristics associated with a higher power density (use of CMC material, increased number of HPC and/or HPT stages, increased bore height or length of the LP shaft) and bounding those features within constraints to avoid dynamic instability by interaction between one or more vibration modes of the LP shaft and HP shaft.

The foregoing indicates that employing CMC in the high-pressure turbine and/or the high-pressure compressor can benefit both the low-pressure shaft critical speed and the high-pressure shaft dynamics (e.g., the third mode of the high-pressure shaft), or it can introduce unanticipated dynamic instability such as at a cruise condition. As explained earlier, CMC material used in the high-pressure turbine can provide favorable reductions in disk width (e.g., FIG. 14, width w) and increased disk bore radius (e.g., FIG. 14, radius r) which may both reduce $L_{MSR}$ and increase $D_{MSR}$. The changes in core length can also benefit the third bending mode of the high-pressure shaft.

Additionally, CMC material used in high-pressure compressor (particularly the aft-most stages) can produce a noticeable increase in the natural frequency of the HP shaft first and third mode because this location corresponds to the maximum deflection points for the first mode and the third mode (FIGS. 19A, 19C). Finally, as discussed earlier, CMC material used for the HPT rotor blades (first stage) can result in a width reduction of the HPT disk (e.g., FIG. 14, width w), as well as an increased bore radius for the HPT first stage disk bore (e.g., FIG. 14, radius r). These later changes to the HPT can improve the dynamics of the high-pressure shaft, including the third bending mode of the high-pressure shaft and the MSR because of the weight reduction and reduced $L_{MSR}$ (reduces length of HP shaft correspondingly, thereby moving the third bending mode to a higher frequency), and $D_{MSR}$ increase, respectively. Accordingly, the use of CMC material in the HPC, LPC, HPT, and/or the LPT provides for higher critical speeds and lower weights, thereby increasing the MSR, and, thus, providing a higher power density engine.

Figure 18:
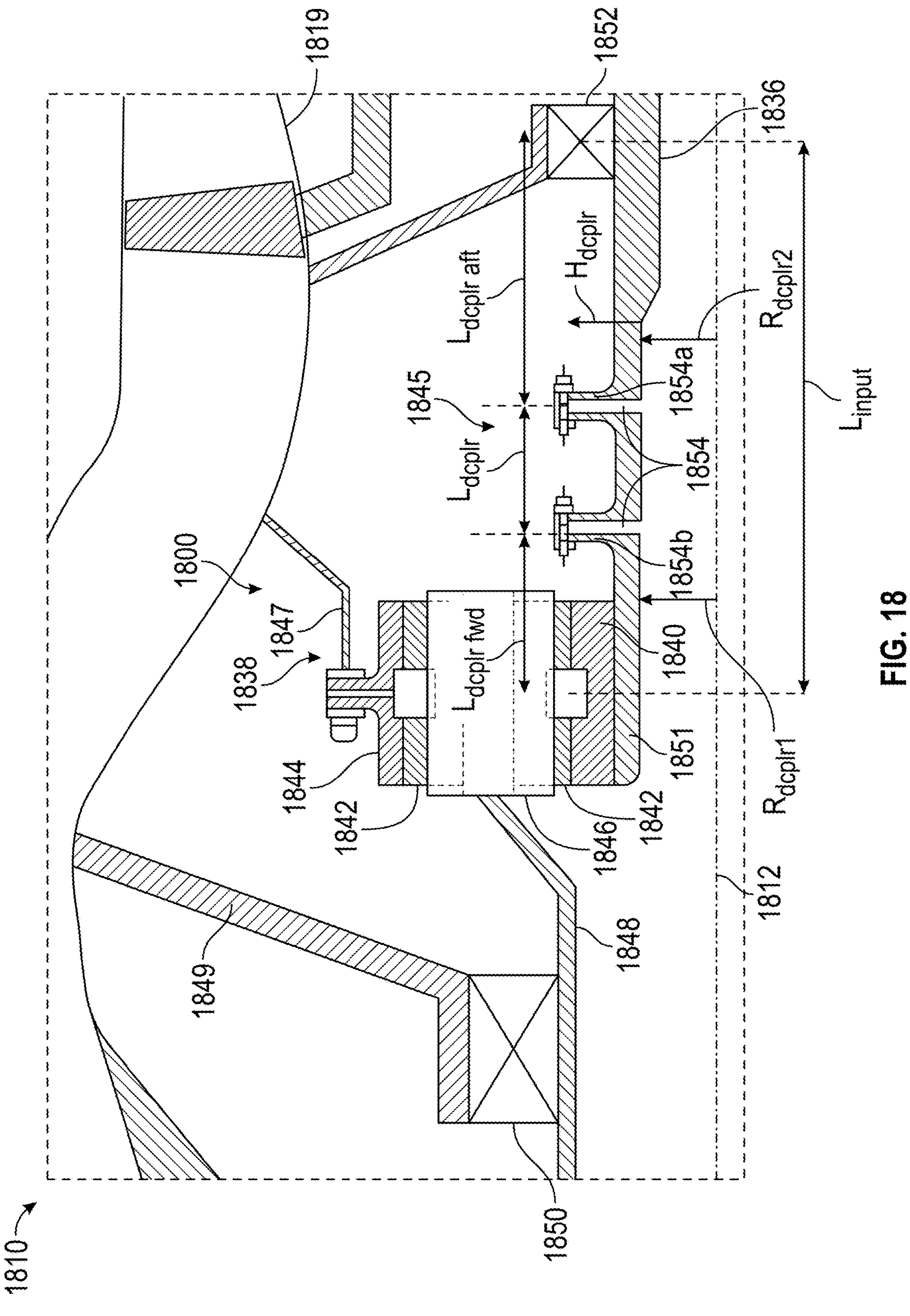
FIG. 18 shows a schematic, partial cross-sectional view, taken along a centerline axis, of a gearbox for a gas turbine engine, according to the present disclosure.

Furthermore, the inventors considered the effects that gearbox dynamics have on LP shaft dynamics. Based on the studies done, it was found unexpectedly that there are certain relationships between gearbox dynamics and LP shaft dynamics that influence the design of the coupling between the gearbox and the LP shaft. Embodiments taking into account gearbox dynamics in combination with CMC are found in FIGS. 20A to 20I (e.g., embodiments 66 to 73, 85, and 86). FIG. 18 illustrates an enlarged, schematic side cross-sectional view of a gearbox assembly 1838 with a mounting assembly 1800 for a gas turbine engine 1810, taken at a centerline axis 1812 of the gas turbine engine 1810. The gearbox assembly 1838 can be utilized as any of the gearbox assemblies and the gas turbine engine 1810 can be any of the gas turbine engines detailed herein. The gearbox assembly 1838 is substantially similar to the gearbox assembly 938 of FIGS. 9A and 9B and includes a planetary configuration. For example, the gearbox assembly 1838 includes a sun gear 1840, a plurality of planet gears 1842, a ring gear 1844, a low-speed shaft 1836 coupled to the sun gear 1840. The sun gear 1840 is coupled via a flex coupling 1845 to the low-speed shaft 1836. The plurality of planet gears 1842 are coupled together by a planet carrier 1846. In the embodiment of FIG. 18, the planet carrier 1846 is coupled, via a fan shaft 1848, to a fan (e.g., any of the fans or fan assemblies detailed herein) to drive rotation of the fan about the centerline axis 1812. The fan shaft 1848 is coupled to a fan frame 1849 via a fan bearing 1850. The ring gear 1844 is coupled via a flex mount 1847 to an engine static structure 1819. The flex coupling 1845, the flex mount 1847, and the fan frame 1849 define the mounting assembly 1800 for the gearbox assembly 1838. As described herein, the flex coupling 1845, the flex mount 1847, and the fan frame 1849 may be referred to as mounting members.

In FIG. 18, the flex coupling 1845 is part of an input shaft 1851 that extends from a forward bearing 1852 of the low-speed shaft 1836 to the sun gear 1840 (e.g., to an axially center of the sun gear 1840). The flex coupling 1845 is also referred to as a decoupler, and includes one or more flex plates 1854 that absorb and reduce deflections and vibrations from propagating from the gearbox assembly 1838 to the low-speed shaft 1836 or from the low-speed shaft 1836 to the gearbox assembly 1838. In the embodiment shown in FIG. 18, the one or more flex plates 1854 include a first flex plate 1854*a* and a second flex plate 1854*b* spaced axially from each other along the input. The one or more flex plates 1854 can include any number of flex plates located at any axial position along the input, as desired. The flex plates 1854 are integral with the flex coupling 1845 and include axial gaps that absorb the deflections in an axial direction so that propagation of the deflections through the flex coupling 1845 is reduced. Accordingly, the flex coupling 1845 can be tuned or can be changed to achieve a particular desired vibrational frequency response such that vibrations of the gearbox assembly 1838 do not excite the low-speed shaft 1836 when the redline speed is subcritical.

The input shaft 1851 includes an input shaft length $L_{input}$ that extends axially from the forward bearing 1852 to the sun gear 1840 (e.g., an axial center of the sun gear 1840). The input shaft length $L_{input}$ is equal to an aft decoupler length $L_{dplr\_aft}$, a decoupler length $L_{dcplr}$, and a forward decoupler length $L_{dcplr\_fwd}$, added together. The aft decoupler length $L_{dplr\_aft}$ extends from the forward bearing 1852 to the first flex plate 1854*a*, the decoupler length $L_{dcplr}$ extends from the first flex plate 1854*a* to the second flex plate 1854*b*, and the forward flex length $L_{dcplr\_fwd}$ extends from the second flex plate 1854*b* to the sun gear 1840 (e.g., to an axially center of the sun gear 1840). The flex coupling 1845 also includes a decoupler height $H_{dcplr}$ and one or more decoupler radii. The decoupler height is a height of the flex plates 1854 in the radial direction from the input shaft 1851. The one or more decoupler radii is an inner radius of the input shaft 1851. The one or more decoupler radii include a first decoupler radius $R_{dcplr1}$ and a second decoupler radius $R_{dcplr2}$. In the embodiment of FIG. 18, the first decoupler radius $R_{dcplr1}$ is equal to the second decoupler radius $R_{dcplr2}$ such that the input shaft 1851 has a constant inner radius. In some embodiments the first decoupler radius $R_{dcplr1}$ is different than the second decoupler radius $R_{dcplr2}$ such that the input shaft 1851 has a variable inner radius (e.g., the inner radius of the input shaft 1851 changes along the axial direction).

In consideration of midshaft operating speeds, whether during an aircraft maximum thrust at takeoff, redline or cruise operating condition, it is desirable to have any anticipated dynamic loading of the gearbox caused by midshaft motion to not act as to amplify or excite fundamental or principle mode(s) of the gearbox through the sun gear—midshaft coupling. It is also desirable to avoid a dynamic excitation communicated through the sun gear/midshaft coupling and influenced by modal characteristics of the gearbox assembly to act as to excite fundamental mode(s) of the midshaft. To achieve this end result, it is desirable to have a decoupler moment stiffness $KM_{dcplr}$ of the flex coupling 1845 and a decoupler shear stiffness $KS_{dcplr}$ of the flex coupling 1845 (e.g., a moment stiffness and a shear stiffness at the sun gear-midshaft coupling) being such as to neither cause significant excitation of a fundamental midshaft mode, nor a dynamic excitation from the midshaft communicated at this coupling to cause significant excitation of a fundamental mode of the gearbox assembly. The decoupler moment stiffness $KM_{dcplr}$ is an overturning moment stiffness of the flex coupling 1845 (e.g., a torque of the flex coupling 1845 applied radially on the flex coupling 1845), including the decoupler moment stiffness of the first flex plate 1854*a* and the decoupler moment stiffness of the second flex plate 1854*b*. The decoupler shear stiffness $KS_{dcplr}$ is a stiffness of the flex coupling 1845 (e.g., between the first flex plate 1854*a* and the second flex plate 1854*b*) in the axial direction. The stiffness of the flex coupling 1845 (e.g., the decoupler moment stiffness $KM_{dcplr}$ and the decoupler shear stiffness $KS_{dcplr}$) should be selected so as to not amplify midshaft properties or so as not excite the gearbox assembly 1838 by midshaft dynamic behavior during engine operation.

Various rig tests and measurements taken to simulate engine operational conditions, accounting for any differences between a dynamic response for a recently fielded engine and an engine after several operational cycles, revealed common patterns in dynamic behavior for midshaft-gearbox interactions to inform the design of the flex coupling 1845 to avoid the modal coupling between gearbox and midshaft explained above. It was found that a decoupler moment stiffness $KM_{dcplr}$ of the flex coupling 1845 in a range of 50 klb*in/rad to 200 klb*in/rad, and a decoupler shear stiffness $KS_{dcplr}$ of the flex coupling 1845 in a range of 100 klb/in to 500 klb/in, should substantially avoid intolerable or sustained dynamic amplification of the gearbox assembly 1838 or the midshaft (e.g., the low-speed shaft) when there is excitation of either the gearbox assembly 1838 or the midshaft during engine operations. In this way, the flex coupling 1845 prevents the gearbox assembly 1838 from dynamically exciting the midshaft, and prevents the midshaft from dynamically exciting the gearbox assembly 1838. In this way, the gearbox and its couplings are designed to prevent the gearbox dynamics from affecting the midshaft dynamics at subcritical speeds of the LP shaft, and vice versa. The decoupler moment stiffness $KM_{dcplr}$ of the flex coupling 1845 is expressed in klb*in/rad, and the decoupler shear stiffness $KS_{dcplr}$ of the flex coupling 1845 is expressed in klb/in. In view of the foregoing, the decoupler moment stiffness $KM_{dcplr}$ of the flex coupling 1845 and the decoupler shear stiffness $KS_{dcplr}$ of the flex coupling 1845 are desired to satisfy the relationships (14) and (15), respectively:

$$KM_{dcplr} = \frac{E * K_m * R_{dcplr}^4}{H_{dcplr}} \quad (14)$$

$$KS_{dcplr} = \frac{E * K_s * R_{dcplr}^4}{L_{dcplr}^2} \quad (15)$$

TABLE 5 lists the bearing layout, the strength-to-weight ratio E/rho in inches$^{-1}$, the effective thickness $T_{eff}$ in inches, the critical speed corresponding to the shaft's fundamental mode in RPM, the OD linear speed at redline in ft/sec, the length-to-diameter ratio $L_{MSR}/D_{MSR}$ (dimensionless), and MSR in (ft/sec)$^{1/2}$ for all the embodiments (1 to 13) of Tables 1 to 3, as well as a number of additional embodiments (14 to 32). As noted above, $L_{MSR}/D_{MSR}$ represents the ratio of the length over the outer diameter of the low-pressure/low-speed shaft. When the shaft has a variable diameter over its length, the outer diameter may be the diameter at the midshaft. E/rho represents the material composition of the shaft, and $T_{eff}$ represents an effective wall thickness of the shaft. For shafts with variable thickness over their length, the wall thickness may be the thickness at the midshaft.

Embodiments 15 to 26 use a two-bearing aft layout. These embodiments differ in using composite materials, different shaft geometries, and variable thickness profiles.

Embodiments 15 to 17 use a composite material instead of steel alloy. These embodiments differ in shaft geometry, with different $L_{MSR}/D_{MSR}$ ratios ranging from 14 to 23.

Embodiments 18 to 20 use a composite material instead of a steel alloy. These embodiments also differ from each other in shaft geometry (e.g., $L_{MSR}/D_{MSR}$ ratio). These also differ from Embodiments 15 to 17, in being longer and thinner, resulting in a higher range of $L_{MSR}/D_{MSR}$ ratio, from 17 to 26.

Embodiments 21 to 23 use a steel alloy, vary the shaft geometry (length and/or diameter), and have a concave thickness profile. These differ from each other in terms of their effective thickness. These embodiments may be compared to Embodiments 24 to 26, which use composite materials, vary the shaft geometry (length and/or diameter), and have a concave thickness profile.

Embodiments 27 to 32 use different bearing layouts. Embodiments 27 to 29 use steel alloy and have varying geometry. Embodiments 30 to 32 use composite material and a concave thickness profile, in addition to varying geometry.

FIGS. 20A to 20I, illustrate additional embodiments 33 to 86 taking into account the effects of the change in core dimensions (e.g., stages, lengths, diameters, etc.) and use of CMC described previously. The comparisons described below are in relation to the embodiments 1 to 32 described in TABLE 5.

Embodiments 33 to 36 use CMC for various components in the low-pressure turbine to help reduce the weight. These embodiments differ from each other in terms of bearing

TABLE 5

| Embodiment | Bearing Layout | E/rho in$^{-1}$ | $T_{eff}$ in | Mode RPM | $L_{MSR}/D_{MSR}$ in/in | Redline OD Speed ft/sec | MSR (ft/sec)$^{1/2}$ |
|---|---|---|---|---|---|---|---|
| 1 | 2-bearing outbound | 1.00E+8 | 0.35 | 4181 | 30 | 50 | 214 |
| 2 | inbound OTM | 1.27E+8 | 0.35 | 10263 | 22 | 123 | 247 |
| 3 | outbound OTM | 1.27E+8 | 0.35 | 6915 | 30 | 83 | 275 |
| 4 | inbound OTM | 1.00E+8 | 0.35 | 9001 | 22 | 108 | 231 |
| 5 | outbound OTM | 1.00E+8 | 0.35 | 6065 | 30 | 73 | 257 |
| 6 | inbound OTM | 1.00E+8 | 0.32 | 10039 | 22 | 121 | 242 |
| 7 | outbound OTM | 1.00E+8 | 0.32 | 6942 | 30 | 83 | 272 |
| 8 | 4-bearing straddle | 1.00E+8 | 0.35 | 7746 | 22 | 93 | 214 |
| 9 | 4-bearing straddle | 1.00E+8 | 0.32 | 8555 | 22 | 103 | 223 |
| 10 | 4-bearing straddle | 1.27E+8 | 0.35 | 8832 | 22 | 106 | 229 |
| 11 | 4-bearing straddle | 1.27E+8 | 0.32 | 9703 | 30 | 116 | 322 |
| 12 | inbound OTM | 1.27E+8 | 0.32 | 11386 | 22 | 137 | 257 |
| 13 | outbound OTM | 1.27E+8 | 0.32 | 7873 | 30 | 94 | 290 |
| 14 | 4-bearing outbound | 1.00E+8 | 0.35 | 6262 | 26 | 72 | 219 |
| 15 | 2-bearing aft | 1.27E+8 | 0.29 | 8255 | 21 | 109 | 215 |
| 16 | 2-bearing aft | 1.27E+8 | 0.31 | 13323 | 14 | 233 | 216 |
| 17 | 2-bearing aft | 1.27E+8 | 0.47 | 5667 | 23 | 83 | 210 |
| 18 | 2-bearing aft | 1.27E+8 | 0.29 | 6380 | 24 | 83 | 215 |
| 19 | 2-bearing aft | 1.27E+8 | 0.31 | 9821 | 17 | 154 | 216 |
| 20 | 2-bearing aft | 1.27E+8 | 0.47 | 4586 | 26 | 67 | 211 |
| 21 | 2-bearing aft | 1.00E+8 | 0.23 | 6380 | 24 | 84 | 217 |
| 22 | 2-bearing aft | 1.00E+8 | 0.25 | 13493 | 14 | 235 | 218 |
| 23 | 2-bearing aft | 1.00E+8 | 0.38 | 4586 | 27 | 62 | 210 |
| 24 | 2-bearing aft | 1.27E+8 | 0.29 | 6619 | 25 | 87 | 231 |
| 25 | 2-bearing aft | 1.27E+8 | 0.31 | 11065 | 17 | 176 | 232 |
| 26 | 2-bearing aft | 1.27E+8 | 0.47 | 4852 | 28 | 64 | 224 |
| 27 | 4-bearing straddle | 1.00E+8 | 0.29 | 6380 | 28 | 75 | 245 |
| 28 | inbound OTM | 1.00E+8 | 0.31 | 10666 | 19 | 165 | 247 |
| 29 | outbound OTM | 1.00E+8 | 0.47 | 4586 | 31 | 59 | 239 |
| 30 | 4-bearing straddle | 1.27E+8 | 0.23 | 6380 | 35 | 70 | 289 |
| 31 | inbound OTM | 1.27E+8 | 0.25 | 11410 | 22 | 181 | 294 |
| 32 | outbound OTM | 1.27E+8 | 0.38 | 5293 | 33 | 70 | 276 |

arrangements, and maintain the same stiffness as comparable embodiments 1, 2, and 8 (described above in TABLE %) without CMC components. The use of CMC provides a reduced overhung weight, which has the effect of increasing the allowable OD speed at redline and/or enabling a higher MSR.

Embodiments 37 to 40 use CMC for various components in both the low-pressure turbine and the core (e.g., the high-pressure turbine). The use of CMC in the low-pressure turbine reduces the weight. The use of CMC in the core increases the bore radius of the core, thus allowing for an increase in diameter of the low-pressure shaft. That is, embodiments 37 to 40, have a larger radius for the low-speed shaft (3 inches) relative to embodiments without CMC in the core, for example, embodiments 1, 2, 8, and 33 to 36, which employ CMC only in the LPT (having a low-speed shaft diameter of 2.7 inches). Embodiment 39 further includes the addition of using bottle boring for a variable low-speed shaft thickness. The increased bore radius generally provides a lower $L_{MSR}/D_{MSR}$ ratio (see for example, a comparison with embodiments 1, 2, 8, and 33 to 36) and/or enabling an increased MSR.

Embodiments 41 to 45 use different combinations of bottle boring and CMC for various components in both the LPT and the HPT. These embodiments have an even larger radius (4 inches) for the low-speed shaft, as well as a lower effective thickness (see, for example, a comparison with embodiments 1, 4, 8, and 37 to 40) generally resulting in a higher redline speeds and/or higher MSR. Embodiments 43 and 44 further including bottle boring. Embodiment 44 includes a 2+1 bearing system arrangement, such as described with respect to FIG. 8B.

Embodiments 46 to 51 use different combinations of bottle boring and CMC for various components in both the LPT and the HPT. These embodiments have an even larger radius (4 inches) for the low-speed shaft, as well as a lower effective thickness (see, for example, a comparison with embodiments 1, 4, 8, and 37 to 40). Embodiments 46 to 51 further include a composite material shaft. Embodiments 46 to 51 include CMC in the HPT a manner that increases the bore radius (e.g., as described with respect to FIG. 14). Embodiment 48 further includes CMC in the HPT in a manner that decreases the core length (e.g., as described with respect to FIG. 14). This results in increased strength to weight ratio (1.3E+8 in). The combination of CMC in the LPT, CMC in the HPT, and a composite material shaft facilitates higher redline speeds and/or higher MSR.

Embodiment 52 used a three-bearing system, including bottling boring. Embodiments 53 to 59 begin with this as a baseline and adjust various factors. Each additional embodiment from embodiments 53 to 59 builds on the prior embodiment. Embodiment 53 adds CMC in the LPT to embodiment 52. Embodiment 54 adds CMC in another stage of the LPT to embodiment 53. Embodiment 55 includes a composite material in the low-speed shaft added to the embodiment 54. Embodiment 56 adds the core increase benefits of CMC in the HPT to embodiment 55. Embodiment 57 is based on embodiment 56 but with a 9 stage core. Embodiment 58 is based on embodiment 57, but with two bearings in the forward position and one bearing in the aft position on the LPT (e.g., the arrangement described with respect to FIG. 8B). Embodiment 59 adds another core stage to embodiment 58. These variations resulted in increased redline speed and/or higher MSR.

Embodiment 60 used a three-bearing system, including bottling boring. Embodiments 61 to 65 begin with this as a baseline and adjust various factors. Each additional embodiment from embodiments 61 to 65 builds on the prior embodiment. Embodiment 61 adds CMC in the LPT to embodiment 60. Embodiment 62 includes a composite material in the low-speed shaft added to the embodiment 61. Embodiment 63 adds the core increase benefits of CMC in the HPT to embodiment 62. Embodiment 64 is based on embodiment 63 but with a 9 stage core. Embodiment 65 is based on embodiment 64, but with two bearings in the forward position and one bearing in the aft position on the LPT (e.g., the arrangement described with respect to FIG. 8B). These variations resulted in increased redline speed and/or higher MSR.

Embodiments 66 to 69 all use CMC in the LPT and CMC in the HPT to take advantage of the core increase benefits. Embodiments 66 and 67 use a four-bearing system and include bottle boring. Embodiments 68 and 69 include a two-bearing system having a forward inbound bearing and an aft outbound bearing and include bottle boring. The embodiments of 66 to 69 further have differences in terms of stiffness (e.g., decoupler shear stiffness and/or decoupler moment stiffness). As shown, embodiments 67 and 69 achieve a greater shear stiffness than embodiments 66 and 68, respectively, generally resulting in substantially higher redline speeds and/or higher MSR.

Embodiments 70 to 73 all use CMC in the LPT and CMC in the HPT to take advantage of the core increase benefits. Embodiments 70 and 71 use a four-bearing system and include bottle boring. Embodiments 72 and 73 include a two-bearing system having a forward inbound bearing and an aft outbound bearing and include bottle boring. The embodiments of 70 to 73 further have differences in terms of stiffness (e.g., decoupler shear stiffness). As shown, embodiments 71 and 73 achieve a greater shear stiffness than embodiments 70 and 72, respectively, generally resulting in substantially higher redline speeds and/or higher MSR. Embodiments 70 to 73 differ from embodiments 66 to 69 in that the embodiments have a smaller LP shaft diameter.

In each of the embodiments 74 to 84, $L_{MSR}$ is determined based on the relationship (2) described previously. In embodiments 74 to 77 CMC is not used. In embodiments 78 to 84, CMC is used in the LPT and the HPT. In embodiments 78 to 80, the CMC is used in the HPT to increase the core radius. In the embodiments 81 to 84 the CMC is used in the HPT to decrease the core length and increase the core radius. As shown in embodiments 74 to 84, this allows increase in redline speeds and/or MSR.

Embodiments 85 and 86 both use CMC in the LPT and CMC in the HPT to take advantage of the core increase benefits. Embodiments 85 and 86 both include a two-bearing system having a forward inbound bearing and an aft outbound bearing and include bottle boring. The embodiments differ in terms of stiffness (e.g., decoupler shear stiffness and/or decoupler moment stiffness). As shown, embodiment 86 achieves a greater shear stiffness and greater moment stiffness than embodiment 85, generally resulting in a substantially higher redline speed and/or higher MSR.

Based on the experimentation described above, the inventors identified embodiments with MSR between two hundred and three thirty hundred $(ft/sec)^{-1}$ and OD redline speeds ranging from fifty to two hundred sixty ft/sec and with $L_{MSR}/D_{MSR}$ ratio ranging from twelve to thirty-seven were possible and indicated noticeable improvements in subcritical range when the power turbine shaft incorporates the various aspects of the disclosure.

TABLE 6 summarizes examples of different operating ranges for embodiments, such as the embodiments listed in TABLE 5. For example, an embodiment can be configured with a $L_{MSR}/D_{MSR}$ ranging between twelve and twenty may have an OD speed between one hundred and fifty and two hundred and fifty ft/sec, and a corresponding range of MSR between one hundred ninety and two hundred forty-five $(ft/sec)^{1/2}$. As another example, an embodiment can be configured with a $L_{MSR}/D_{MSR}$ ranging between sixteen and thirty may have an OD speed between seventy-five and one hundred seventy-five ft/sec, and a corresponding range of MSR between two hundred twelve and two hundred sixty $(ft/sec)^{1/2}$. As still another example, an embodiment can be configured with a $L_{MS}R/D_{MSR}$ ranging between twenty-six and thirty-seven may have an OD speed between sixty and ninety ft/sec, and a corresponding range of MSR between two hundred forty-seven and two hundred eighty-seven $ft/sec)^{1/2}$. These low, nominal, and high ranges as summarized in TABLE 6 are general examples, and individual embodiments may exceed these values.

TABLE 6

| Example Limits and Ranges | $L_{MSR}/D_{MSR}$ (in/in) | Redline OD Speed (ft/sec) | MSR $(ft/sec)^{1/2}$ |
|---|---|---|---|
| Low limit | 12 | 250 | 190 |
| | 20 | 150 | 245 |
| Nominal limit | 16 | 175 | 212 |
| | 30 | 75 | 260 |
| High Limit | 26 | 90 | 247 |
| | 37 | 60 | 287 |

According to additional embodiments, CMCs were evaluated in the low-pressure turbine and high-pressure turbine, in combination with different bearing configurations, different effective shaft thicknesses, different shaft diameters, different shaft materials (e.g., composites), and a variety of combinations thereof, in order to determine which combinations would work best for a given architecture and need, as well as taking the competing engineering requirements into account. Some of these embodiments are summarized in FIGS. 20A to 20I.

FIGS. 20A to 20I list the bearing layout, the strength-to-weight ratio E/rho in $inches^{-1}$, the effective thickness $T_{eff}$ in inches, the critical speed corresponding to the shaft's fundamental mode in RPM, the OD linear speed at redline in ft/sec, the length-to-diameter ratio $L_{MSR}/D_{MSR}$ (dimensionless), and MSR in $(ft/sec)^{1/2}$ for a number of additional embodiments (33 to 59). As noted above, $L_{MSR}/D_{MSR}$ represents the ratio of the length over the outer diameter. When the shaft has a variable diameter over its length, the outer diameter may be the diameter at the midshaft. E/rho represents the material composition of the shaft, and $T_{eff}$ represents an effective wall thickness of the shaft. For shafts with variable thickness over their length, the wall thickness may be the thickness at the midshaft.

Figure 21A:
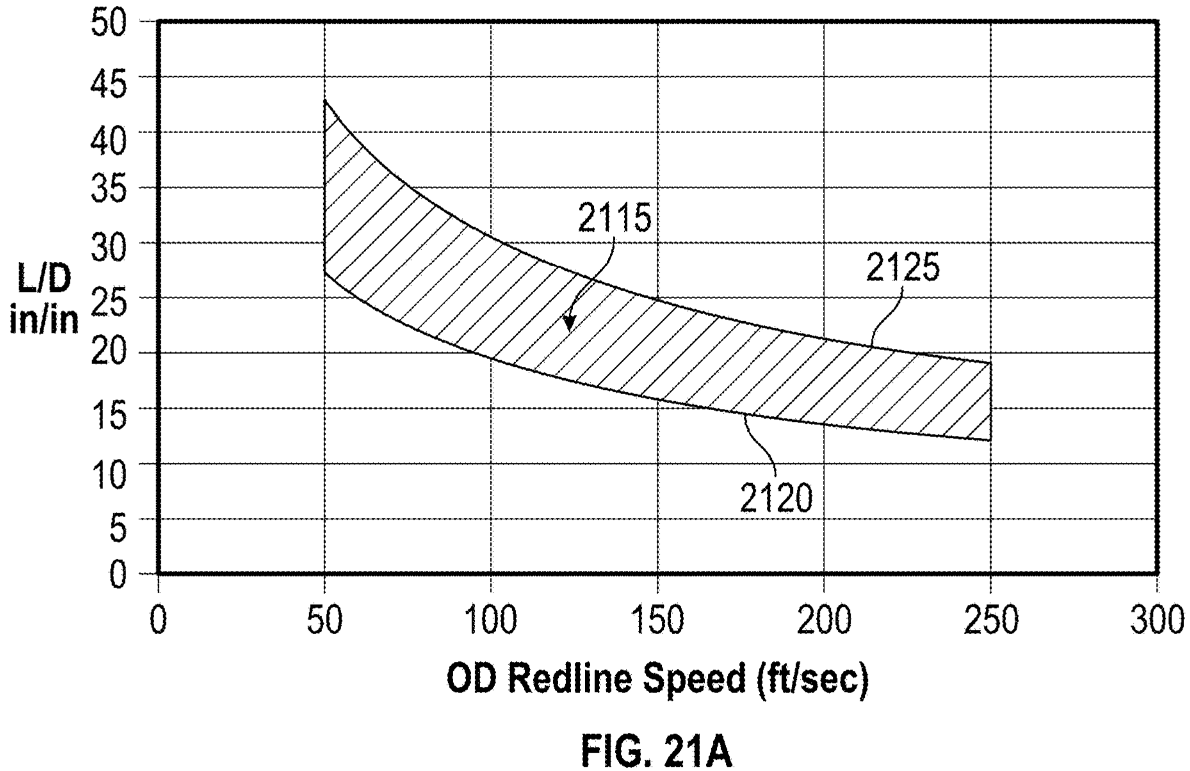
FIG. 21A shows a plot depicting a range of a midshaft rating relative to a range of outer diameter redline speeds.

FIG. 21A illustrates acceptable ranges for LP shaft redline speeds for a MSR region 2115, ranging from 200 $(ft/sec)^{-1}$ (curve 2120) to 300 $(ft/sec)^{-1}$ (curve 2125), for redline speeds from fifty to two hundred and fifty feet per second and shafts having an $L_{MSR}/D_{MSR}$ from twelve to forty three.

Figure 21B:
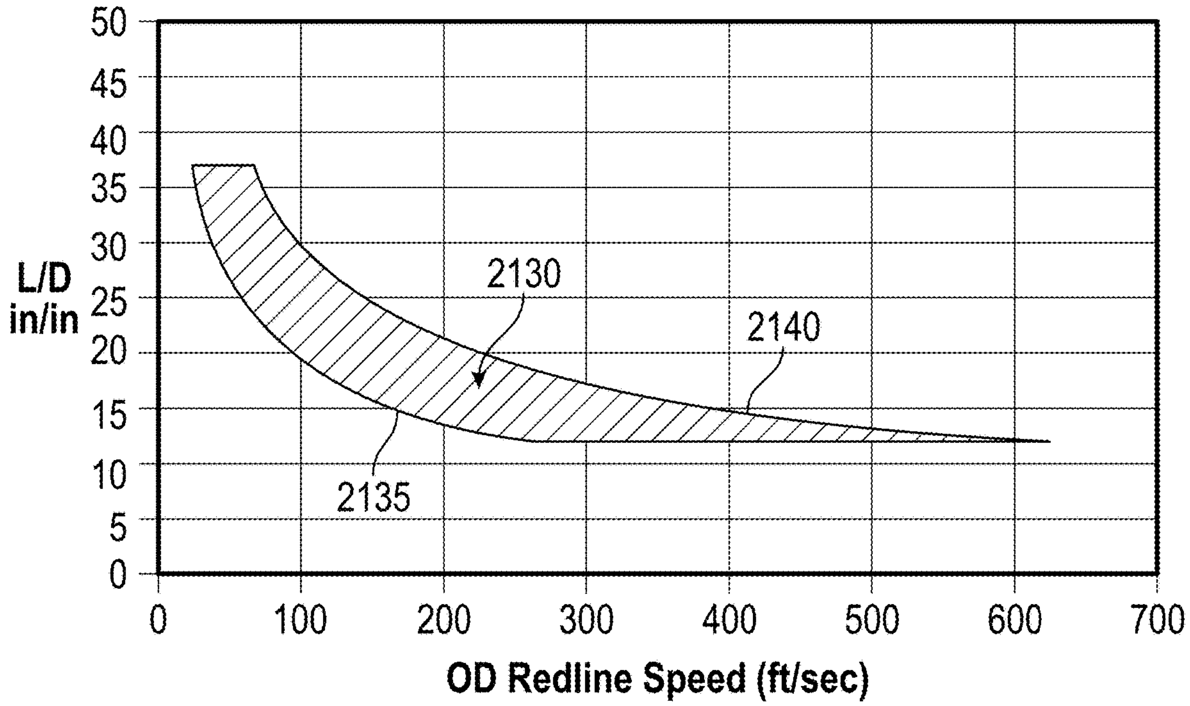
FIG. 21B shows a plot depicting a range of a midshaft rating relative to a range of length-diameter ratios.

FIG. 21B illustrates acceptable ranges for LP shaft redline speeds for a MSR region 2130, ranging from 200 $(ft/sec)^{-1}$ (curve 2135) to 300 $(ft/sec)^{-1}$ (curve 2140), for $L_{MSR}/D_{MSR}$ ratios from twelve to thirty-seven and redline speeds from thirty to six hundred thirty feet per second.

Figure 21C:
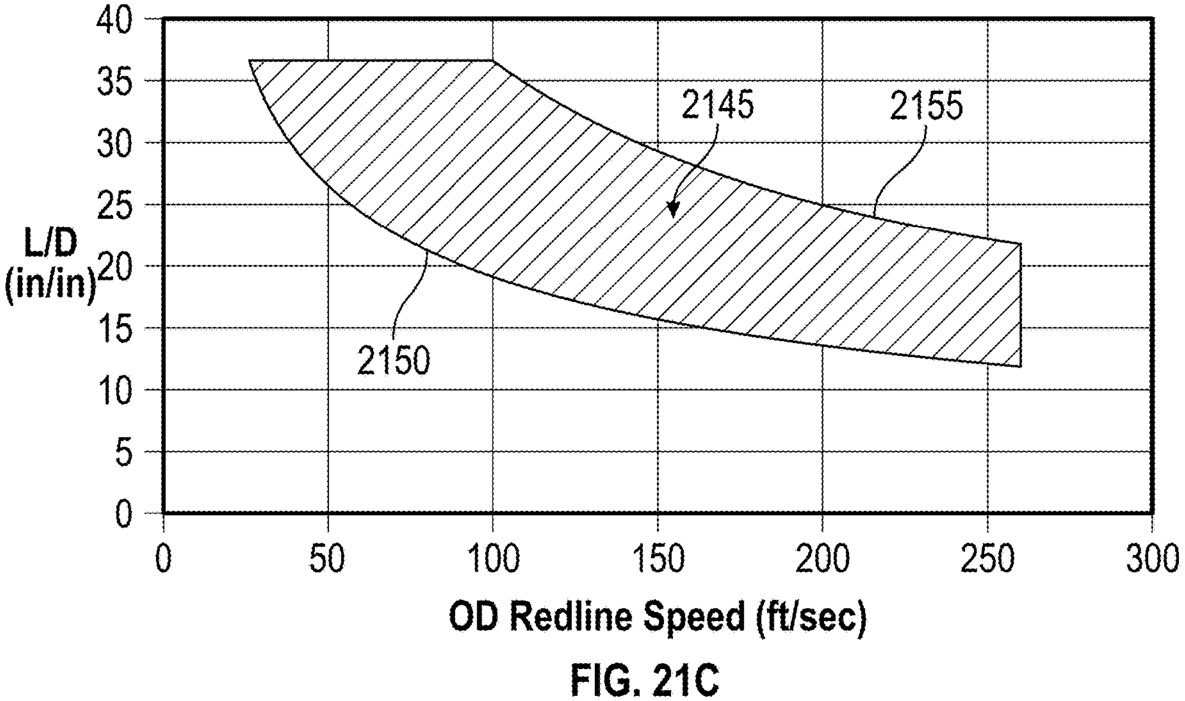
FIG. 21C shows a plot depicting a range of a midshaft rating relative to a range of length-diameter ratios.

FIG. 21C illustrates acceptable ranges for LP shaft redline speeds for a MSR region 2145, ranging from one hundred ninety $(ft/sec)^{-1}$ (curve 2150) to three hundred thirty $(ft/sec)^{-1}$ (curve 2155), for $L_{MSR}/D_{MSR}$ between twelve and thirty seven. Examples are provided in TABLE 5 and FIGS. 20A to 20I. FIG. 21C shows an MSR ranging from one hundred ninety $(ft/sec)^{-1}$ (curve 2150) to three hundred thirty $(ft/sec)^{-1}$ (curve 2155), for $L_{MSR}/D_{MSR}$ ratios from twelve to thirty-seven and redline speeds from fifty to two hundred and sixty feet per second.

In view of the foregoing objectives, in at least certain embodiments, a propulsion system is configured to define an MSR greater than one hundred ninety $(ft/sec)^{1/2}$, such as greater than two hundred $(ft/sec)^{1/2}$, such as at least two hundred thirty-five $(ft/sec)^{1/2}$, up to at least three hundred thirty $(ft/sec)^{1/2}$.

In view of the foregoing objectives, in at least certain embodiments, a propulsion system is configured to define an $L_{MSR}/D_{MSR}$ ratio greater than twelve, such as greater than sixteen, such as at least twenty-six, up to at least thirty-seven.

In view of the foregoing objectives, in at least certain embodiments, a propulsion system is configured to define an OD redline speed greater than sixty ft/sec, such as greater than seventy five ft/sec, such as at least one hundred and fifty ft/sec, up to at least two hundred and sixty ft/sec.

Based on the teachings in this disclosure, and without limiting the disclosure to only those embodiments explicitly shown, it will be understood how both the manner and the degree to which a modification of shaft length, diameter, material composition, bearings configuration, and thickness profile affects the MSR, and, additionally, the competing requirements, or requirements for a turbomachine architecture (e.g., available spacing/packaging, clearance, sump location, lubrication, etc.) for a given MSR.

Further aspects of the present disclosure are provided by the subject matter of the following clauses.

A turbomachine engine includes a core engine having one or more compressor sections, one or more turbine sections that includes a power turbine, and a combustion chamber in flow communication with the compressor sections and turbine sections. The turbomachine engine also includes a shaft that is coupled to the power turbine and that is characterized by a midshaft rating (MSR) between two hundred $(ft/sec)^{1/2}$ and three hundred $(ft/sec)^{1/2}$, and a redline speed between fifty and two hundred fifty feet per second (ft/sec).

A turbomachine engine includes a core engine having one or more compressor sections, one or more turbine sections that includes a power turbine, and a combustion chamber in flow communication with the compressor sections and turbine sections. The turbomachine engine also includes a shaft that is coupled to the power turbine and that is characterized by a midshaft rating (MSR) between two hundred $(ft/sec)^{1/2}$ and three hundred $(ft/sec)^{1/2}$, a length $L_{MSR}$, an outer diameter $D_{MSR}$, and a ratio of $L_{MSR}/D_{MSR}$ between twelve and thirty-seven.

The turbomachine engine of any preceding clause, wherein the turbomachine engine is configured to operate up to a redline speed without passing through a critical speed associated with a first-order bending mode of the shaft.

The turbomachine engine of any preceding clause, wherein the turbomachine engine is configured to operate up to the redline speed without passing through a critical speed associated with a first-order bending mode of the shaft.

The turbomachine engine of any preceding clause, wherein the MSR is between one hundred ninety $(ft/sec)^{1/2}$ and two hundred forty-five $(ft/sec)^{1/2}$.

The turbomachine engine of any preceding clause, wherein the MSR is between two hundred twelve $(ft/sec)^{1/2}$ and two hundred sixty $(ft/sec)^{1/2}$.

The turbomachine engine of any preceding clause, wherein the MSR is between two hundred forty-seven $(ft/sec)^{1/2}$ and two hundred ninety $(ft/sec)^{1/2}$.

The turbomachine engine of any preceding clause, wherein the redline speed is between sixty and ninety ft/sec.

The turbomachine engine of any preceding clause, wherein the redline speed is between seventy-five and one hundred seventy-five ft/sec.

The turbomachine engine of any preceding clause, wherein the redline speed is between one hundred fifty and two hundred fifty ft/sec.

The turbomachine engine of any preceding clause, wherein the ratio of $L_{MS}R/D_{MSR}$ is between twelve and twenty.

The turbomachine engine of any preceding clause, wherein the ratio of $L_{MS}R/D_{MSR}$ is between sixteen and thirty.

The turbomachine engine of any preceding clause, wherein the ratio of $L_{MSR}/D_{MSR}$ is between twenty-six and thirty-seven.

The turbomachine engine of any preceding clause, wherein the shaft is a composite shaft made of at least two different materials.

The turbomachine engine of any preceding clause, wherein the shaft has a length $L_{MSR}$ and a reduced mass density at a midpoint along the length $L_{MSR}$.

The turbomachine engine of any preceding clause, wherein the shaft has a reduced mass density at a midpoint along the length $L_{MSR}$.

The turbomachine engine of any preceding clause, wherein the shaft is a hollow convex shaft with a reduced wall thickness at the midpoint, a variable inner diameter, and a constant outer diameter.

The turbomachine engine of any preceding clause, wherein the shaft is a hollow convex shaft with a reduced wall thickness at the midpoint, a constant inner diameter, and a variable outer diameter.

The turbomachine engine of any preceding clause, wherein the shaft is coupled to the power turbine at a first mounting point, and wherein the shaft is also coupled to one of the compressor sections at a second mounting point.

The turbomachine engine of any preceding clause, wherein the shaft is supported by at least a first bearing and a second bearing.

The turbomachine engine of any preceding clause, wherein the shaft has a length L that is measured as the distance between the first bearing and the second bearing.

The turbomachine engine of any preceding clause, wherein the length L is measured as the distance between the first bearing and the second bearing.

The turbomachine engine of any preceding clause, wherein at least one bearing is a duplex bearing that has an overturning moment capability.

The turbomachine engine of any preceding clause, wherein each bearing is one of a ball bearing and a roller bearing.

The turbomachine engine of any preceding clause, wherein the first bearing is positioned between the first mounting point and the second mounting point, and wherein the second mounting point is positioned between the first bearing and the second bearing.

The turbomachine engine of any preceding clause, wherein the first bearing and the second bearing support the shaft in an inbound configuration in which the first bearing and the second bearing are positioned between the first mounting point and the second mounting point.

The turbomachine engine of any preceding clause, wherein the first bearing and the second bearing support the shaft in an outbound configuration in which the first mounting point and the second mounting point are positioned between the first bearing and the second bearing.

The turbomachine engine of any preceding clause, wherein the shaft is further supported by a third bearing and a fourth bearing.

The turbomachine engine of any preceding clause, wherein the first bearing and the second bearing are a first pair of duplex bearings, and the third bearing and the fourth bearing are a second pair of duplex bearings, wherein the first pair of duplex bearings and the second pair of duplex bearings support the shaft in an inbound overturning moment configuration in which the first pair of duplex bearings and the second pair of duplex bearings are positioned between the first mounting point and the second mounting point.

The turbomachine engine of any preceding clause, wherein the first bearing and the second bearing are a first pair of duplex bearings, and the third bearing and the fourth bearing are a second pair of duplex bearings, wherein the first pair of duplex bearings and the second pair of duplex bearings support the shaft in an outbound overturning moment configuration in which the first mounting point and the second mounting point are positioned between the first pair of duplex bearings and the second pair of duplex bearings.

The turbomachine engine of any preceding clause, wherein the first bearing, the second bearing, the third bearing, and the fourth bearing support the shaft in a four-bearing straddle configuration in which the first bearing and the second bearing are positioned between the first mounting point and the second mounting point, and the first mounting point and the second mounting point are positioned between the third bearing and the fourth bearing.

The turbomachine engine of any preceding clause, wherein the first bearing, the second bearing, the third bearing, and the fourth bearing support the shaft in a four-bearing outbound configuration in which the first mounting point and the second mounting point are positioned between a first group of bearings comprising the first bearing and the second bearing, and a second group of bearings comprising the third bearing and the fourth bearing.

In another aspect, a method includes using a turbomachine engine with a core having one or more compressor sections, one or more turbine sections that includes a power turbine, and a combustion chamber in flow communication with the compressor sections and turbine sections. The method also includes driving a shaft that is coupled to the power turbine and that is characterized by a midshaft rating (MSR) between two hundred $(ft/sec)^{1/2}$ and three hundred $(ft/sec)^{1/2}$, and a redline speed between fifty and two hundred fifty feet per second (ft/sec).

In another aspect, a method includes using a turbomachine engine with a core having one or more compressor sections, one or more turbine sections that includes a power turbine, and a combustion chamber in flow communication with the compressor sections and turbine sections. The method also includes driving a shaft that is coupled to the power turbine and that is characterized by a midshaft rating (MSR) between two hundred $(ft/sec)^{1/2}$ and three hundred $(ft/sec)^{1/2}$, a length $L_{MSR}$, an outer diameter $D_{MSR}$, and a ratio of $L_{MSR}/D_{MSR}$ between twelve and thirty-seven.

The method of any preceding clause, wherein the turbomachine engine is configured to operate up to a redline speed without passing through a critical speed associated with a first-order bending mode of the shaft.

The method of any preceding clause, wherein the turbomachine engine is configured to operate up to the redline speed without passing through a critical speed associated with a first-order bending mode of the shaft.

The method of any preceding clause, wherein the MSR is between one hundred ninety $(\text{ft/sec})^{1/2}$ and two hundred forty-five $(\text{ft/sec})^{1/2}$.

The method of any preceding clause, wherein the MSR is between two hundred twelve $(\text{ft/sec})^{1/2}$ and two hundred sixty $(\text{ft/sec})^{1/2}$.

The method of any preceding clause, wherein the MSR is between two hundred forty-seven $(\text{ft/sec})^{1/2}$ and two hundred ninety $(\text{ft/sec})^{1/2}$.

The method of any preceding clause, wherein the redline speed is between sixty and ninety ft/sec.

The method of any preceding clause, wherein the redline speed is between seventy-five and one hundred seventy-five ft/sec.

The method of any preceding clause, wherein the redline speed is between one hundred fifty and two hundred fifty ft/sec.

The method of any preceding clause, wherein the ratio of $L_{MS}R/D_{MSR}$ is between twelve and twenty.

The method of any preceding clause, wherein the ratio of $L_{MS}R/D_{MSR}$ is between sixteen and thirty.

The method of any preceding clause, wherein the ratio of $L_{MS}R/D_{MSR}$ is between twenty-six and thirty-seven.

The method of any preceding clause, wherein the shaft is a composite shaft made of at least two different materials.

The method of any preceding clause, wherein the shaft has a length $L_{MSR}$ and a reduced mass density at a midpoint along the length $L_{MSR}$.

The method of any preceding clause, wherein the shaft has a reduced mass density at a midpoint along the length L.

The method of any preceding clause, wherein the shaft is a hollow convex shaft with a reduced wall thickness at the midpoint, a variable inner diameter, and a constant outer diameter.

The method of any preceding clause, wherein the shaft is a hollow convex shaft with a reduced wall thickness at the midpoint, a constant inner diameter, and a variable outer diameter.

The method of any preceding clause, wherein the shaft is coupled to the power turbine at a first mounting point, and wherein the shaft is also coupled to one of the compressor sections at a second mounting point.

The method of any preceding clause, wherein the shaft is supported by at least a first bearing and a second bearing.

The method of any preceding clause, wherein the shaft has a length $L_{MSR}$ that is measured as the distance between the first bearing and the second bearing.

The method of any preceding clause, wherein the length $L_{MSR}$ is measured as the distance between the first bearing and the second bearing.

The method of any preceding clause, wherein at least one bearing is a duplex bearing that has an overturning moment capability.

The method of any preceding clause, wherein each bearing is one of a ball bearing and a roller bearing.

The method of any preceding clause, wherein the first bearing is positioned between the first mounting point and the second mounting point, and wherein the second mounting point is positioned between the first bearing and the second bearing.

The method of any preceding clause, wherein the first bearing and the second bearing support the shaft in an inbound configuration in which the first bearing and the second bearing are positioned between the first mounting point and the second mounting point.

The method of any preceding clause, wherein the first bearing and the second bearing support the shaft in an outbound configuration in which the first mounting point and the second mounting point are positioned between the first bearing and the second bearing.

The method of any preceding clause, wherein the shaft is further supported by a third bearing and a fourth bearing.

The method of any preceding clause, wherein the first bearing and the second bearing are a first pair of duplex bearings, and the third bearing and the fourth bearing are a second pair of duplex bearings, wherein the first pair of duplex bearings and the second pair of duplex bearings support the shaft in an inbound overturning moment configuration in which the first pair of duplex bearings and the second pair of duplex bearings are positioned between the first mounting point and the second mounting point.

The method of any preceding clause, wherein the first bearing and the second bearing are a first pair of duplex bearings, and the third bearing and the fourth bearing are a second pair of duplex bearings, wherein the first pair of duplex bearings and the second pair of duplex bearings support the shaft in an outbound overturning moment configuration in which the first mounting point and the second mounting point are positioned between the first pair of duplex bearings and the second pair of duplex bearings.

The method of any preceding clause, wherein the first bearing, the second bearing, the third bearing, and the fourth bearing support the shaft in a four-bearing straddle configuration in which the first bearing and the second bearing are positioned between the first mounting point and the second mounting point, and the first mounting point and the second mounting point are positioned between the third bearing and the fourth bearing.

The method of any preceding clause, wherein the first bearing, the second bearing, the third bearing, and the fourth bearing support the shaft in a four-bearing outbound configuration in which the first mounting point and the second mounting point are positioned between a first group of bearings including the first bearing and the second bearing, and a second group of bearings including the third bearing and the fourth bearing.

A turbomachine engine including a high-pressure compressor, a high-pressure turbine, a combustion chamber in flow communication with the high-pressure compressor and the high-pressure turbine. The turbomachine engine including a power turbine in flow communication with the high-pressure turbine, wherein at least one of the high-pressure compressor, the high-pressure turbine, or the power turbine includes a ceramic matrix composite (CMC) material. The turbomachine engine includes a low-pressure shaft coupled to the power turbine and characterized by a midshaft rating (MSR) between two hundred $(\text{ft/sec})^{1/2}$ and three hundred $(\text{ft/sec})^{1/2}$. The low-pressure shaft has a redline speed between fifty and two hundred fifty feet per second (ft/sec). The turbomachine engine is configured to operate up to the redline speed without passing through a critical speed associated with a first-order bending mode of the low-pressure shaft.

A turbomachine engine includes a high-pressure compressor, a high-pressure turbine, a combustion chamber in flow communication with the high-pressure compressor and the high-pressure turbine, a power turbine in flow communication with the high-pressure turbine, wherein at least one of the high-pressure compressor, the high-pressure turbine, and the power turbine including a ceramic matrix composite (CMC) material. The turbomachine engine includes a low-pressure shaft coupled to the power turbine. The low-pressure shaft configured to operate at a linear speed that does not exceed three hundred feet per second.

The turbomachine engine of any preceding clause, wherein the power turbine includes the CMC material.

The turbomachine engine of any preceding clause, wherein the power turbine includes at least one nozzle and at least one airfoil, wherein the at least one nozzle, the at least one airfoil, or both the at least one nozzle and the at least one airfoil include the CMC material.

The turbomachine engine of any preceding clause, wherein the power turbine has three stages, four stages, five stages, or six stages, and wherein at least one stage includes the CMC material.

The turbomachine engine of any preceding clause, wherein the power turbine has four stages and at least one stage of the four stages includes the CMC material.

The turbomachine engine of any preceding clause, wherein the CMC material is a first CMC material, and wherein the high-pressure turbine includes the first CMC material or a second CMC material.

The turbomachine engine of any preceding clause, wherein the high-pressure compressor includes the first CMC material or the second CMC material or a third CMC material.

The turbomachine engine of any preceding clause, wherein the high-pressure turbine includes the CMC material.

The turbomachine engine of any preceding clause, wherein the high-pressure turbine includes at least one nozzle and at least one airfoil, wherein the at least one nozzle, the at least one airfoil, or both the at least one nozzle and the at least one airfoil include the CMC material.

The turbomachine engine of any preceding clause, wherein the high-pressure turbine has one stage or two stages, and wherein at least one stage includes the CMC material.

The turbomachine engine of any preceding clause, wherein the CMC material is a first CMC material, and wherein the power turbine includes the first CMC material or a second CMC material.

The turbomachine engine of any preceding clause, wherein the high-pressure compressor includes the first CMC material or the second CMC material or a third CMC material.

The turbomachine engine of any preceding clause, wherein the high-pressure compressor includes the CMC material.

The turbomachine engine of any preceding clause, wherein the high-pressure compressor has eight stages, nine stages, ten stages, or eleven stages, and wherein at least one stage includes the CMC material.

The turbomachine engine of any preceding clause, wherein the high-pressure compressor has nine stages and at least one stage of the nine stages includes the CMC material.

The turbomachine engine of any preceding clause, wherein the CMC material is a first CMC material, and wherein the high-pressure turbine includes the first CMC material or a second CMC material.

The turbomachine engine of any preceding clause, wherein the power turbine includes the first CMC material, the second CMC material, or a third CMC material.

The turbomachine engine of any preceding clause, wherein the first CMC material and the second CMC material are the same materials.

The turbomachine engine of any preceding clause, wherein the first CMC material and the second CMC material are different materials.

The turbomachine engine of any preceding clause, wherein the third CMC material is the same material as the first CMC material, the second CMC material, or both the first CMC material and the second CMC material.

The turbomachine engine of any preceding clause, wherein the third CMC material is a different material than the first CMC material, the second CMC material, or both the first CMC material and the second CMC material.

The turbomachine engine of any preceding clause, further including an engine core including the high-pressure turbine, the high-pressure compressor, and the combustion chamber, wherein the engine core has a core length ($L_{CORE}$) given by:

$$L_{CORE} = \left[m^{(20+m)} * n^{(10+n)}\right]^{\left(\frac{1}{100}\right)} * D_{CORE} + CIS,$$

where m is a number of stages of the high-pressure compressor, n is a number of stages of the high-pressure turbine, and CIS is a constant.

The turbomachine engine of any preceding clause, further including a high-pressure shaft coupled between the high-pressure turbine and the high-pressure compressor and an engine core including the high-pressure turbine, the high-pressure compressor, and the combustion chamber, wherein the high-pressure shaft is characterized by a high-pressure shaft rating (HSR) given by:

$$HSR = 10^{-6} * N2_{r/l} * D_{CORE} * \left(\frac{L_{CORE}}{D_{CORE}}\right)^2,$$

where $N2_{r/l}$ is a redline speed of the high-pressure shaft, $D_{CORE}$ is the diameter of an exit stage of the high-pressure compressor, and $L_{CORE}$ is a core length of the engine core.

The turbomachine engine of any preceding clause, wherein the high-pressure shaft is characterized by a second high-pressure shaft rating ($HSR_{LP}$) given by:

$$HSR_{LP} = 10^{-6} * N1_{r/l} * D_{CORE} * \left(\frac{L_{CORE}}{D_{CORE}}\right)^2,$$

where $N1_{r/l}$ is the redline speed of the low-pressure shaft.

The turbomachine engine of any preceding clause, wherein the high-pressure turbine includes an airfoil configured with a forward surface facing towards a hot gas stream and a rearward surface facing away from the hot gas stream, wherein the forward surface includes a CVI type CMC material and the rearward surface includes a MI type CMC material.

The turbomachine engine of any preceding clause, wherein the high-pressure turbine includes a CVI type CMC material and the power turbine includes a MI type CMC material.

The turbomachine engine of any preceding clause, wherein the CMC material includes a ceramic matrix material.

The turbomachine engine of any preceding clause, wherein the ceramic matrix material includes a non-oxide silicon-based material.

The turbomachine engine of any preceding clause, wherein the non-oxide silicon-based material is selected from the group consisting of silicon carbide, silicon nitride, and mixtures thereof.

The turbomachine engine of any preceding clause, wherein the ceramic matrix material includes an oxide ceramic material.

The turbomachine engine of any preceding clause, wherein the oxide ceramic material is selected from the group consisting of silicon oxycarbides, silicon oxynitrides, aluminum oxide ($Al_2O_3$), silicon dioxide ($SiO_2$), alumino-silicates, and mixtures thereof.

The turbomachine engine of any preceding clause, wherein the oxide ceramic material includes oxides of element X, wherein X is selected from the group consisting of silicon (Si), aluminum (Al), zirconium (Zr), yttrium (Y), and combinations thereof.

The turbomachine engine of any preceding clause, wherein the ceramic matrix includes a non-oxide silicon-based material, an oxide ceramic material, or mixtures thereof.

The turbomachine engine of any preceding clause, wherein the CMC material includes a plurality of reinforcing fibers.

The turbomachine engine of any preceding clause, further including a flex coupling that couples the gearbox assembly to the low-speed shaft.

The turbomachine engine of any preceding clause, wherein the flex coupling is characterized by a decoupler moment stiffness in a range of 50 klb*in/rad to 200 klb*in/rad.

The turbomachine engine of any preceding clause, wherein the flex coupling is characterized by a decoupler shear stiffness in a range of 100 klb/in to 500 klb/in.

The turbomachine engine of any preceding clause, the decoupler moment stiffness being equal to $$\frac{E * K_m * R_{dcplr}^4}{H_{dcplr}},$$

E being a Young's modulus of a material of the flex coupling, $K_m$ being a correction factor, $R_{dcplr}$ being a decoupler radius of the flex coupling, and $H_{dcplr}$ being a decoupler height of the flex coupling.

The turbomachine engine of any preceding clause, $K_m$ being in a range of $0.13\times10^{-3}$ to $0.27\times10^{-3}$.

The turbomachine engine of any preceding clause, the decoupler shear stiffness being equal to $$\frac{E * K_m * R_{dcpir}^4}{L_{dcpir}^2},$$

wherein E being a Young's modulus of a material of the flex coupling, $K_m$ being a correction factor, $R_{dcplr}$ being a decoupler radius of the flex coupling, and $L_{dcplr}$ being a decoupler length of the flex coupling.

The turbomachine engine of any preceding clause, $K_m$ being in a range of $0.13\times10^{-3}$ to $0.27\times10^{-3}$.

The turbomachine engine of any preceding clause, wherein the MSR is between one hundred ninety $(ft/sec)^{1/2}$ and two hundred forty-five $(ft/sec)^{1/2}$.

The turbomachine engine of any preceding clause, wherein the MSR is between two hundred twelve $(ft/sec)^{1/2}$ and two hundred sixty $(ft/sec)^{1/2}$.

The turbomachine engine of any preceding clause, wherein the MSR is between two hundred forty-seven $(ft/sec)^{1/2}$ and two hundred ninety $(ft/sec)^{1/2}$.

The turbomachine engine of any preceding clause, wherein HSR is from 1.9 to 4.3.

The turbomachine engine of any preceding clause, wherein $D_{CORE}$ is from 13 inches to 41 inches.

The turbomachine engine of any preceding clause, wherein $L_{CORE}$ is from 43 inches to 80 inches.

The turbomachine engine of any preceding clause, wherein $N2_{r/l}$, is from 11000 RPM to 25000 RPM.

The turbomachine engine of any preceding clause, wherein m is eight, nine, ten, or eleven.

The turbomachine engine of any preceding clause, wherein n is one or two.

The turbomachine engine of any preceding clause, wherein CIS is from twenty inches to thirty inches.

The turbomachine engine of any preceding clause, wherein $HSR_{LP}$ is from 1.1 to 1.6.

The turbomachine engine of any preceding clause, wherein the high-pressure shaft first mode margin with respect to the low-pressure shaft redline speed is given by:

$$0 < \frac{0.55}{(HSR_{LP})^2} + LST < -0.2,$$

wherein LST accounts for the effects that the HPC pressure ratio and the HPC exit temperature can have on the first mode.

The turbomachine engine of any preceding clause, wherein LST is from −0.2 to −0.74.

The turbomachine engine of any preceding clause, wherein the high-pressure shaft second mode margin with respect to the high-pressure shaft redline speed is given by:

$$-0.1215 * HSR + \left(\frac{2 * HST - 1}{3}\right) < -0.2,$$

wherein HST accounts for the effects that the HPC pressure ratio and the HPC exit temperature have on the third mode.

The turbomachine engine of any preceding clause, wherein HST is from 0.46 to 0.78.

The turbomachine engine of any preceding clause, wherein the low-pressure shaft has a length ($L_{MSR}$) that extends from a forward bearing to an aft bearing, and a mid-shaft diameter ($D_{MSR}$), and wherein the length ($L_{MSR}$) is given by: $L_{MSR}=L_{IGB}+L_{CORE}+L_{AFT}$, where $L_{IGB}$ is a length forward of the core engine to the forward bearing, $L_{CORE}$ is a length of the core engine, and $L_{AFT}$ is a length from aft of the core engine to the aft bearing.

The turbomachine engine of any preceding clause, wherein $L_{MSR}$ is given by:

$$L_{MSR} = [0.16 * D_{CORE} + 1.7] + \left[\left[m^{(20+m)} * n^{(10+n)}\right]^{\left(\frac{1}{100}\right)} * D_{CORE} + CIS\right] + L_{AFT},$$

where m is a number of stages of the high-pressure compressor, n is a number of stages of the high-pressure turbine, and CIS is a constant.

The turbomachine engine of any preceding clause, wherein $L_{IGB}$ is from four inches to twelve inches.

The turbomachine engine of any preceding clause, wherein $L_{AFT}$ is from two inches to twenty-four inches.

The turbomachine engine of any preceding clause, wherein the high-pressure compressor includes an exit stage having an exit stage diameter ($D_{CORE}$).

The turbomachine engine of any preceding clause, wherein $L_{IGB}$ is given by: $L_{IGB}=0.16*D_{CORE}+1.7$ The turbomachine engine of any preceding clause, wherein $D_{MSR}$ is given by: $D_{MSR}=D_{HPT\ BORE}-2*t$, where $D_{HPT\ BORE}$ is a diameter of a bore of the high-pressure turbine and t is an intershaft thickness between the shaft and the bore of the high-pressure turbine.

The turbomachine engine of any preceding clause, wherein the thickness is from 450 mils to 650 mils.

The turbomachine engine of any preceding clause, further including a core forward bearing and a core aft bearing.

The turbomachine engine of any preceding clause, wherein the length $L_{IGB}$ extends from the forward bearing to the core forward bearing.

The turbomachine engine of any preceding clause, wherein the length $L_{AFT}$ extends from the aft bearing to the core aft bearing.

The turbomachine engine of any preceding clause, wherein the length $L_{CORE}$ extends from the core forward bearing to the core aft bearing.

The turbomachine engine of any preceding clause, wherein the engine is an unducted engine.

The turbomachine engine of any preceding clause, wherein the engine is a ducted engine.

The turbomachine engine of any preceding clause, further including a second aft bearing.

The turbomachine engine of any preceding clause, further including a second forward bearing and a second aft bearing.

The turbomachine engine of any preceding clause, wherein the forward bearing is forward of the high-pressure compressor.

The turbomachine engine of any preceding clause, wherein the aft bearing is aft of the high-pressure turbine.

The turbomachine engine of any preceding clause, wherein the low-pressure turbine has five stages and at least one stage of the five stages includes the CMC material.

The turbomachine engine of any preceding clause, wherein the low-pressure turbine has six stages and at least one stage of the six stages includes the CMC material.

The turbomachine engine of any preceding clause, wherein the low-pressure turbine has three stages and at least one stage of the three stages includes the CMC material.

The turbomachine engine of any preceding clause, wherein the low-pressure turbine and the high-pressure compressor each include a CMC material.

The turbomachine engine of any preceding clause, wherein the low-pressure turbine and the high-pressure turbine each include a CMC material.

The turbomachine engine of any preceding clause, wherein the high-pressure compressor and the high-pressure turbine each include a CMC material.

The turbomachine engine of any preceding clause, wherein the high-pressure turbine has one stage, and wherein the stage includes the CMC material.

The turbomachine engine of any preceding clause, wherein the high-pressure turbine has two stages, and wherein at least one stage of the two stages includes the CMC material.

The turbomachine engine of any preceding clause, wherein the high-pressure compressor has eight stages and at least one stage of the eight stages includes the CMC material.

The turbomachine engine of any preceding clause, wherein the high-pressure compressor has ten stages and at least one stage of the ten stages includes the CMC material.

The turbomachine engine of any preceding clause, wherein the high-pressure compressor has eleven stages and at least one stage of the eleven stages includes the CMC material.

The turbomachine engine of any preceding clause, wherein the engine is an open fan engine having a first second and third stream, and wherein a ratio of a primary fan to a mid-fan blade spans is between 2:1 to 10:1.

The turbomachine engine of any preceding clause, wherein the engine is an open fan engine having a first second and third stream, and wherein a ratio of a primary fan to a mid-fan blade spans is between 3:1 to 7:1.

The turbomachine engine of any preceding clause, wherein the engine is an open fan or ducted engine.

The turbomachine engine of any preceding clause, wherein the linear speed of the low-pressure shaft is greater than thirty feet per second.

The turbomachine engine of any preceding clause, wherein the ceramic matrix includes an inorganic filler.

The turbomachine engine of any preceding clause, wherein the inorganic filler is selected from the group consisting of pyrophyllite, wollastonite, mica, talc, kyanite, montmorillonite, and mixtures thereof.

The turbomachine engine of any preceding clause, wherein the ceramic matrix includes a non-oxide silicon-based material, an oxide ceramic material, or mixtures thereof.

The turbomachine engine of any preceding clause, wherein the CMC material includes a plurality of reinforcing fibers.

The turbomachine engine of any preceding clause, wherein the plurality of reinforcing fibers includes a non-oxide silicon-based material.

The turbomachine engine of any preceding clause, wherein the non-oxide silicon-based material is selected from the group consisting of silicon carbide, silicon nitride, and mixtures thereof.

The turbomachine engine of any preceding clause, wherein the plurality of reinforcing fibers includes an oxide ceramic material.

The turbomachine engine of any preceding clause, wherein the oxide ceramic is selected from the group consisting of silicon oxycarbides, silicon oxynitrides, aluminum oxide (Al2O3), silicon dioxide (SiO2), aluminosilicates, and mixtures thereof.

The turbomachine engine of any preceding clause, the plurality of reinforcing fibers includes a non-oxide carbon-based material.

The turbomachine engine of any preceding clause, wherein the ceramic matrix includes a non-oxide silicon-based material, an oxide ceramic material, a non-oxide carbon-based material, or mixtures thereof.

The turbomachine engine of any preceding clause, further including an electric machine coupled to the low-pressure shaft.

The turbomachine engine of any preceding clause, wherein the electric machine is located aft of the power turbine.

The turbomachine engine of any preceding clause, wherein the electric machine is an electric motor.

The turbomachine engine of any preceding clause, wherein the electric machine is an electric generator.

The turbomachine engine of any preceding clause, wherein the electric machine includes a rotor and a stator, wherein the rotor rotates with respect to the stator.

The turbomachine engine of any preceding clause, wherein the rotor is coupled to the low-pressure shaft.

The turbomachine engine of any preceding clause, wherein the rotor is configured to rotate with the low-pressure shaft.

The turbomachine engine of any preceding clause, wherein the electric machine is a motor-generator.

A method of operating the turbomachine engine of any preceding clause, the method including operating the turbomachine engine to generate an engine thrust wherein a linear speed of the low-pressure shaft does not exceed three hundred feet per second.

A method of operating a turbomachine engine having a high-pressure compressor, a high-pressure turbine, a combustion chamber in flow communication with the high-pressure compressor and the high-pressure turbine, a power turbine, at least one of the high-pressure compressor, the high-pressure turbine, and the power turbine having a ceramic matric composite (CMC) material, and a low-pressure shaft coupled to the power turbine and characterized by a midshaft rating (MSR) between two hundred $(ft/sec)^{1/2}$ and three hundred $(ft/sec)^{1/2}$. The method including operating the low-pressure shaft up to the redline speed between fifty and two hundred fifty feet per second (ft/sec) without passing through a critical speed associated with a first-order bending mode of the low-pressure shaft.

A method of operating a turbomachine engine having a high-pressure compressor, a high-pressure turbine, a combustion chamber in flow communication with the high-pressure compressor and the high-pressure turbine, a power turbine in flow communication with the high-pressure turbine, at least one of the high-pressure compressor, the high-pressure turbine, or the power turbine having a ceramic matrix composite (CMC) material, and a low-pressure shaft coupled to the power turbine. The method including operating the low-pressure shaft at a linear speed that does not exceed three hundred feet per second.

The method of any preceding clause, wherein the turbomachine engine is the turbomachine engine according to any preceding clause.

A turbomachine engine including an engine core including a high-pressure compressor, which has an exit stage having an exit stage diameter ($D_{CORE}$), a high-pressure turbine, and a combustion chamber in flow communication with the high-pressure compressor and the high-pressure turbine; a power turbine in flow communication with the high-pressure turbine; and a low-pressure shaft coupled to the power turbine and characterized by a midshaft rating (MSR) between two hundred $(ft/sec)^{1/2}$ and three hundred $(ft/sec)^{1/2}$. The low-pressure shaft has a redline speed between fifty and two hundred fifty feet per second (ft/sec). The turbomachine engine is configured to operate up to the redline speed without passing through a critical speed associated with a first-order bending mode of the low-pressure shaft. The low-pressure shaft has a length ($L_{MSR}$) defined by an engine core length ($L_{CORE}$) given by:

$$L_{CORE} = \left[m^{(20+m)} * n^{(10+n)}\right]^{\left(\frac{1}{100}\right)} * D_{CORE} + CIS,$$

where m is a number of stages of the high-pressure compressor, n is a number of stages of the high-pressure turbine, and CIS is a constant.

A turbomachine engine having an engine core including a high-pressure compressor, which has an exit stage having an exit stage diameter ($D_{CORE}$), having from eight stages to eleven stages, a high-pressure turbine, and a combustion chamber in flow communication with the high-pressure compressor and the high-pressure turbine, wherein the high pressure compressor and higher pressure turbine are connected through a high pressure shaft; and wherein the high-pressure compressor and high-pressure turbine are related to a core length ($L_{CORE}$) by $$L_{CORE} = \left[m^{(20+m)} * n^{(10+n)}\right]^{\left(\frac{1}{100}\right)} * D_{CORE} + CIS,$$

where m is a number of stages of the high-pressure compressor, n is a number of stages of the high-pressure turbine, and CIS is a constant. The turbomachine engine further comprising a power turbine in flow communication with the high-pressure turbine and a low-pressure shaft coupling the power turbine to a low-pressure compressor and fan assembly, wherein the low-pressure shaft has a redline speed of between 50 feet per second and 300 feet per second.

The turbomachine engine of any preceding clause, wherein CIS is from twenty inches to thirty inches.

The turbomachine engine of any preceding clause, wherein $L_{CORE}$ is from forty-three inches to eighty inches.

The turbomachine engine of any preceding clause, wherein $D_{CORE}$ is from 13 inches to 41 inches.

The turbomachine engine of any preceding clause, wherein the power turbine has four stages, five stages, or six stages.

The turbomachine engine of any preceding clause, wherein n is one stage or two stages.

The turbomachine engine of any preceding clause, wherein m is eight stages, nine stages, ten stages, or eleven stages.

The turbomachine engine of any preceding clause, wherein m is nine stages.

The turbomachine engine of any preceding clause, wherein the high-pressure turbine and the high-pressure compressor are connected to each other through a high-pressure shaft, and wherein the high-pressure shaft is characterized by a high-pressure shaft rating (HSR) given by:

$$HSR = 10^{-6} * N2_{r/l} * D_{CORE} * \left(\frac{L_{CORE}}{D_{CORE}}\right)^2,$$

where $N2_{r/l}$ is a redline speed of the high-pressure shaft.

The turbomachine engine of any preceding clause, wherein HSR is from 1.9 to 4.3.

The turbomachine engine of any preceding clause, wherein $N2_{r/l}$ is from 11000 RPM to 25000 RPM.

The turbomachine engine of any preceding clause, wherein the high-pressure shaft is characterized by a second high-pressure shaft rating (HSRLP) given by:

$$HSR_{LP} = 10^{-6} * N1_{r/l} * D_{CORE} * \left(\frac{L_{CORE}}{D_{CORE}}\right)^2,$$

where $N1_{r/l}$ is the redline speed of the low-pressure shaft.

The turbomachine engine of any preceding clause, wherein $HSR_{LP}$ is from 1.1 to 1.6.

The turbomachine engine of any preceding clause, wherein the power turbine comprises a ceramic matrix composite (CMC) material.

The turbomachine engine of any preceding clause, further including an electric machine coupled to the low-pressure shaft.

The turbomachine engine of any preceding clause, wherein the electric machine is located aft of the power turbine.

The turbomachine engine of any preceding clause, further comprising a primary fan driven by the power turbine through a gearbox assembly and a flex coupling that couples the gearbox assembly to the low-pressure shaft.

The turbomachine engine of any preceding clause, wherein the flex coupling is characterized by a decoupler moment stiffness in a range of 50 klb*in/rad to 200 klb*in/rad and a decoupler shear stiffness in a range of 100 klb/in to 500 klb/in.

The turbomachine engine of any preceding clause, wherein the length ($L_{MSR}$) is given by: $L_{MSR}=L_{IGB}+L_{CORE}+L_{AFT}$, where $L_{IGB}$ is a length forward of the core engine to the forward bearing and is from four inches to twelve inches and $L_{AFT}$ is a length from aft of the core engine to the aft bearing and is from two inches to twenty-four inches.

The turbomachine engine of any preceding clause, wherein the electric machine is an electric motor.

The turbomachine engine of any preceding clause, wherein the electric machine is an electric generator.

The turbomachine engine of any preceding clause, wherein the electric machine includes a rotor and a stator, wherein the rotor rotates with respect to the stator.

The turbomachine engine of any preceding clause, wherein the rotor is coupled to the low-pressure shaft.

The turbomachine engine of any preceding clause, wherein the rotor is configured to rotate with the low-pressure shaft.

The turbomachine engine of any preceding clause, wherein the electric machine is a motor-generator.

The method of any preceding clause, wherein the engine is an open fan or ducted engine.

The turbomachine engine of any preceding clause, wherein the flex coupling is characterized by a decoupler moment stiffness in a range of 50 klb*in/rad to 200 klb*in/rad.

The turbomachine engine of any preceding clause, wherein the flex coupling is characterized by a decoupler shear stiffness in a range of 100 klb/in to 500 klb/in.

The turbomachine engine of any preceding clause, the decoupler moment stiffness being equal to $$\frac{E*K_m*R_{dcplr}^4}{H_{dcplr}},$$

E being a Young's modulus of a material of the flex coupling, $K_m$ being a correction factor, $R_{dcplr}$ being a decoupler radius of the flex coupling, and $H_{dcplr}$ being a decoupler height of the flex coupling.

The turbomachine engine of any preceding clause, $K_m$ being in a range of $0.13\times10^{-3}$ to $0.27\times10^{-3}$.

The turbomachine engine of any preceding clause, the decoupler shear stiffness being equal to $$\frac{E*K_m*R_{dcplr}^4}{L_{dcplr}^2},$$

wherein E being a Young's modulus of a material of the flex coupling, $K_m$ being a correction factor, $R_{dcplr}$ being a decoupler radius of the flex coupling, and $L_{dcplr}$ being a decoupler length of the flex coupling.

The turbomachine engine of any preceding clause, $K_m$ being in a range of $0.13\times10^{-3}$ to $0.27\times10^{-3}$.

The turbomachine of any preceding clause, wherein the MSR is between one hundred ninety (ft/sec)1/2 and two hundred forty-five (ft/sec)1/2.

The turbomachine of any preceding clause, wherein the MSR is between two hundred twelve (ft/sec)1/2 and two hundred sixty (ft/sec)1/2.

The turbomachine of any preceding clause, wherein the MSR is between two hundred forty-seven (ft/sec)1/2 and two hundred ninety (ft/sec)1/2.

The turbomachine engine of any preceding clause, wherein the high-pressure shaft first mode margin with respect to the low-pressure shaft redline speed is given by:

$$0<\frac{0.55}{(HSR_{LP})^2}+LST<-0.2,$$

wherein LST accounts for the effects that the HPC pressure ratio and the HPC exit temperature can have on the first mode.

The turbomachine engine of any preceding clause, wherein LST is from −0.2 to −0.74.

The turbomachine engine of any preceding clause, wherein the high-pressure shaft second mode margin with respect to the high-pressure shaft redline speed is given by:

$$-0.1215*HSR+\left(\frac{2*HST-1}{3}\right)<-0.2,$$

wherein HST accounts for the effects that the HPC pressure ratio and the HPC exit temperature have on the third mode.

The turbomachine engine of any preceding clause, wherein HST is from 0.46 to 0.78.

The turbomachine engine of any preceding clause, wherein the engine is an open fan engine having a first second and third stream, and wherein a ratio of a primary fan to a mid-fan blade spans is between 2:1 to 10:1.

The turbomachine engine of any preceding clause, wherein the engine is an open fan engine having a first second and third stream, and wherein a ratio of a primary fan to a mid-fan blade spans is between 3:1 to 7:1.

The turbomachine of any preceding clause, wherein $L_{IGB}$ is from four inches to twelve inches.

The turbomachine of any preceding clause, wherein $L_{AFT}$ is between two inches and twenty-four inches, inclusive of the endpoints.

The turbomachine of any preceding clause, wherein $L_{IGB}$ is given by $L_{IGB}=0.16*D_{CORE}+1.7$.

The turbomachine of any preceding clause, wherein $D_{MSR}$ is given by: $D_{MSR}=D_{HPT\ BORE}-2*t$, where $D_{HPT\ BORE}$ is a diameter of a bore of the high-pressure turbine and t is an intershaft thickness between the shaft and the bore of the high-pressure turbine.

The turbomachine of any preceding clause, wherein the thickness is between 450 mils and 650 mils, inclusive of the endpoints.

The turbomachine of any preceding clause, wherein at least one of the power turbine, the high-pressure compressor, and the high-pressure turbine comprises a ceramic matrix composite (CMC).

The turbomachine engine of any preceding clause, further comprising a core forward bearing and a core aft bearing.

The turbomachine engine of any preceding clause, wherein the length $L_{IGB}$ extends from the forward bearing to the core forward bearing.

The turbomachine engine of any preceding clause, wherein the length $L_{AFT}$ extends from the aft bearing to the core aft bearing.

The turbomachine engine of any preceding clause, wherein the length $L_{CORE}$ extends from the core forward bearing to the core aft bearing.

The turbomachine engine of any preceding clause, wherein the engine is an unducted engine.

The turbomachine engine of any preceding clause, wherein the engine is a ducted engine.

The turbomachine engine of any preceding clause, further comprising a second aft bearing.

The turbomachine engine of any preceding clause, further comprising a second forward bearing.

The turbomachine engine of any preceding clause, wherein the forward bearing is forward of the high-pressure compressor.

The turbomachine engine of any preceding clause, wherein the aft bearing is aft of the high-pressure turbine.

A method of operating the turbomachine engine of any preceding clause, the method including operating the turbomachine engine to generate an engine thrust wherein a linear speed of the low-pressure shaft does not exceed three hundred feet per second.

A method of operating a turbomachine engine including an engine core including a high-pressure compressor, which has an exit stage having an exit stage diameter ($D_{CORE}$), a high-pressure turbine, a combustion chamber in flow communication with the high-pressure compressor and the high-pressure turbine, a power turbine in flow communication with the high-pressure turbine, and a low-pressure shaft coupled to the power turbine and characterized by a midshaft rating (MSR) between two hundred $(ft/sec)^{1/2}$ and three hundred $(ft/sec)^{1/2}$ and having a length ($L_{MSR}$) defined by an engine core length ($L_{CORE}$) given by:

$$L_{CORE} = \left[m^{(20+m)} * n^{(10+n)}\right]^{\left(\frac{1}{100}\right)} * D_{CORE} + CIS,$$

where m is a number of stages of the high-pressure compressor, n is a number of stages of the high-pressure turbine, and CIS is a constant. The method including operating the low-pressure shaft at a redline speed between fifty and two hundred fifty feet per second (ft/sec). The method including operating the low-pressure shaft up to the redline speed without passing through a critical speed associated with a first-order bending mode of the low-pressure shaft.

A method of operating a turbomachine, comprising the steps of: using an engine core including a high-pressure compressor, which has an exit stage having an exit stage diameter ($D_{CORE}$), a high-pressure turbine, and a combustion chamber in flow communication with the high-pressure compressor and the high-pressure turbine, a power turbine in flow communication with the high-pressure turbine, and a low-pressure shaft coupled to the power turbine and characterized by a midshaft rating (MSR) between two hundred $(ft/sec)^{1/2}$ and three hundred $(ft/sec)^{1/2}$. The method includes operating the turbomachine to generate an engine thrust wherein the low-pressure shaft linear speed does not exceed three hundred feet per second.

A method of operating a turbomachine engine, comprising using an engine core including a high-pressure compressor, which has an exit stage having an exit stage diameter ($D_{CORE}$), a high-pressure turbine, a combustion chamber in flow communication with the high-pressure compressor and the high-pressure turbine, a power turbine in flow communication with the high-pressure turbine, and a low-pressure shaft coupled to the power turbine having a length ($L_{MSR}$) defined by an engine core length ($L_{CORE}$) given by:

$$L_{CORE} = \left[m^{(20+m)} * n^{(10+n)}\right]^{\left(\frac{1}{100}\right)} * D_{CORE} + CIS,$$

where m is a number of stages of the high-pressure compressor, n is a number of stages of the high-pressure turbine, and CIS is a constant. The method including operating the turbomachine engine to generate an engine thrust wherein a linear speed of the low-pressure shaft does not exceed three hundred feet per second.

The method of any preceding clause, wherein the turbomachine engine is the turbomachine engine according to any preceding clause.

Although the foregoing description is directed to certain embodiments, other variations and modifications will be apparent to those skilled in the art, and may be made without departing from the scope of the disclosure. Moreover, features described in connection with one embodiment may be used in conjunction with other embodiments, even if not explicitly stated above.

The invention claimed is:

1. A turbomachine engine comprising:

an engine core including a high-pressure compressor that has an exit stage having an exit stage diameter ($D_{CORE}$), a high-pressure turbine, and a combustion chamber in flow communication with the high-pressure compressor and the high-pressure turbine;

a power turbine in flow communication with the high-pressure turbine; and a low-pressure shaft coupled to the power turbine and characterized by a midshaft rating (MSR) between one hundred ninety eight $(ft/sec)^{1/2}$ and two hundred fifty-five $(ft/sec)^{1/2}$, wherein the low-pressure shaft has a redline speed between one hundred twenty-seven and one hundred eighty-one feet per second (ft/sec), wherein the turbomachine engine is configured to operate up to the redline speed without passing through a critical speed associated with a first-order bending mode of the low-pressure shaft, wherein the low-pressure shaft has a length ($L_{MSR}$) defined by an engine core length ($L_{CORE}$) in a range of forty-three inches to eighty inches, and wherein the engine core length ($L_{CORE}$) is given by:

$$L_{CORE} = \left[m^{(20+m)} * n^{(10+n)}\right]^{\left(\frac{1}{100}\right)} * D_{CORE} + CIS,$$

where m is a number of stages of the high-pressure compressor, n is a number of stages of the high-pressure turbine, and CIS is a constant.

2. The turbomachine engine of claim 1, wherein CIS is from twenty inches to thirty inches.

3. The turbomachine engine of claim 1, wherein $D_{CORE}$ is from 13.8 inches to 30.6 inches.

4. The turbomachine engine of claim 1, wherein the power turbine has four stages, five stages, or six stages.

5. The turbomachine engine of claim 1, wherein n is one stage or two stages.

6. The turbomachine engine of claim 1, wherein m is eight stages, nine stages, ten stages, or eleven stages.

7. The turbomachine engine of claim 1, further comprising a low-pressure compressor coupled to the low-pressure shaft.

8. The turbomachine engine of claim 1, further comprising a fan having a fan shaft drivingly coupled to the low-pressure shaft, and a fan bearing that supports the fan shaft.

9. The turbomachine engine of claim 8, further comprising a gearbox assembly, the fan shaft coupled to the low-pressure shaft through the gearbox assembly.

10. The turbomachine engine of claim 9, wherein the gearbox assembly includes a sun gear coupled to the low-pressure shaft, a plurality of planet gears constrained by a planet carrier, and a ring gear coupled to the fan shaft.

11. The turbomachine engine of claim 9, wherein the gearbox assembly includes a sun gear coupled to the low-pressure shaft, a plurality of planet gears constrained by a planet carrier coupled to the fan shaft, and a ring gear.

12. The turbomachine engine of claim 1, further comprising a low-pressure shaft forward bearing and a low-pressure shaft aft bearing that support the low-pressure shaft, and $L_{MSR}$ is defined from the low-pressure shaft forward bearing to the low-pressure shaft aft bearing.

13. The turbomachine engine of claim 12, wherein the engine core includes a high-pressure shaft coupled to the high-pressure turbine and the high-pressure compressor, the high-pressure shaft supported by a high-pressure shaft forward bearing and a high-pressure shaft aft bearing.

14. The turbomachine engine of claim 13, wherein the low-pressure shaft forward bearing and the high-pressure shaft forward bearing are ball bearings.

15. The turbomachine engine of claim 13, wherein the low-pressure shaft aft bearing and the high-pressure shaft aft bearing are roller bearings.

16. The turbomachine engine of claim 13, wherein the length ($L_{MSR}$) is given by: $L_{MSR}=L_{IGB}+L_{CORE}+L_{AFT}$, where $L_{IGB}$ is a length from the low-pressure shaft forward bearing to the high-pressure shaft forward bearing and is from four inches to twelve inches and $L_{AFT}$ is a length from the high-pressure shaft aft bearing to the low-pressure shaft aft bearing and is from two inches to twenty-four inches.

17. The turbomachine engine of claim 13, wherein the low-pressure shaft forward bearing is a first low-pressure shaft forward bearing, and the turbomachine engine further comprises a second low-pressure shaft forward bearing forward of the first low-pressure shaft forward bearing.

18. The turbomachine engine of claim 13, wherein the low-pressure shaft aft bearing is a first low-pressure shaft aft bearing, and the turbomachine engine further comprises a second low-pressure shaft aft bearing that is aft of the first low-pressure shaft forward bearing.

19. The turbomachine engine of claim 18, wherein an axial length from the high-pressure shaft aft bearing to the first low-pressure shaft aft bearing is less than an axial length from the first low-pressure shaft aft bearing to the second low-pressure shaft aft bearing.

20. The turbomachine engine of claim 18, further comprising an electric machine coupled to the low-pressure shaft aft of the second low-pressure shaft aft bearing.

* * * * *